US 12,205,266 B2

United States Patent
Holzer et al.

(10) Patent No.: US 12,205,266 B2
(45) Date of Patent: Jan. 21, 2025

(54) MULTI-VIEW INTERACTIVE DIGITAL MEDIA REPRESENTATION VIEWER

(71) Applicant: Fyusion, Inc., San Francisco, CA (US)

(72) Inventors: Stefan Johannes Josef Holzer, San Mateo, CA (US); Matteo Munaro, San Francisco, CA (US); Krunal Ketan Chande, San Francisco, CA (US); Julius Santiago, San Francisco, CA (US); Pantelis Kalogiros, San Francisco, CA (US); Raul Dronca, San Francisco, CA (US); Ioannis Spanos, Larisa (GR); Pavel Hanchar, Minsk (BY); Aidas Liaudanskas, San Francisco, CA (US); Santi Arano, San Francisco, CA (US); Rodrigo Ortiz-Cayon, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 398 days.

(21) Appl. No.: 17/649,792

(22) Filed: Feb. 2, 2022

(65) Prior Publication Data
US 2022/0254007 A1    Aug. 11, 2022

Related U.S. Application Data

(60) Provisional application No. 63/146,238, filed on Feb. 5, 2021.

(51) Int. Cl.
*G06T 17/20* (2006.01)
*G06T 7/00* (2017.01)
*H04N 13/156* (2018.01)

(52) U.S. Cl.
CPC ............ *G06T 7/0004* (2013.01); *G06T 17/20* (2013.01); *H04N 13/156* (2018.05); *G06T 2200/08* (2013.01); *G06T 2200/24* (2013.01)

(58) Field of Classification Search
CPC ... G06T 7/0004; G06T 17/20; G06T 2200/08; G06T 2200/24; G06T 19/20;
(Continued)

(56) References Cited

U.S. PATENT DOCUMENTS 5,956,081 A    9/1999   Katz
6,747,687 B1   6/2004   Alves
(Continued)

FOREIGN PATENT DOCUMENTS

KR    20110036386 A  *  4/2011
NO    2021001337 A1    1/2021
WO    2021151412 A1    8/2021

OTHER PUBLICATIONS

International Search Report and Written Opinion issued in App. No. PCT/US2022/070489, mailing date Apr. 26, 2022, 11 pages.
(Continued)

*Primary Examiner* — Said M Elnoubi
(74) *Attorney, Agent, or Firm* — Kwan & Olynick LLP

(57) ABSTRACT

Damage to an object such as a vehicle may be detected and presented based at least in part on image data. In some configurations, image data may be detected by causing the object to pass through a gate or portal on which cameras are located. Alternatively, or additionally, image data may be selected by a user operating a camera and moving around the object. The cameras may capture image data, which may be combined and analyzed to detect damage. Some or all of the image data and/or analysis of the image data may be presented in a viewer, which may allow a user to perform actions such as navigating around the object in a virtual environment, identifying and viewing areas of the object where damage has been detected, and accessing the results of the analysis.

18 Claims, 52 Drawing Sheets

(58) Field of Classification Search
CPC .......... G06T 2219/2012; G06T 19/003; H04N 13/156; H04N 2013/0081
See application file for complete search history.

(56) References Cited

U.S. PATENT DOCUMENTS

| | | | |
|---|---|---|---|
| 7,920,959 | B1 | 4/2011 | Williams |
| 9,218,698 | B2 | 12/2015 | Ricci |
| 9,495,764 | B1 | 11/2016 | Boardman |
| 9,886,771 | B1 | 2/2018 | Chen |
| 10,187,629 | B2 | 1/2019 | Cabral |
| 10,319,094 | B1 | 6/2019 | Chen |
| 10,373,260 | B1 | 8/2019 | Haller, Jr. |
| 10,497,108 | B1 | 12/2019 | Knuffman |
| 2002/0186300 | A1 | 12/2002 | Hudson |
| 2010/0056221 | A1 | 3/2010 | Park |
| 2011/0262028 | A1 | 10/2011 | Lipson |
| 2011/0313936 | A1 | 12/2011 | Sieger |
| 2016/0283074 | A1 | 9/2016 | Drive |
| 2017/0132835 | A1 | 5/2017 | Halliday |
| 2018/0260793 | A1 | 9/2018 | Li |
| 2018/0293664 | A1 | 10/2018 | Zhang |
| 2019/0043220 | A1 | 2/2019 | Kumar |
| 2019/0095877 | A1 | 3/2019 | Li |
| 2019/0096057 | A1 | 3/2019 | Allen |
| 2019/0098214 | A1 | 3/2019 | Kurosawa |
| 2019/0135216 | A1 | 5/2019 | Church |
| 2019/0189007 | A1 | 6/2019 | Herman |
| 2019/0335156 | A1* | 10/2019 | Rusu ............... G06F 18/251 |
| 2020/0050890 | A1 | 2/2020 | Aizawa |
| 2020/0111203 | A1 | 4/2020 | Tan |
| 2020/0234488 | A1 | 7/2020 | Holzer |
| 2020/0257862 | A1 | 8/2020 | Kar |
| 2020/0322545 | A1* | 10/2020 | Magnuszewski ...... H04N 23/55 |
| 2020/0349757 | A1 | 11/2020 | Holzer |
| 2021/0176435 | A1 | 6/2021 | Krüger |
| 2021/0342997 | A1 | 11/2021 | Malreddy |

OTHER PUBLICATIONS

International Search Report and Written Opinion for App. No. PCT/US2021/059222, dated Feb. 24, 2022, 10 pages.
International Search Report and Written Opinion for App. No. PCT/US2021/059232, dated Mar. 7, 2022, 9 pages.
Office Action (Non-Final Rejection) dated Sep. 20, 2022 for U.S. Appl. No. 17/525,683 (pp. 1-14); Available in Patent Center.
Office Action (Non-Final Rejection) dated Mar. 2, 2023 for U.S. Appl. No. 17/525,657 (pp. 1-12); Available in Patent Center.
Office Action (Final Rejection) dated Mar. 10, 2023 for U.S. Appl. No. 17/525,683 (pp. 1-15); Available in Patent Center.
International Preliminary Report on Patentability issued in App. No. PCT/US2021/059222, mailing date Jun. 1, 2023, 6 pages.
International Preliminary Report on Patentability issued in App. No. PCT/US2021/059232, mailing date Jun. 1, 2023, 6 pages.
Office Action (Notice of Allowance and Fees Due (PTOL-85)) dated Aug. 21, 2023 for U.S. Appl. No. 17/525,657 (pp. 1-7); Available in Patent Center.
Office Action (Non-Final Rejection) dated Aug. 18, 2023 for U.S. Appl. No. 17/525,683 (pp. 1-14); Available in Patent Center.
Office Action (Final Rejection) dated Jan. 9, 2024 for U.S. Appl. No. 17/525,683 (pp. 1-14); Available in Patent Center.
Office Action (Non-Final Rejection) dated Apr. 30, 2024 for U.S. Appl. No. 17/649,793 (pp. 1-14); Available in Patent Center.
Office Action (Non-Final Rejection) dated Jun. 6, 2024 for U.S. Appl. No. 18/511,820 (pp. 1-14); Available in Patent Center.
Office Action (Non-Final Rejection) dated Jul. 24, 2024 for U.S. Appl. No. 17/525,683 (pp. 1-15); Available in Patent Center.

* cited by examiner

MULTI-VIEW INTERACTIVE DIGITAL MEDIA REPRESENTATION VIEWER

CROSS-REFERENCE TO RELATED APPLICATIONS

This application claims priority under 35 U.S.C. 120 to Provisional U.S. Patent App. No. 63/146,238 by Holzer et al., titled "MULTI-VIEW INTERACTIVE DIGITAL MEDIA REPRESENTATION VIEWER", filed Feb. 5, 2021, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

The present disclosure relates generally to the capture and presentation of image data of an object, and more specifically to image data of a vehicle undercarriage.

DESCRIPTION OF RELATED ART

Vehicles need to be inspected for damage on different occasions. For example, a vehicle may be inspected after an accident to evaluate or support an insurance claim or police report. As another example, a vehicle may be inspected before and after the rental of a vehicle, or before buying or selling a vehicle.

Vehicle inspection using conventional approaches is a largely manual process. Typically, a person walks around the vehicle and manually notes damage and conditions. This process is time-intensive, resulting in significant costs. The manual inspection results also vary based on the person. For example, a person may be more or less experienced in evaluating damage. The variation in results can yield a lack of trust and potential financial losses, for example when buying and selling vehicles or when evaluating insurance claims. Accordingly, improved techniques for vehicle damage detection and the presentation of associated information are needed.

DETAILED DESCRIPTION

According to various embodiments, techniques and mechanisms described herein may be used to identify and represent damage to an object such as a vehicle based at least in part on image data. In some configurations, image data may be detected by causing the object to pass through a gate or portal on which cameras are located. Alternatively, or additionally, image data may be selected by a user operating a camera and moving around the object. The cameras may capture image data, which may be combined and analyzed to detect damage. Some or all of the image data and/or analysis of the image data may be presented in a viewer, which may allow a user to perform actions such as navigating around the object in a virtual environment, identifying and viewing areas of the object where damage has been detected, and accessing the results of the analysis.

According to various embodiments, techniques and mechanisms described herein may be used to create damage estimates that are consistent over multiple captures. The damage detection techniques may be employed by untrained individuals. For example, an individual may collect multi-view data of an object, and the system may detect the damage automatically. In this way, damage estimates may be constructed in a manner that is independent of the individual wielding the camera and does not depend on the individual's expertise. In this way, the system can automatically detect damage, without requiring human intervention.

According to various embodiments, various types of damage may be detected. For a vehicle, such data may include, but is not limited to: scratches, dents, flat tires, cracked glass, broken glass, or other such damage. Although various techniques and mechanisms are described herein by way of example with reference to detecting damage to vehicles, these techniques and mechanisms are widely applicable to detecting damage to a range of objects. Such objects may include, but are not limited to: houses, apartments, hotel rooms, real property, personal property, equipment, jewelry, furniture, offices, people, and animals.

Figure 1:
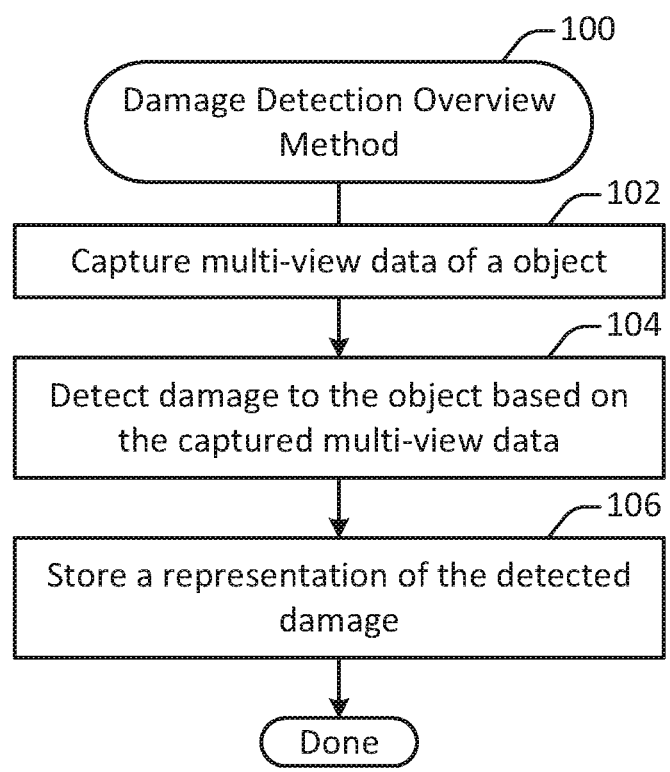
FIG. 1 illustrates a method for damage detection, performed in accordance with one or more embodiments.

FIG. 1 illustrates a method 100 for damage detection, performed in accordance with one or more embodiments. According to various embodiments, the method 100 may be performed at a damage detection portal or computing device in communication with a damage detection portal. A damage detection portal (also referred to herein as a gate) may refer to any fixed assembly on which cameras may be located and through which an object may pass. Alternately, or additionally, some or all of the method 100 may be performed at a remote computing device such as a server. The method 100 may be used to detect damage to any of various types of objects. However, for the purpose of illustration, many examples discussed herein will be described with reference to vehicles.

At 102, multi-view data of an object is captured. According to various embodiments, the multi-view data may include images captured from different viewpoints. For example, cameras may capture images from different angles. In some configurations, the multi-view data may include data from various types of sensors. For example, the multi-view data may include data from more than one camera. As another example, the multi-view data may include data from one or more depth sensors, weight sensors, inertial sensors, or other suitable sensors such as an inertial measurement unit (IMU). IMU data may include position information, acceleration information, rotation information, or other such data collected from one or more accelerometers or gyroscopes.

In particular embodiments, the multi-view data may be aggregated to construct a multi-view representation. Additional details regarding multi-view data and damage detection are discussed in co-pending and commonly assigned U.S. patent application Ser. No. 16/692,133, "DAMAGE DETECTION FROM MULTI-VIEW VISUAL DATA", by Holzer et al., filed Nov. 22, 2019, which is hereby incorporated by reference in its entirety and for all purposes.

At 104, damage to the object is detected based on the captured multi-view data. In some implementations, the damage may be detected by evaluating some or all of the multi-view data with a neural network, by comparing some or all of the multi-view data with reference data, and/or any other relevant operations for damage detection. Additional details regarding damage detection are discussed throughout the application.

At 106, a representation of the detected damage is stored on a storage medium or transmitted via a network. According to various embodiments, the representation may include some or all of a variety of information. For example, the representation may include an estimated dollar value. As another example, the representation may include a visual depiction of the damage. As still another example, a list of damaged parts may be provided. Alternatively, or additionally, the damaged parts may be highlighted in a 3D CAD model.

In some embodiments, a visual depiction of the damage may include an image of actual damage. For example, once the damage is identified at 104, one or more portions of the multi-view data that include images of the damaged portion of the object may be selected and/or cropped.

In some implementations, a visual depiction of the damage may include an abstract rendering of the damage. An abstract rendering may include a heatmap that shows the probability and/or severity of damage using a color scale. Alternatively, or additionally, an abstract rendering may represent damage using a wire-frame top-down view or other transformation. By presenting damage on a visual transformation of the object, damage (or lack thereof) to different sides of the object may be presented in a standardized manner.

Figure 2:
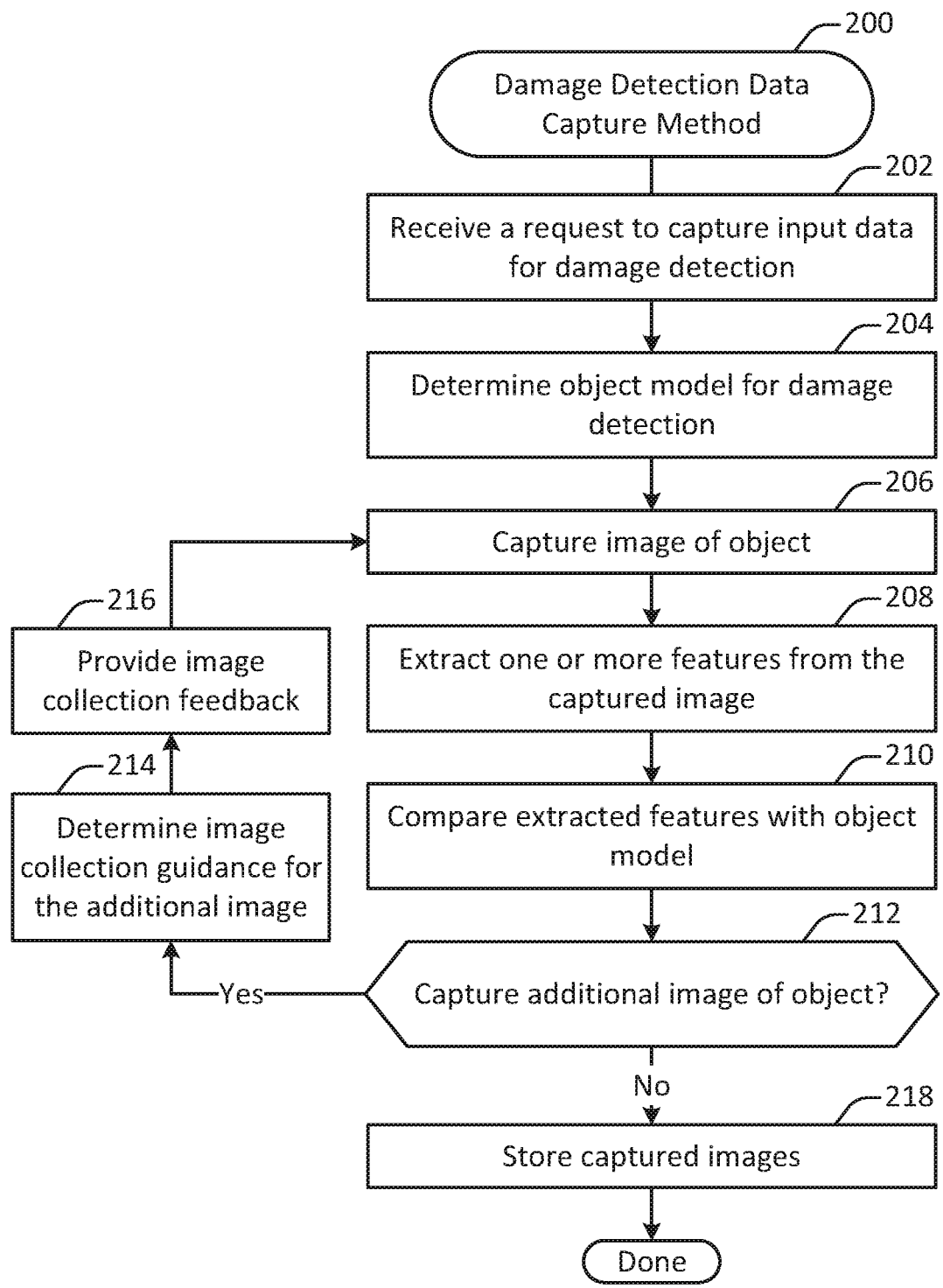
FIG. 2 illustrates a method of damage detection data capture, performed in accordance with one or more embodiments.

FIG. 2 illustrates a method 200 of damage detection data capture, performed in accordance with one or more embodiments. According to various embodiments, the method 200 may be performed at a damage detection portal or computing device in communication with a damage detection portal. The method 200 may be used to capture image data for detecting damage to any of various types of objects.

A request to capture input data for damage detection for an object is received at 202. In some implementations, the request to capture input data may be received at a damage detection portal or computing device in communication with a damage detection portal. In particular embodiments, the object may be a vehicle such as a car, truck, or sports utility vehicle.

An object model for damage detection is determined at 204. According to various embodiments, the object model may include reference data for use in evaluating damage and/or collecting images of an object. For example, the object model may include one or more reference images of similar objects for comparison. As another example, the object model may include a trained neural network. As yet another example, the object model may include one or more reference images of the same object captured at an earlier point in time. As yet another example, the object model may include a 3D model (such as a CAD model) or a 3D mesh reconstruction of the corresponding vehicle.

In some embodiments, the object model may be determined based on user input. For example, the user may identify a vehicle in general or a car, truck, or sports utility vehicle in particular as the object type.

In some implementations, the object model may be determined automatically based on data captured as part of the method 200. In this case, the object model may be determined after the capturing of one or more images at 206.

At 206, an image of the object is captured. According to various embodiments, capturing the image of the object may involve receiving data from one or more of various sensors. Such sensors may include, but are not limited to, one or more cameras, depth sensors, accelerometers, and/or gyroscopes. The sensor data may include, but is not limited to, visual data, motion data, and/or orientation data. In some configurations, more than one image of the object may be captured. Alternatively, or additionally, video footage may be captured.

According to various embodiments, a camera or other sensor located at a computing device may be communicably coupled with the computing device in any of various ways. For example, in the case of a mobile phone or laptop, the camera may be physically located within the computing device. As another example, in some configurations a camera or other sensor may be connected to the computing device via a cable. As still another example, a camera or other sensor may be in communication with the computing device via a wired or wireless communication link.

According to various embodiments, as used herein the term "depth sensor" may be used to refer to any of a variety of sensor types that may be used to determine depth information. For example, a depth sensor may include a projector and camera operating in infrared light frequencies. As another example, a depth sensor may include a projector and camera operating in visible light frequencies. For instance, a line-laser or light pattern projector may project a visible light pattern onto an object or surface, which may then be detected by a visible light camera.

One or more features of the captured image or images are extracted at 208. In some implementations, extracting one or more features of the object may involve constructing a multi-view capture that presents the object from different viewpoints. If a multi-view capture has already been constructed, then the multi-view capture may be updated based on the new image or images captured at 206. Alternatively, or additionally, feature extraction may involve performing one or more operations such as object recognition, component identification, orientation detection, or other such steps.

At 210, the extracted features are compared with the object model. According to various embodiments, comparing the extracted features to the object model may involve making any comparison suitable for determining whether the captured image or images are sufficient for performing damage comparison. Such operations may include, but are not limited to: applying a neural network to the captured image or images, comparing the captured image or images to one or more reference images, and/or performing any of the operations discussed with respect to FIGS. 3 and 4.

A determination is made at 212 as to whether to capture an additional image of the object. In some implementations, the determination may be made at least in part based on an analysis of the one or more images that have already been captured.

In some embodiments, a preliminary damage analysis may be implemented using as input the one or more images that have been captured. If the damage analysis is inconclusive, then an additional image may be captured. Techniques for conducting damage analysis are discussed in additional detail with respect to the methods 300 and 400 shown in FIGS. 3 and 4.

In some embodiments, the system may analyze the captured image or images to determine whether a sufficient portion of the object has been captured in sufficient detail to support damage analysis. For example, the system may analyze the capture image or images to determine whether the object is depicted from all sides. As another example, the system may analyze the capture image or images to determine whether each panel or portion of the object is shown in a sufficient amount of detail. As yet another example, the system may analyze the capture image or images to determine whether each panel or portion of the object is shown from a sufficient number of viewpoints.

If the determination is made to capture an additional image, then at 214 image collection guidance for capturing the additional image is determined. In some implementations, the image collection guidance may include any suitable instructions for capturing an additional image that may assist in changing the determination made at 212. Such guidance may include an indication to capture an additional image from a targeted viewpoint, to capture an additional image of a designated portion of the object, or to capture an additional image at a different level of clarity or detail. For example, if possible damage is detected, then feedback may be provided to capture additional detail at the damaged location.

At 216, image collection feedback is provided. According to various embodiments, the image collection feedback may include any suitable instructions or information for assisting a user in collecting additional images. Such guidance may include, but is not limited to, instructions to collect an image at a targeted camera position, orientation, or zoom level. Alternatively, or additionally, a user may be presented with instructions to capture a designated number of images or an image of a designated portion of the object.

For example, a user may be presented with a graphical guide to assist the user in capturing an additional image from a target perspective. As another example, a user may be presented with written or verbal instructions to guide the user in capturing an additional image.

When it is determined to not capture an additional image of the object, then at 218 the captured image or images are stored. In some implementations, the captured images may be stored on a storage device and used to perform damage detection, as discussed with respect to the methods 300 and 400 in FIGS. 3 and 4. Alternatively, or additionally, the images may be transmitted to a remote location via a network interface.

Figure 3:
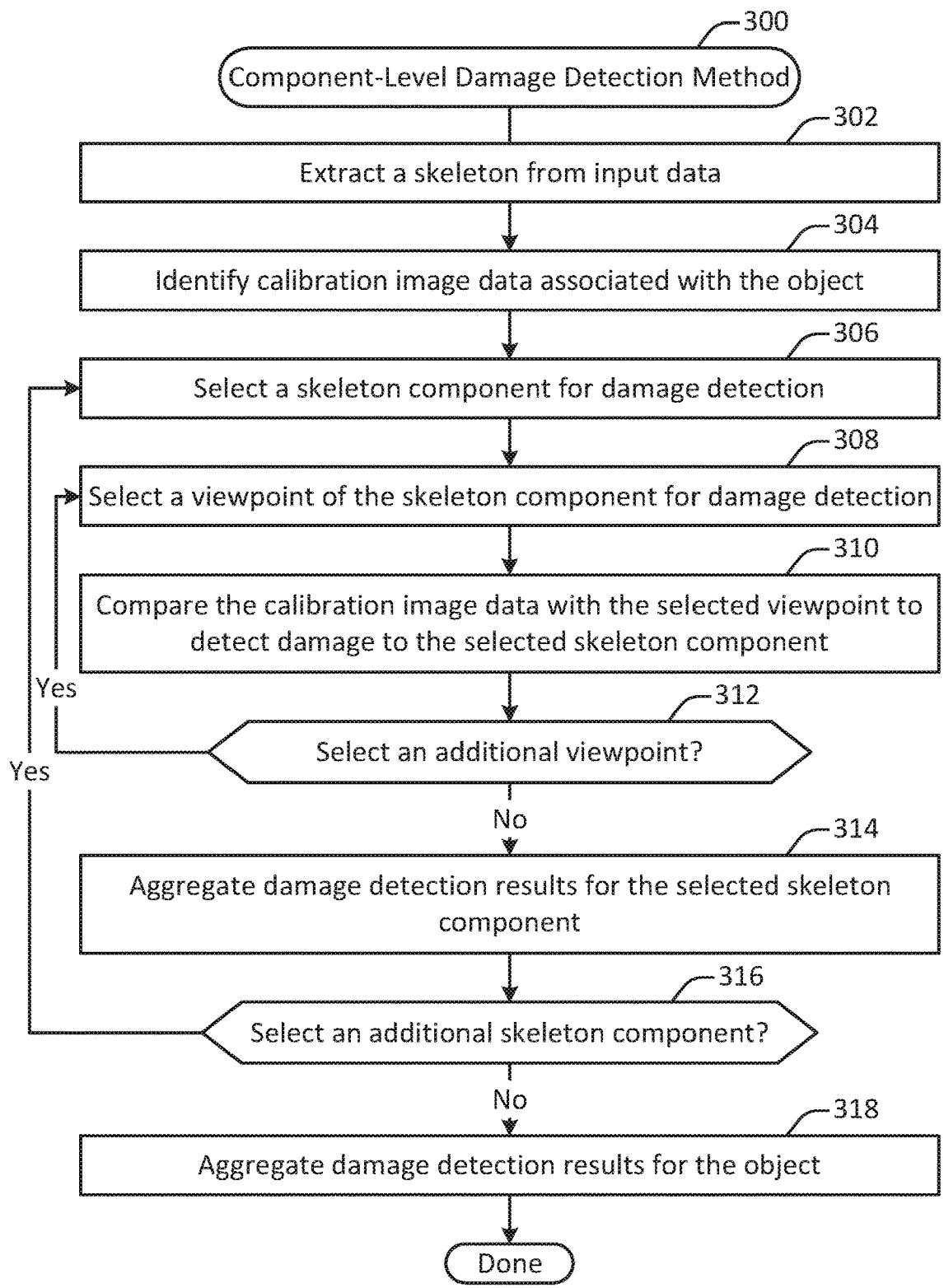
FIG. 3 illustrates a method for component-level damage detection, performed in accordance with one or more embodiments.

FIG. 3 illustrates a method 300 for component-level damage detection, performed in accordance with one or more embodiments. According to various embodiments, the method 300 may be performed at a damage detection portal or computing device in communication with a damage detection portal. The method 300 may be used to detect damage to any of various types of objects. However, for the purpose of illustration, many examples discussed herein will be described with reference to vehicles.

A skeleton is extracted from input data at 302. According to various embodiments, the input data may include visual data collected as discussed with respect to the method 300 shown in FIG. 3. Alternatively, or additionally, the input data may include previously collected visual data, such as visual data collected without the use of recording guidance.

In some implementations, the input data may include one or more images of the object captured from different perspectives. Alternatively, or additionally, the input data may include video data of the object. In addition to visual data, the input data may also include other types of data, such as IMU data.

According to various embodiments, skeleton detection may involve one or more of a variety of techniques. Such techniques may include, but are not limited to: 2D skeleton detection using machine learning, 3D pose estimation, and 3D reconstruction of a skeleton from one or more 2D skeletons and/or poses.

Calibration image data associated with the object is identified at 304. According to various embodiments, the calibration image data may include one or more reference images of similar objects or of the same object at an earlier point in time. Alternatively, or additionally, the calibration image data may include a neural network used to identify damage to the object.

A skeleton component is selected for damage detection at 306. In some implementations, a skeleton component may represent a panel of the object. In the case of a vehicle, for example, a skeleton component may represent a door panel, a window, or a headlight. Skeleton components may be selected in any suitable order, such as sequentially, randomly, in parallel, or by location on the object.

According to various embodiments, when a skeleton component is selected for damage detection, a multi-view capture of the skeleton component may be constructed. Constructing a multi-view capture of the skeleton component may involve identifying different images in the input data that capture the skeleton component from different viewpoints. The identified images may then be selected, cropped, and combined to produce a multi-view capture specific to the skeleton component.

A viewpoint of the skeleton component is selected for damage detection at 304. In some implementations, each viewpoint included in the multi-view capture of the skeleton component may be analyzed independently. Alternatively, or additionally, more than one viewpoint may be analyzed simultaneously, for instance by providing the different viewpoints as input data to a machine learning model trained to identify damage to the object. In particular embodiments, the input data may include other types of data, such as 3D visual data or data captured using a depth sensor or other type of sensor.

According to various embodiments, one or more alternatives to skeleton analysis at 302-310 may be used. For example, an object part (e.g., vehicle component) detector may be used to directly estimate the object parts. As another example, an algorithm such as a neural network may be used to map an input image to a top-down view of an object such as a vehicle (and vice versa) in which the components are defined. As yet another example, an algorithm such as a neural network that classifies the pixels of an input image as a specific component can be used to identify the components. As still another example, component-level detectors may be used to identify specific components of the object. As yet another alternative, a 3D reconstruction of the vehicle may be computed and a component classification algorithm may be run on that 3D model. The resulting classification can then be back-projected into each image. As still another alternative, a 3D reconstruction of the vehicle can be computed and fitted to an existing 3D CAD model of the vehicle in order to identify the single components.

At 310, the calibration image data is compared with the selected viewpoint to detect damage to the selected skeleton component. According to various embodiments, the comparison may involve applying a neural network to the input data. Alternatively, or additionally, an image comparison between the selected viewpoint and one or more reference images of the object captured at an earlier point in time may be performed.

A determination is made at 312 as to whether to select an additional viewpoint for analysis. According to various embodiments, additional viewpoints may be selected until all available viewpoints are analyzed. Alternatively, viewpoints may be selected until the probability of damage to the selected skeleton component has been identified to a designated degree of certainty.

Damage detection results for the selected skeleton component are aggregated at 314. According to various embodiments, damage detection results from different viewpoints to a single damage detection result per panel resulting in a damage result for the skeleton component. For example, a heatmap may be created that shows the probability and/or severity of damage to a vehicle panel such as a vehicle door. According to various embodiments, various types of aggregation approaches may be used. For example, results determined at 310 for different viewpoints may be averaged. As another example, different results may be used to "vote" on a common representation such as a top-down view. Then, damage may be reported if the votes are sufficiently consistent for the panel or object portion.

A determination is made at 316 as to whether to select an additional skeleton component for analysis. In some implementations, additional skeleton components may be selected until all available skeleton components are analyzed.

Damage detection results for the object are aggregated at 314. According to various embodiments, damage detection results for different components may be aggregated into a single damage detection result for the object as a whole. For example, creating the aggregated damage results may involve creating a top-down view. As another example, creating the aggregated damage results may involve identifying standardized or appropriate viewpoints of portions of the object identified as damaged. As yet another example, creating the aggregated damage results may involve tagging damaged portions in a multi-view representation. As still another example, creating the aggregated damage results may involve overlaying a heatmap on a multi-view representation. As yet another example, creating the aggregated damage results may involve selecting affected parts and presenting them to the user. Presenting may be done as a list, as highlighted elements in a 3D CAD model, or in any other suitable fashion.

In particular embodiments, techniques and mechanisms described herein may involve a human to provide additional input. For example, a human may review damage results, resolve inconclusive damage detection results, or select damage result images to include in a presentation view. As another example, human review may be used to train one or more neural networks to ensure that the results computed are correct and are adjusted as necessary.

Figure 4:
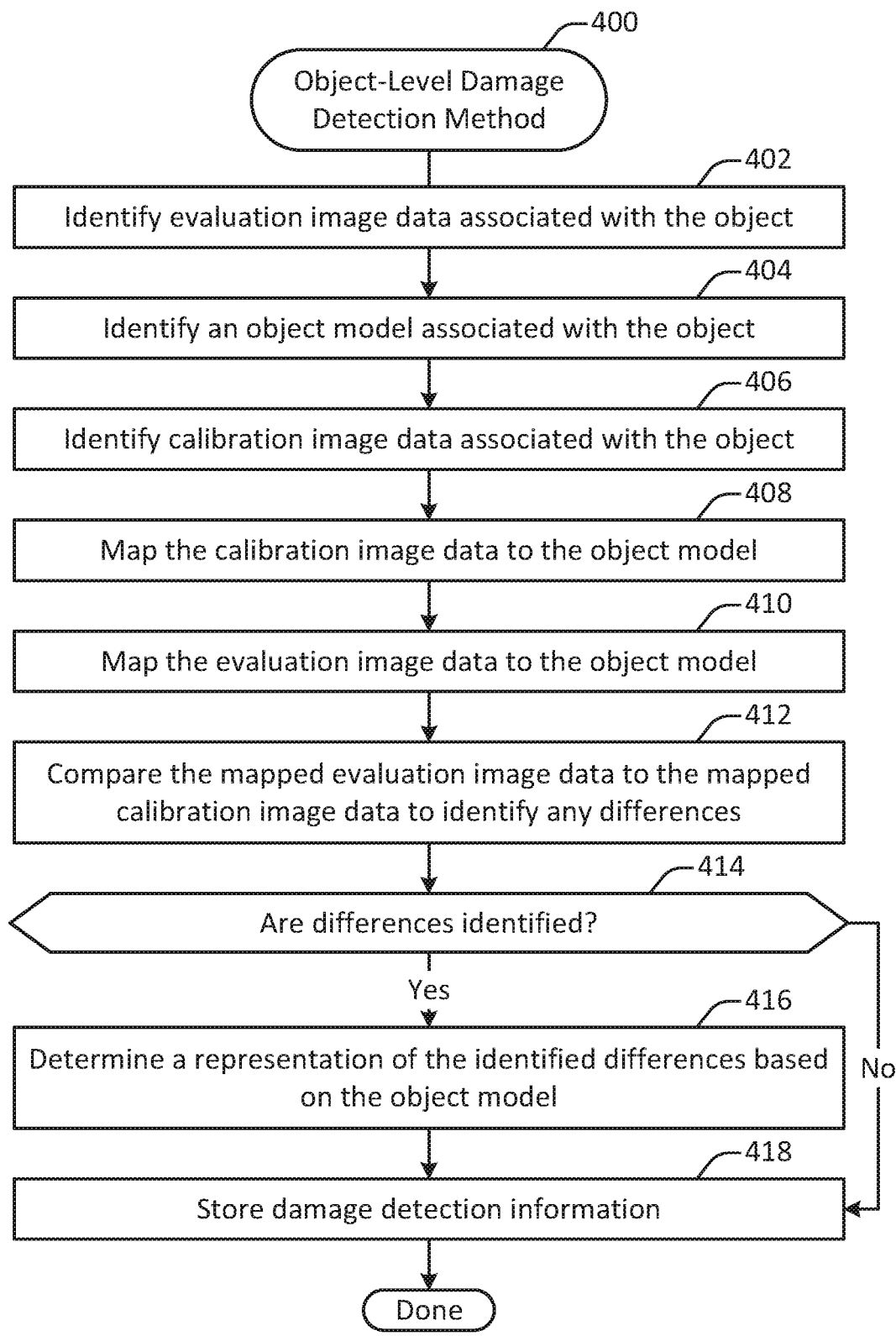
FIG. 4 illustrates an object-level damage detection method, performed in accordance with one or more embodiments.

FIG. 4 illustrates an object-level damage detection method 400, performed in accordance with one or more embodiments. The method 400 may be performed at a damage detection portal or computing device in communication with a damage detection portal. Alternatively, the method 400 may be performed at a different type of computing device and may be used to process image data collected via another method, such as handheld capture. The method 400 may be used to detect damage to any of various types of objects.

Evaluation image data associated with the object is identified at 402. According to various embodiments, the evaluation image data may include single images captured from different viewpoints. As discussed herein, the single images may be aggregated into a multi-view capture, which may include data other than images, such as IMU data.

An object model associated with the object is identified at 404. In some implementations, the object model may include a 2D or 3D standardized mesh, model, or abstracted representation of the object. For instance, the evaluation image data may be analyzed to determine the type of object that is represented. Then, a standardized model for that type of object may be retrieved. Alternatively, or additionally, a user may select an object type or object model to use. The object model may include a top-down view of the object.

Calibration image data associated with the object is identified at 406. According to various embodiments, the calibration image data may include one or more reference images. The reference images may include one or more images of the object captured at an earlier point in time. Alternatively, or additionally, the reference images may include one or more images of similar objects. For example, a reference image may include an image of the same type of car as the car in the images being analyzed.

In some implementations, the calibration image data may include a neural network trained to identify damage. For instance, the calibration image data may be trained to analyze damage from the type of visual data included in the evaluation data.

The calibration data is mapped to the object model at 408. In some implementations, mapping the calibration data to the object model may involve mapping a perspective view of an object from the calibration images to a top-down view of the object.

The evaluation image data is mapped to the object model at 410. In some implementations, mapping the evaluation image data to the object model may involve determine a pixel-by-pixel correspondence between the pixels of the image data and the points in the object model. Performing such a mapping may involve determining the camera position and orientation for an image from IMU data associated with the image.

In some embodiments, a dense per-pixel mapping between an image and the top-down view may be estimated at 410. Alternatively, or additionally, location of center of an image may be estimated with respect to the top-down view. For example, a machine learning algorithm such as deep net may be used to map the image pixels to coordinates in the top-down view. As another example, joints of a 3D skeleton of the object may be estimated and used to define the mapping. As yet another example, component-level detectors may be used to identify specific components of the object.

In some embodiments, the location of one or more object parts within the image may be estimated. Those locations may then be used to map data from the images to the top-down view. For example, object parts may be classified on a pixel-wise basis. As another example, the center location of object parts may be determined. As another example, the joints of a 3D skeleton of an object may be estimated and used to define the mapping. As yet another example, component-level detectors may be used for specific object components.

In some implementations, images may be mapped in a batch via a neural network. For example, a neural network may receive as input a set of images of an object captured from different perspectives. The neural network may then detect damage to the object as a whole based on the set of input images.

The mapped evaluation image data is compared to the mapped calibration image data at 412 to identify any differences. According to various embodiments, the data may be compared by running a neural network on a multi-view representation as a whole. Alternatively, or additional, the evaluation and image data may be compared on an image-by-image basis.

If it is determined at 414 that differences are identified, then at 416 a representation of the identified differences is determined. According to various embodiments, the representation of the identified differences may involve a heatmap of the object as a whole. For example, a heatmap of a top-down view of a vehicle showing damage is illustrated in FIG. 2. Alternatively, one or more components that are damaged may be isolated and presented individually.

At 418, a representation of the detected damage is stored on a storage medium or transmitted via a network. In some implementations, the representation may include an estimated dollar value. Alternatively, or additionally, the representation may include a visual depiction of the damage. Alternatively, or additionally, affected parts may be presented as a list and/or highlighted in a 3D CAD model.

In particular embodiments, damage detection of an overall object representation may be combined with damage representation on one or more components of the object. For example, damage detection may be performed on a closeup of a component if an initial damage estimation indicates that damage to the component is likely.

Figure 5:
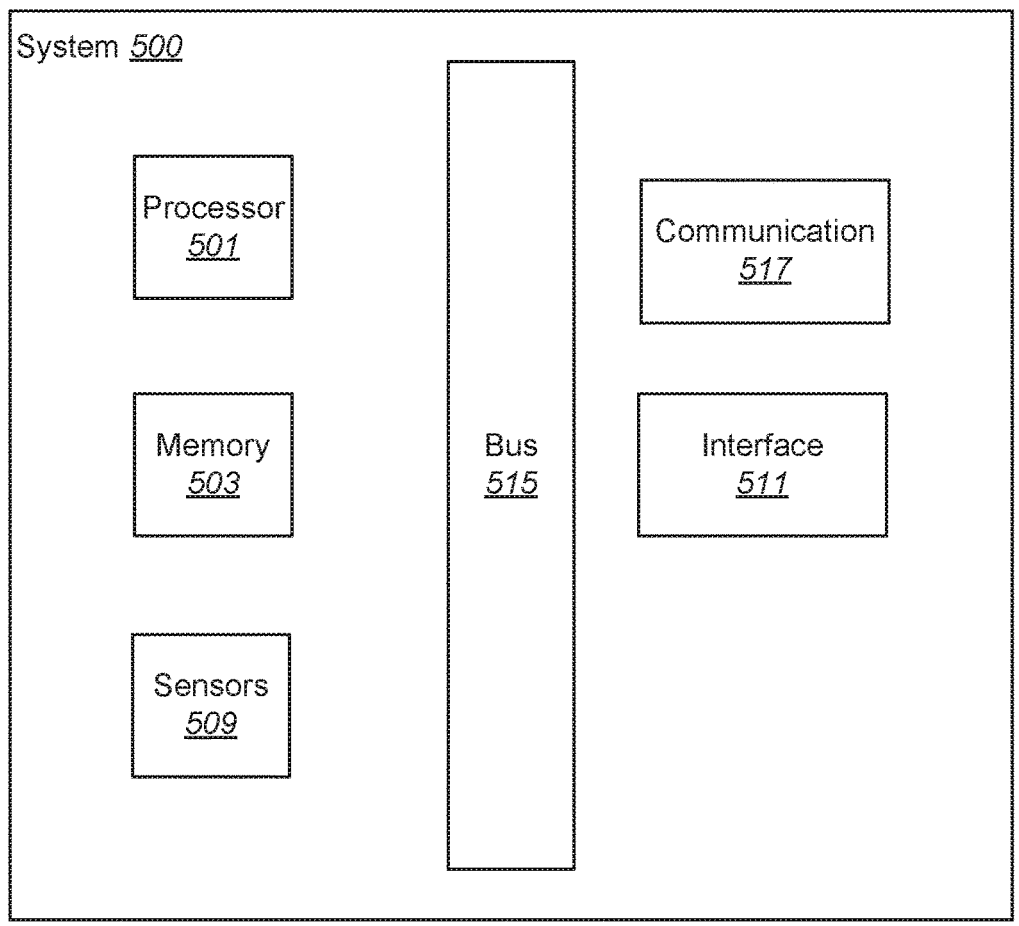
FIG. 5 illustrates a computer system configured in accordance with one or more embodiments.

With reference to FIG. 5, shown is a particular example of a computer system that can be used to implement particular examples. For instance, the computer system 500 can be used to provide multi-view interactive digital media representations ("MVIDMRs") according to various embodiments described above. According to various embodiments, a system 500 suitable for implementing particular embodiments includes a processor 501, a memory 503, an interface 511, and a bus 515 (e.g., a PCI bus).

The system 500 can include one or more sensors 509, such as light sensors, accelerometers, gyroscopes, microphones, cameras including stereoscopic or structured light cameras. As described above, the accelerometers and gyroscopes may be incorporated in an IMU. The sensors can be used to detect movement of a device and determine a position of the device. Further, the sensors can be used to provide inputs into the system. For example, a microphone can be used to detect a sound or input a voice command.

In the instance of the sensors including one or more cameras, the camera system can be configured to output native video data as a live video feed. The live video feed can be augmented and then output to a display, such as a display on a mobile device. The native video can include a series of frames as a function of time. The frame rate is often described as frames per second (fps). Each video frame can be an array of pixels with color or gray scale values for each pixel. For example, a pixel array size can be 512 by 512 pixels with three color values (red, green and blue) per pixel. The three color values can be represented by varying amounts of bits, such as 24, 30, 5, 40 bits, etc. per pixel. When more bits are assigned to representing the RGB color values for each pixel, a larger number of colors values are possible. However, the data associated with each image also increases. The number of possible colors can be referred to as the color depth.

The video frames in the live video feed can be communicated to an image processing system that includes hardware and software components. The image processing system can include non-persistent memory, such as random-access memory (RAM) and video RAM (VRAM). In addition, processors, such as central processing units (CPUs) and graphical processing units (GPUs) for operating on video data and communication busses and interfaces for transporting video data can be provided. Further, hardware and/or software for performing transformations on the video data in a live video feed can be provided.

In particular embodiments, the video transformation components can include specialized hardware elements configured to perform functions necessary to generate a synthetic image derived from the native video data and then augmented with virtual data. In data encryption, specialized hardware elements can be used to perform a specific data transformation, i.e., data encryption associated with a specific algorithm. In a similar manner, specialized hardware elements can be provided to perform all or a portion of a specific video data transformation. These video transformation components can be separate from the GPU(s), which are specialized hardware elements configured to perform graphical operations. All or a portion of the specific transformation on a video frame can also be performed using software executed by the CPU.

The processing system can be configured to receive a video frame with first RGB values at each pixel location and apply operation to determine second RGB values at each pixel location. The second RGB values can be associated with a transformed video frame which includes synthetic data. After the synthetic image is generated, the native video frame and/or the synthetic image can be sent to a persistent memory, such as a flash memory or a hard drive, for storage. In addition, the synthetic image and/or native video data can be sent to a frame buffer for output on a display or displays associated with an output interface. For example, the display can be the display on a mobile device or a view finder on a camera.

In general, the video transformations used to generate synthetic images can be applied to the native video data at its native resolution or at a different resolution. For example, the native video data can be a 512 by 512 array with RGB values represented by 24 bits and at frame rate of 24 fps. In some embodiments, the video transformation can involve operating on the video data in its native resolution and outputting the transformed video data at the native frame rate at its native resolution.

In other embodiments, to speed up the process, the video transformations may involve operating on video data and outputting transformed video data at resolutions, color depths and/or frame rates different than the native resolutions. For example, the native video data can be at a first video frame rate, such as 24 fps. But, the video transformations can be performed on every other frame and synthetic images can be output at a frame rate of 12 fps. Alternatively, the transformed video data can be interpolated from the 12 fps rate to 24 fps rate by interpolating between two of the transformed video frames.

In another example, prior to performing the video transformations, the resolution of the native video data can be reduced. For example, when the native resolution is 512 by 512 pixels, it can be interpolated to a 256 by 256 pixel array using a method such as pixel averaging and then the transformation can be applied to the 256 by 256 array. The transformed video data can output and/or stored at the lower 256 by 256 resolution. Alternatively, the transformed video data, such as with a 256 by 256 resolution, can be interpolated to a higher resolution, such as its native resolution of 512 by 512, prior to output to the display and/or storage. The coarsening of the native video data prior to applying the video transformation can be used alone or in conjunction with a coarser frame rate.

As mentioned above, the native video data can also have a color depth. The color depth can also be coarsened prior to applying the transformations to the video data. For example, the color depth might be reduced from 40 bits to 24 bits prior to applying the transformation.

As described above, native video data from a live video can be augmented with virtual data to create synthetic images and then output in real-time. In particular embodiments, real-time can be associated with a certain amount of latency, i.e., the time between when the native video data is captured and the time when the synthetic images including portions of the native video data and virtual data are output. In particular, the latency can be less than 100 milliseconds. In other embodiments, the latency can be less than 50 milliseconds. In other embodiments, the latency can be less than 30 milliseconds. In yet other embodiments, the latency can be less than 20 milliseconds. In yet other embodiments, the latency can be less than 10 milliseconds.

The interface 511 may include separate input and output interfaces, or may be a unified interface supporting both operations. Examples of input and output interfaces can include displays, audio devices, cameras, touch screens, buttons and microphones. When acting under the control of appropriate software or firmware, the processor 501 is responsible for such tasks such as optimization. Various specially configured devices can also be used in place of a processor 501 or in addition to processor 501, such as graphical processor units (GPUs). The complete implementation can also be done in custom hardware. The interface 511 is typically configured to send and receive data packets or data segments over a network via one or more communication interfaces, such as wireless or wired communication interfaces. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 500 uses memory 503 to store data and program instructions and maintained a local side cache. The program instructions may control the operation of an operating system and/or one or more applications, for example. The memory or memories may also be configured to store received metadata and batch requested metadata.

The system 500 can be integrated into a single device with a common housing. For example, system 500 can include a camera system, processing system, frame buffer, persistent memory, output interface, input interface and communication interface. In various embodiments, the single device can be a mobile device like a smart phone, an augmented reality and wearable device like Google Glass™ or a virtual reality head set that includes a multiple cameras, like a Microsoft Hololens™. In other embodiments, the system 500 can be partially integrated. For example, the camera system can be a remote camera system. As another example, the display can be separate from the rest of the components like on a desktop PC.

In the case of a wearable system, like a head-mounted display, as described above, a virtual guide can be provided to help a user record a MVIDMR. In addition, a virtual guide can be provided to help teach a user how to view a MVIDMR in the wearable system. For example, the virtual guide can be provided in synthetic images output to head mounted display which indicate that the MVIDMR can be viewed from different angles in response to the user moving some manner in physical space, such as walking around the projected image. As another example, the virtual guide can be used to indicate a head motion of the user can allow for different viewing functions. In yet another example, a virtual guide might indicate a path that a hand could travel in front of the display to instantiate different viewing functions.

Figure 6:
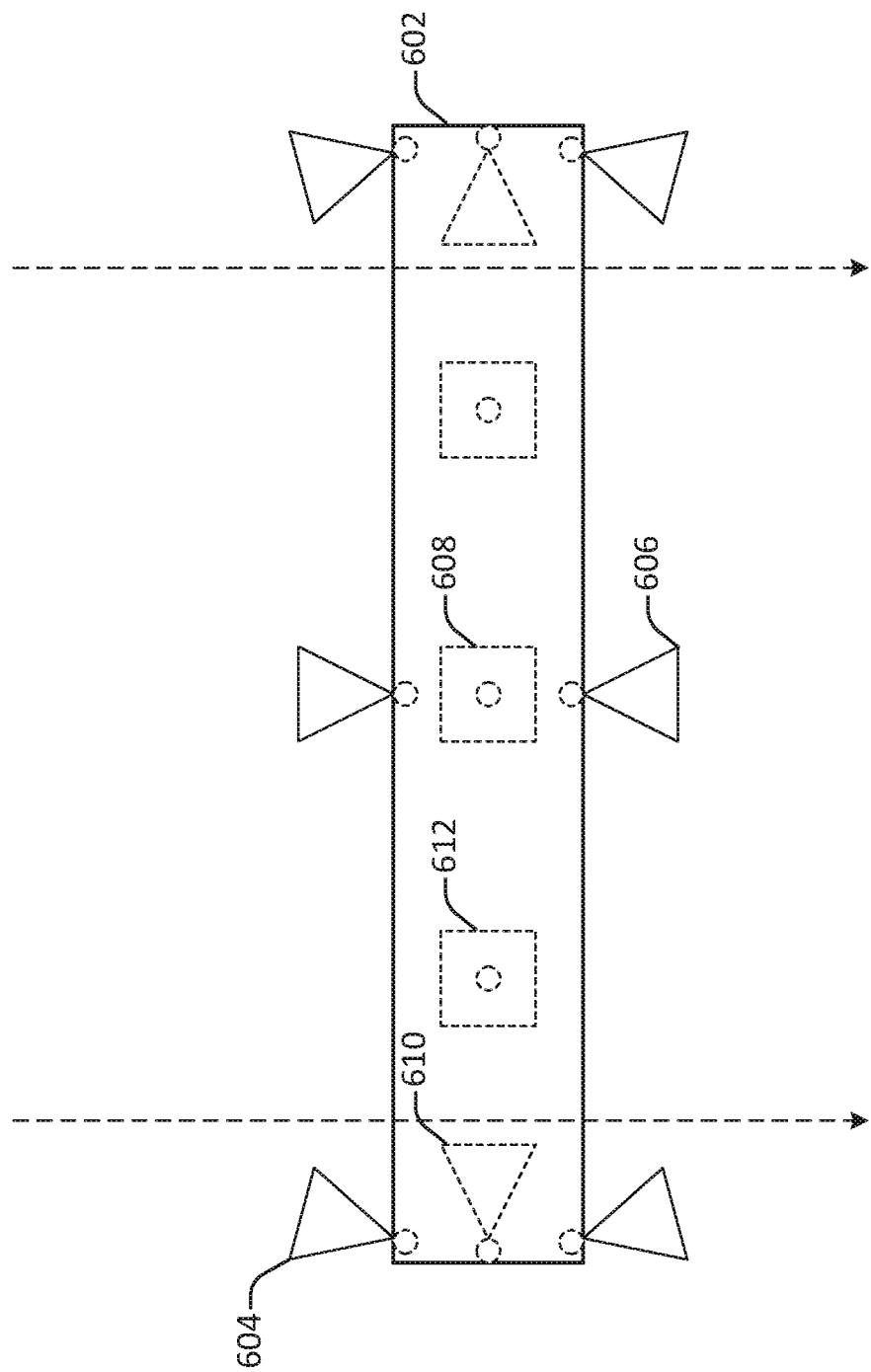
FIG. 6 shows a top-down diagram of a damage detection portal arranged as a gate, configured in accordance with one or more embodiments.
Figure 7:
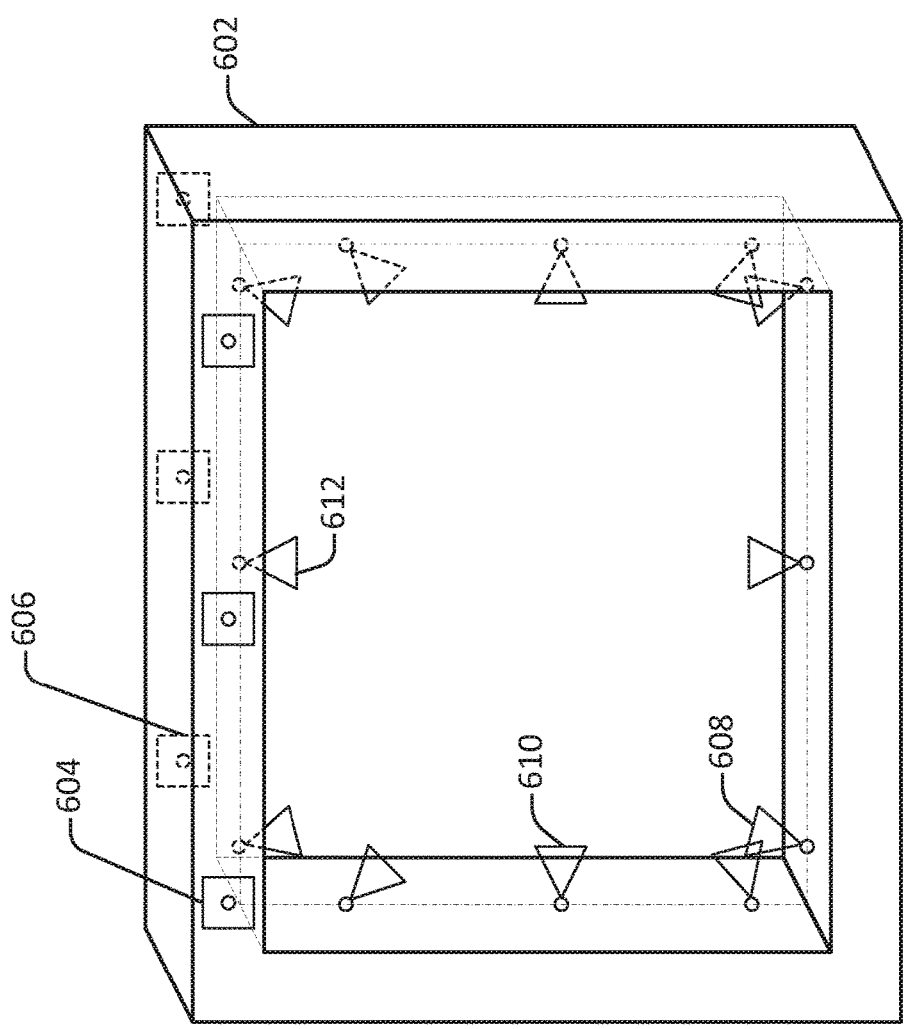
FIG. 7 shows a perspective diagram of a damage detection portal arranged as a gate, configured in accordance with one or more embodiments.

FIG. 6 shows a top-down diagram of a damage detection portal 602 arranged as a gate, configured in accordance with one or more embodiments. FIG. 7 shows a perspective diagram of the same damage portal 602. The damage detection portal 602 is configured as a gate through which a vehicle may be driven. The damage detection portal 602 includes a number of cameras, such as the cameras 604, 606, 608, and 610. The camera 604 is configured to point toward the front as the vehicle drives through the gate. The camera 606 is configured to point toward the back as the vehicle leaves the gate. The camera 610 is configured to point toward the interior area of the gate. The camera 608 is configured to point down toward the top of the vehicle. The camera 612 is configured to point up toward the undercarriage of the vehicle. Various configurations of cameras are possible.

In particular embodiments, an image of a vehicle, for instance an image of the vehicle's undercarriage, may be created from two or more images captured by one, two, or more cameras. For example, the vehicle may be driven over two or more undercarriage cameras, which may each capture images of a portion of the vehicle's undercarriage. Those images may then be combined to yield a more complete image of the vehicle's undercarriage, for example, by including portions of the undercarriage that are not visible at the same time to a single camera.

In particular embodiments, an image of a vehicle may be created in an interactive fashion. For example, by creating an image of a vehicle's undercarriage based on different images captured with multiple cameras, a user may be able to change the view direction and look behind portions of the undercarriage by switching to a camera with a different view. As another example, one or more cameras may be movable, for instance by being mounted on a track and/or gimbal. In this way, the system may allow a camera to be repositioned to attain a different viewpoint, for instance to look behind an object in the undercarriage.

In particular embodiments, two or more of the cameras associated with the damage detection portal 602 may be synchronized. When cameras are synchronized, they may be configured to capture images at the same time or at nearly the same time. Alternatively, or additionally, synchronized cameras may be configured to capture images that are staggered in time by a fixed time period. By employing synchronized cameras, the images captured from the cameras may be more easily linked. For instance, synchronizing cameras on the left and right side of the damage detection portal may ensure that in a given image precisely the same portion of the vehicle is captured on the right side as by the corresponding camera on the left side.

Figure 8:
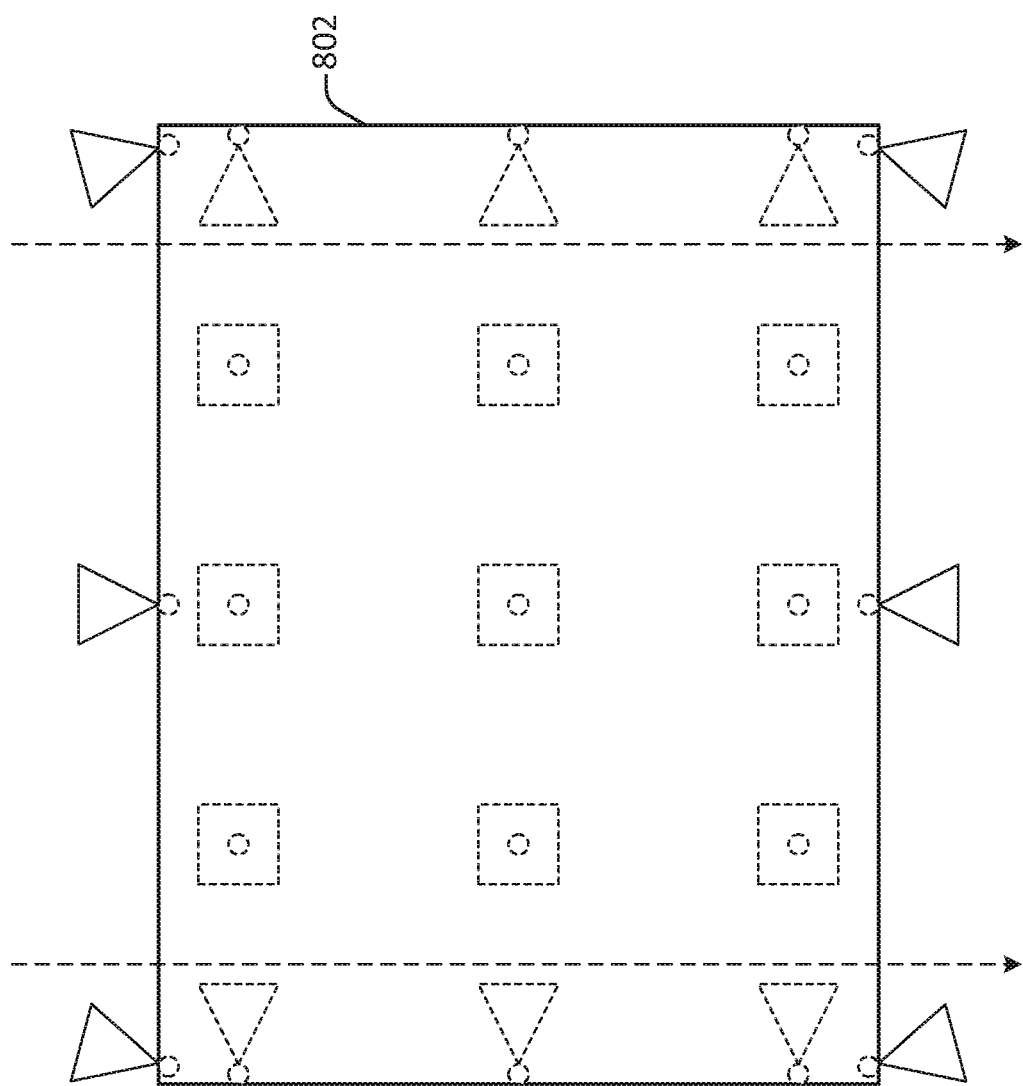
FIG. 8 shows a top-down diagram of a damage detection portal arranged as a tunnel, configured in accordance with one or more embodiments.
Figure 9:
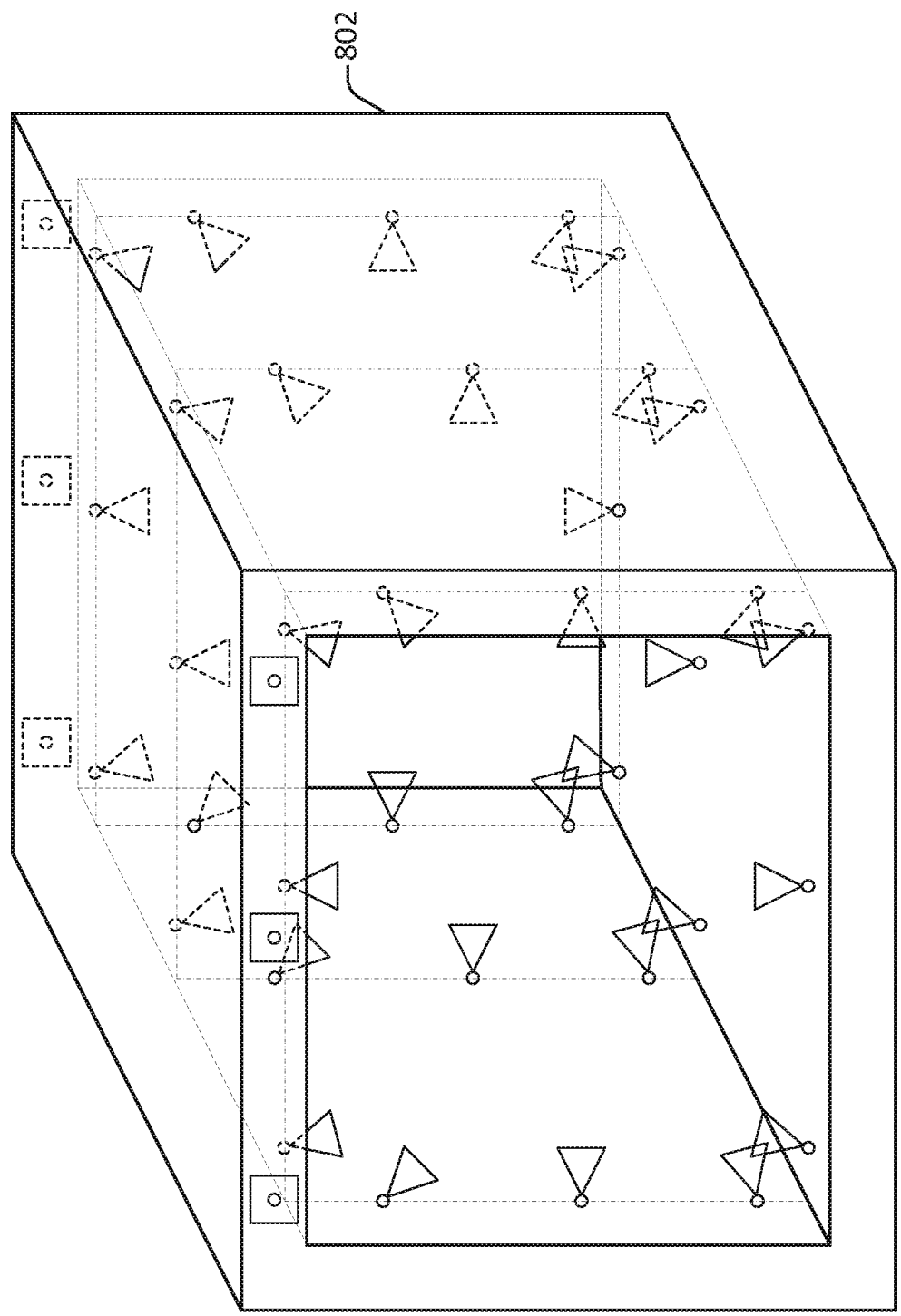
FIG. 9 shows a perspective diagram of a damage detection portal arranged as a tunnel, configured in accordance with one or more embodiments.

FIG. 8 shows a top-down diagram of a damage detection portal 802 arranged as a tunnel. FIG. 9 shows a perspective diagram of the same damage portal 802.

In particular embodiments, a damage detection portal may be configured as a turntable. In such a configuration, a vehicle may first be positioned onto the turntable. The turntable may then rotate to present the vehicle at different angles to one or more fixed cameras. Alternatively, a turntable configuration may leave the vehicle in a fixed position while a camera assembly rotates around the vehicle. As yet another example, both the vehicle and the camera assembly may be rotated, for instance in opposite directions.

According to various embodiments, in a turntable configuration, the turntable may rotate any suitable amount. For instance, the turntable may rotate 360 degrees, 720 degrees, or 180 degrees.

Figure 10B:
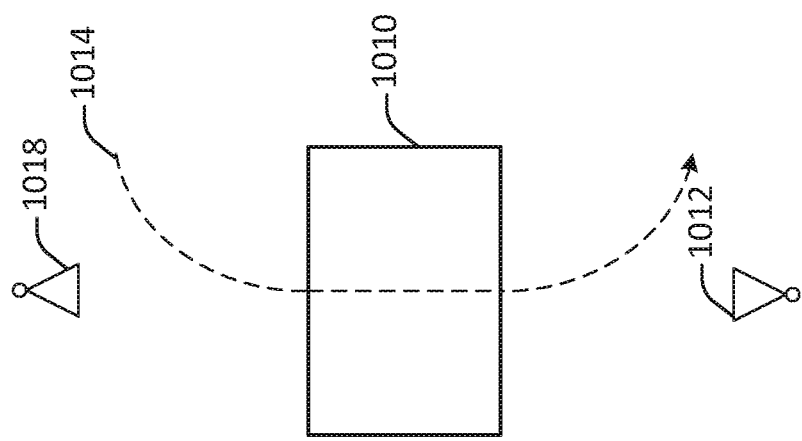
FIGS. 10A, 10B, 11A, and 11B show top-down views of a damage detection portal, configured in accordance with various embodiments.
Figure 10A:
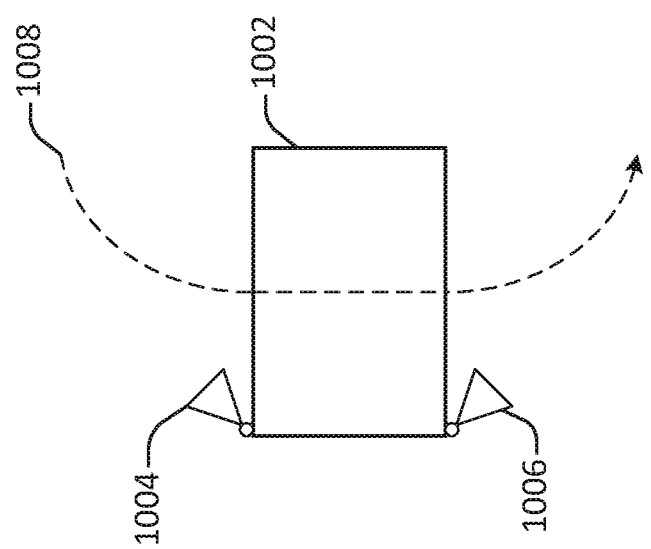

FIG. 10A shows a top-down view of a damage detection portal 1002. The damage detection portal 1002 is configured to employ a drive path 1008 that is curved both entering and leaving the damage detection portal 1002. Due to the configuration of the cameras and the drive path, the camera 1004 is configured to capture images of a vehicle head-on at a neutral elevation (also referred to as a "hero shot") as the vehicle drives toward the camera and then turns into the damage detection portal. Similarly, the camera 1006 is configured to capture images of the vehicle tail-on at a neutral elevation as the vehicle leaves the damage detection portal 1002 and then curves away from the portal.

FIG. 10B shows a top-down view of a damage detection portal 1010. The damage detection portal 1010 is configured to employ a drive path 1014 that is curved both entering and leaving the damage detection portal 1010. Due to the configuration of the cameras and the drive path, the camera 1018 is configured to capture images of a vehicle tail-on at a neutral elevation as the vehicle drives toward the camera and then turns into the damage detection portal. Similarly, the camera 1012 is configured to capture images of the vehicle head-on at a neutral elevation as the vehicle leaves the damage detection portal 1002 and then curves away from the portal.

Figure 11B:
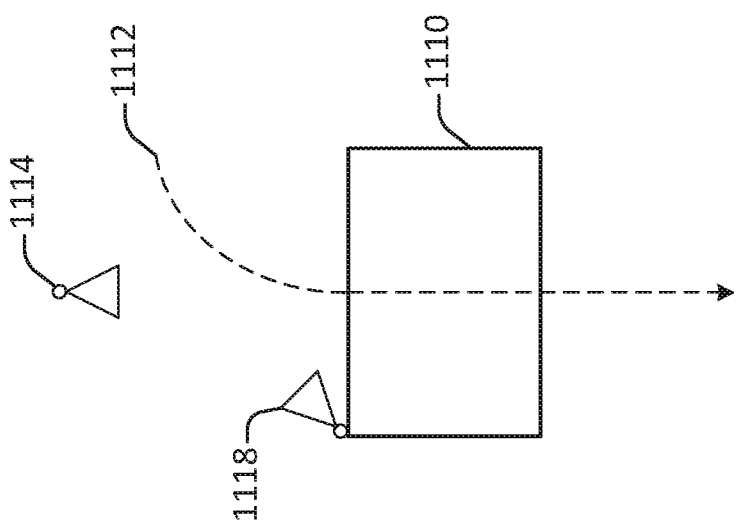
Figure 11A:
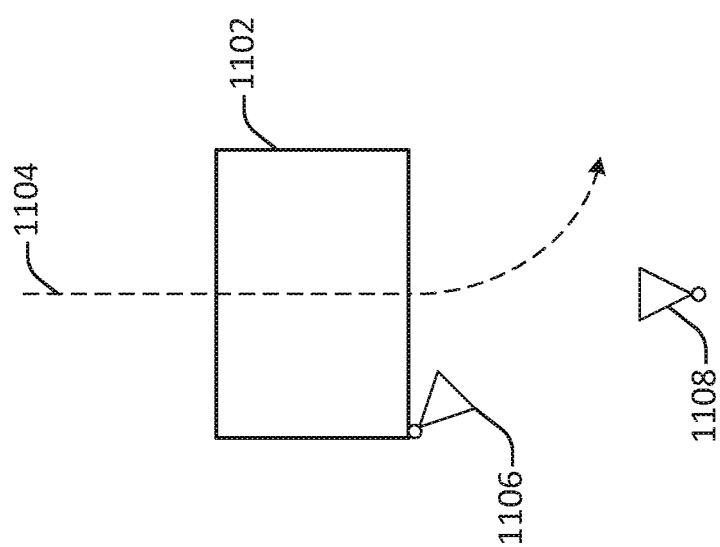

FIG. 11A shows a top-down view of a damage detection portal 1102. The damage detection portal 1102 is configured to employ a drive path 1108 that is straight entering but curved leaving the damage detection portal 1102. Due to the configuration of the cameras and the drive path, the camera 1108 is configured to capture images of a vehicle head-on at a neutral elevation as the vehicle leaves the damage detection portal 1102 and then curves away from the portal. Similarly, the camera 1106 is configured to capture images of the vehicle tail-on at a neutral elevation as the vehicle leaves the damage detection portal 1102 and then curves away from the portal.

FIG. 11B shows a top-down view of a damage detection portal 1110. The damage detection portal 1110 is configured to employ a drive path 1114 that is curved entering and straight leaving the damage detection portal 1110. Due to the configuration of the cameras and the drive path, the camera 1118 is configured to capture images of a vehicle head-on at a neutral elevation as the vehicle drives toward the camera and then turns into the damage detection portal. Similarly, the camera 1114 is configured to capture images of the vehicle tail-on at a neutral elevation as the vehicle turns into the damage detection portal.

Figure 12:
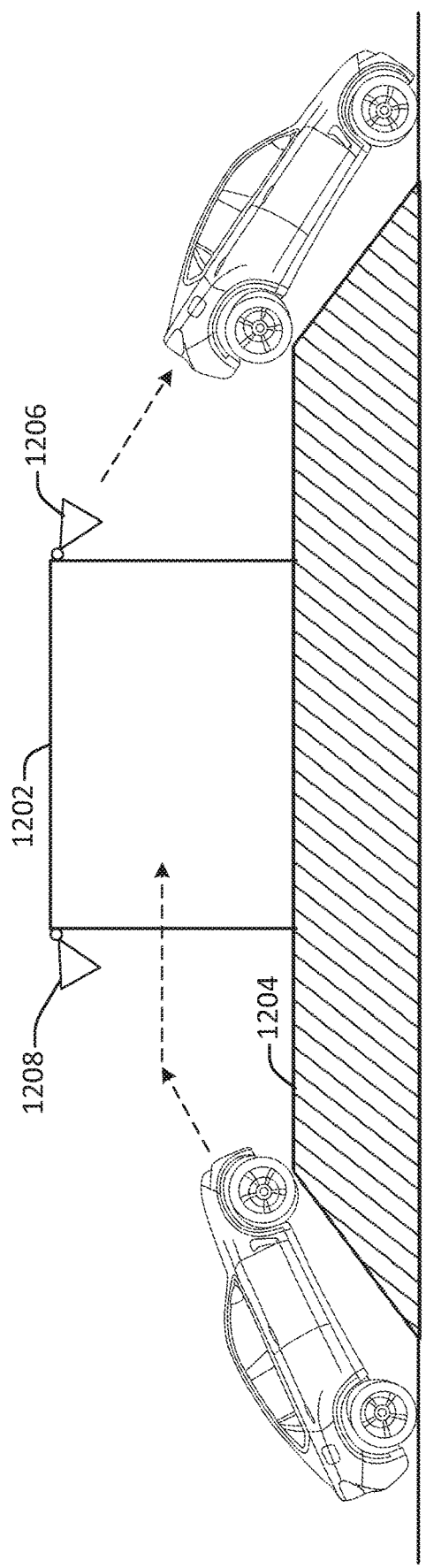
FIG. 12 shows a side-view diagram of a damage detection portal as a vehicle drives through it configured in accordance with one or more embodiments.

FIG. 12 shows a side-view diagram of a damage detection portal 1202 as a vehicle drives through it configured in accordance with one or more embodiments. The damage detection portal 1202 is positioned on a ramp 1204. In this way, the camera 1208 can capture a frontal view of the vehicle head-on (i.e., a "hero shot") as the vehicle drives up the ramp before it levels off into the damage detection portal. Similarly, the camera 1206 can capture a rear view of the vehicle tail-on as the vehicle leaves the damage detection portal and drives down the ramp.

Figure 27:
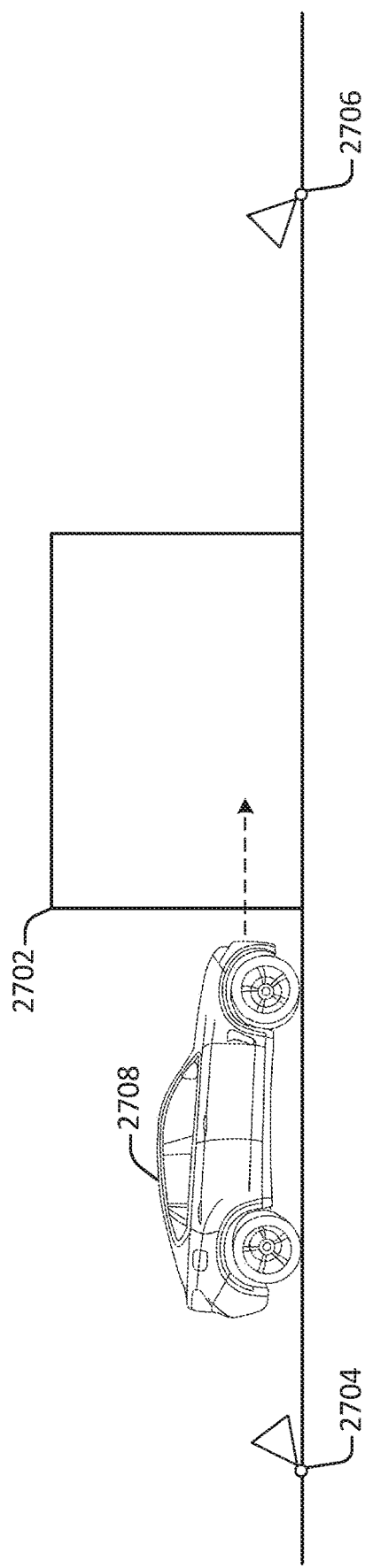
FIG. 27 shows a side-view of a damage detection portal as a vehicle drives through it, configured in accordance with one or more embodiments.

FIG. 27 shows a side-view of a damage detection portal 2702 as a vehicle 2708 drives through it, configured in accordance with one or more embodiments. The damage detection portal 2702 may include some number of cameras arranged as described with respect to FIGS. 6-12 or arranged in a different configuration. In addition, the damage detection portal 2702 may be configured to communicate with the cameras 2704 and/or 2706, which may capture images of the vehicle 2708 before and/or after it enters the damage detection portal 2702.

According to various embodiments, the diagrams shown in FIGS. 6-12 and 27 illustrate only a few of the possible configurations of a damage detection portal. Various configurations are possible and in keeping with the techniques and mechanisms described herein.

Figure 13:
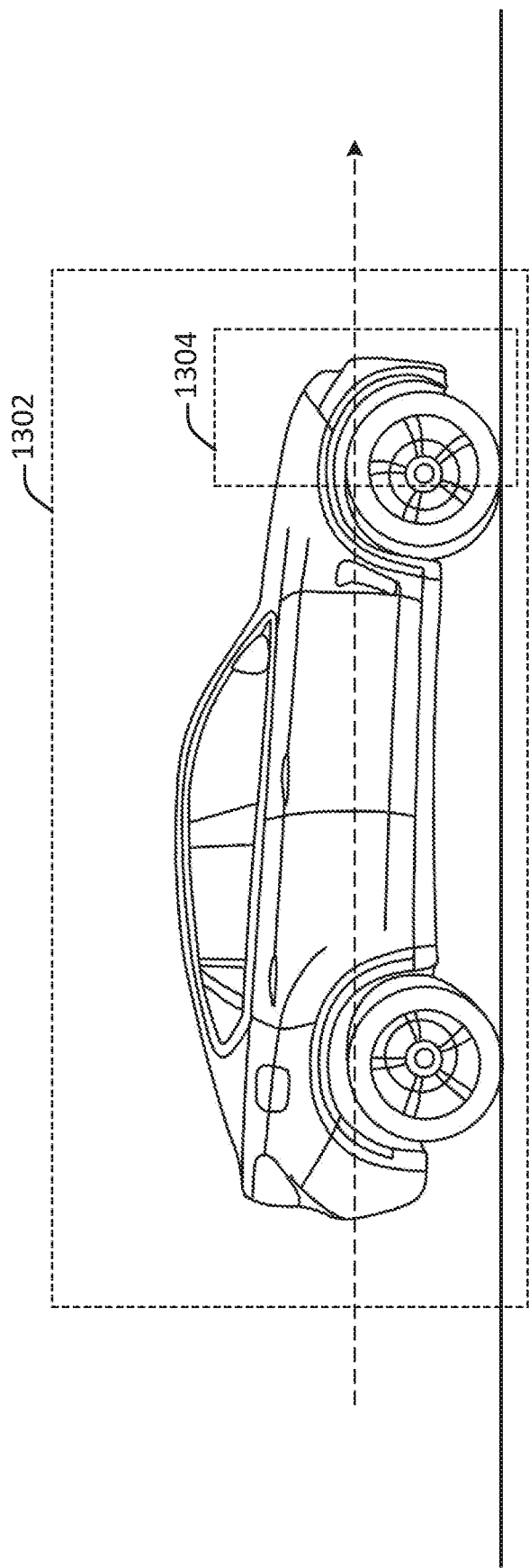
FIG. 13 shows a diagram illustrating the capture of image data via a damage detection portal configured in accordance with one or more embodiments.

FIG. 13 shows a diagram illustrating the capture of image data via a damage detection portal configured in accordance with one or more embodiments. According to various embodiments, one or more cameras may be configured to capture a whole-vehicle image such as the image 1302 as the vehicle drives through the portal. Alternatively, or additionally, one or more cameras may be configured to capture a closeup view such as the image 1304 as the vehicle drives through the portal. By combining these views, a user may be able to select a portion of a whole-vehicle image and then zoom in to a view captured by a closeup camera.

Figure 14:
FIGS. 14-16 show simulated images generated from a damage detection portal in accordance with one or more embodiments.
Figure 15:
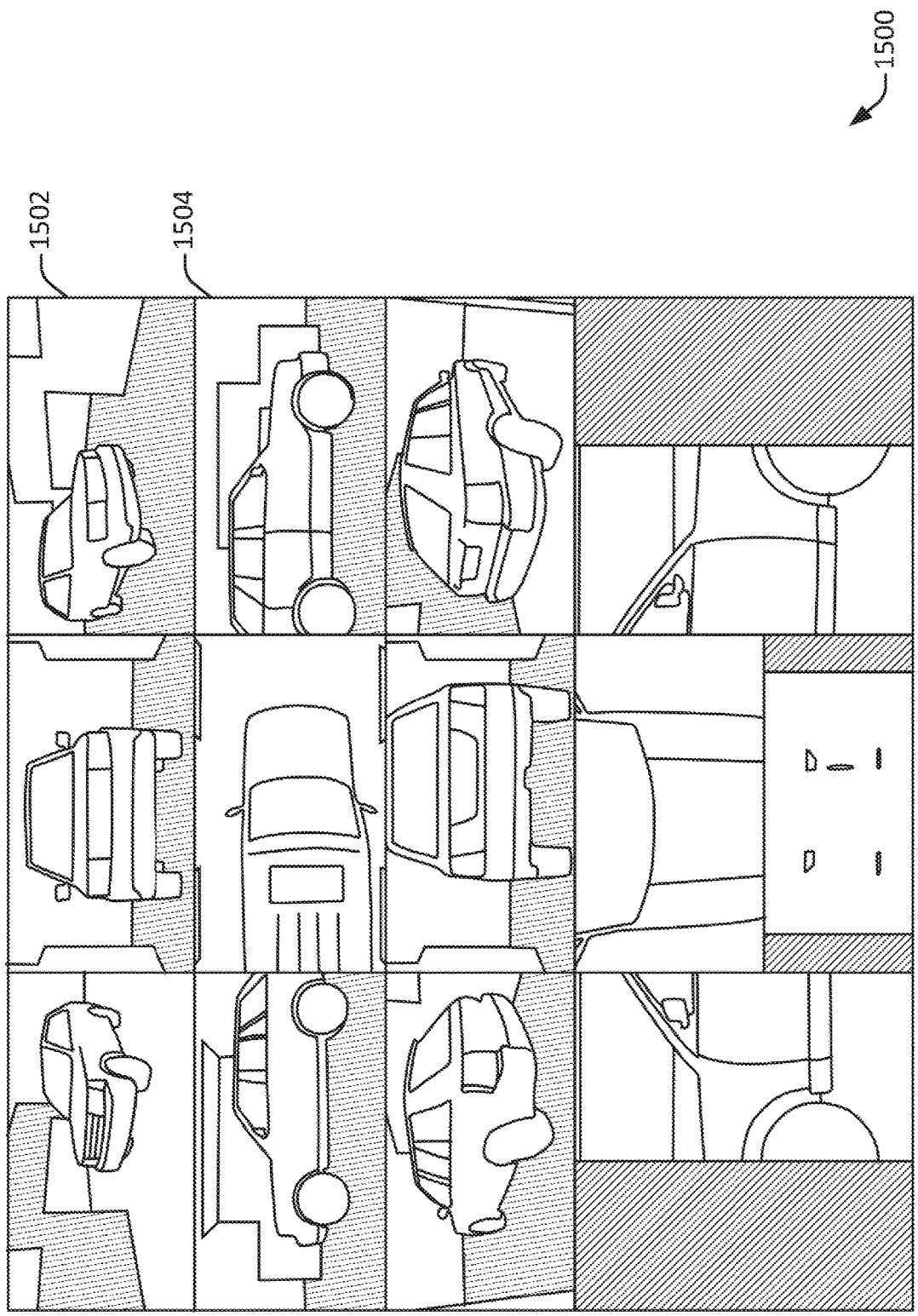
Figure 16:
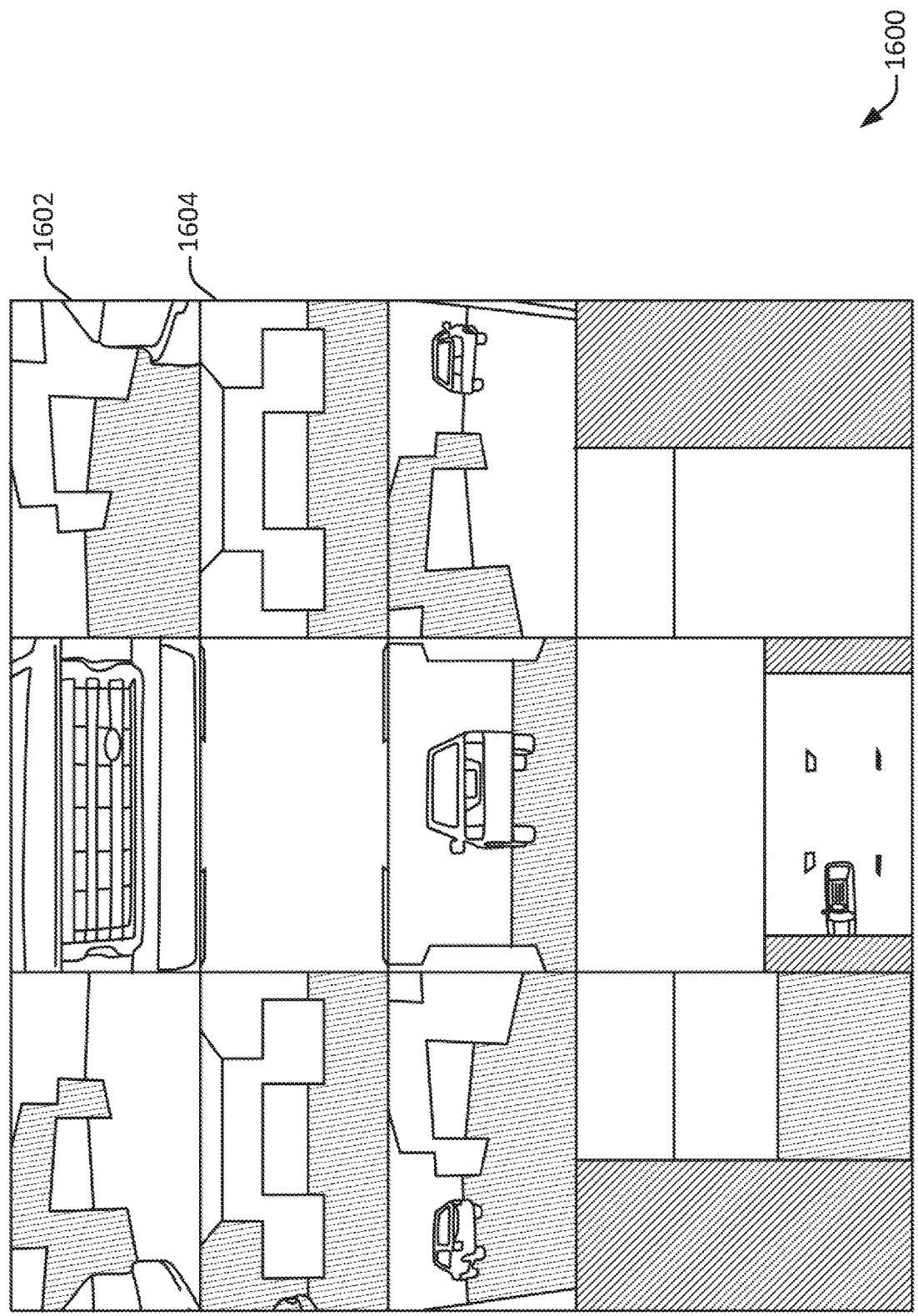

FIGS. 14-16 show simulated images generated from a damage detection portal. In FIG. 14, a vehicle is shown prior to entering into the portal. In FIG. 15, the vehicle is shown in the portal. In FIG. 16, a vehicle is shown leaving the portal. Individual images or videos may be presented in perspective frames such as the frames 1402 and 1404. Perspective frames may be presented in an image grid such as the image grid 1400, which in turn may be presented in a viewer. In some configurations, the perspective frames may be used to present successions of images or videos that show an object from different perspectives. For example, successive image data is shown in image frames 1502 and 1504 in the image grid 1500 and in image frames 1602 and 1604 in the image grid 1600.

Figure 17:
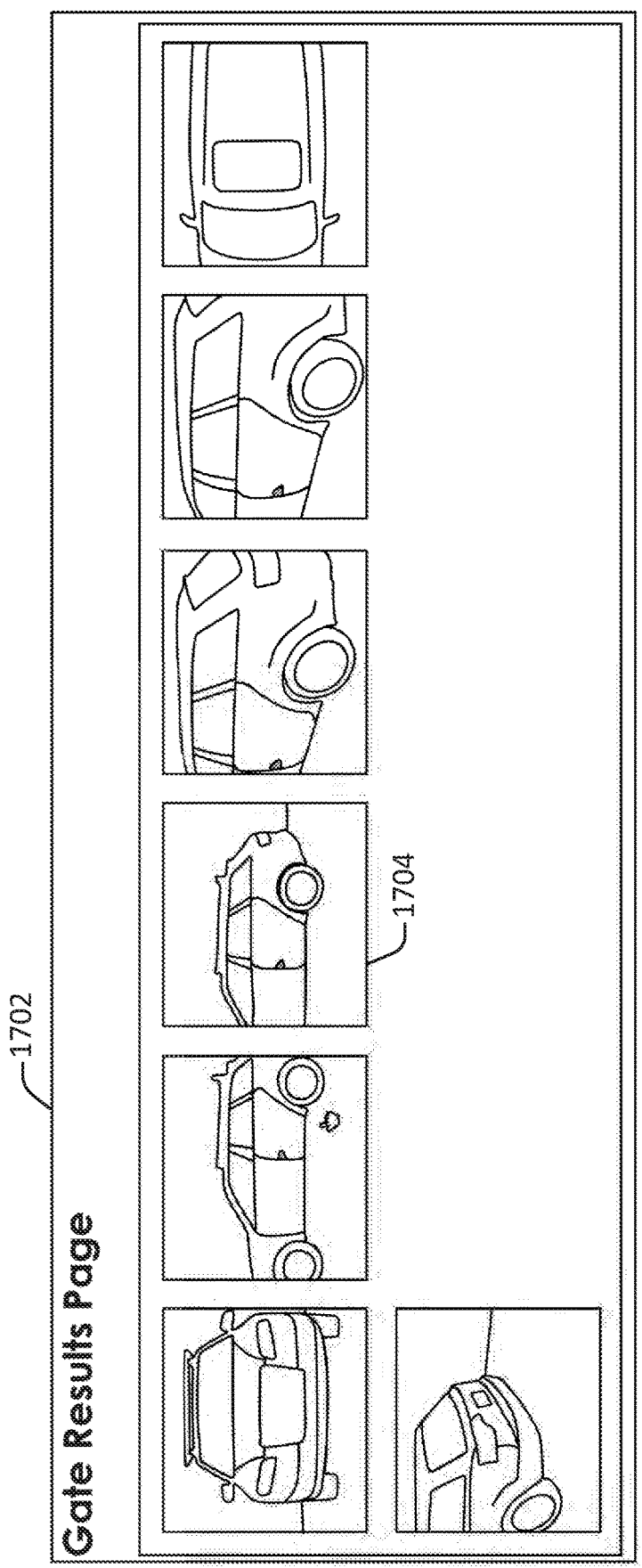
FIGS. 17-19 show images captured via a damage detection portal and presented in a user interface generated in accordance with one or more embodiments.
Figure 18:
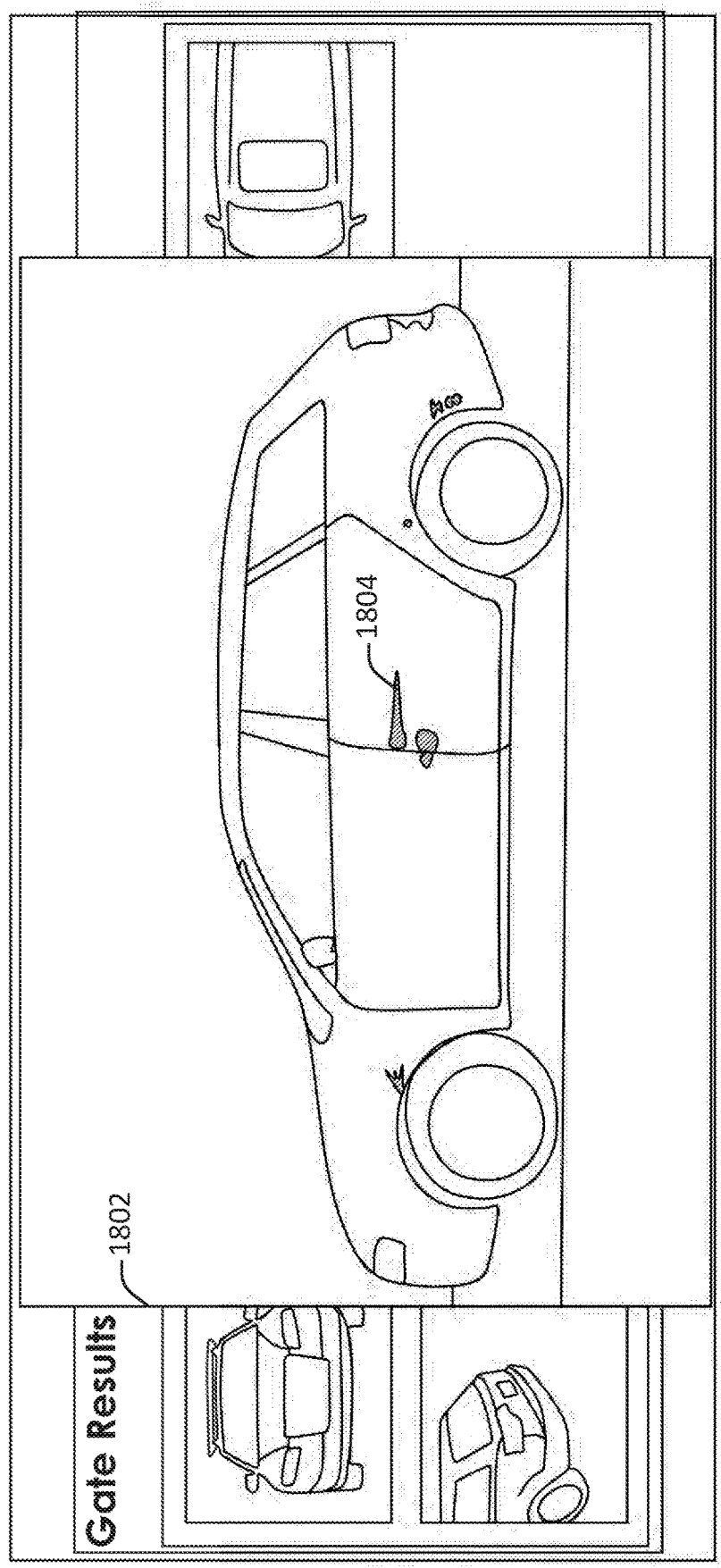
Figure 19:
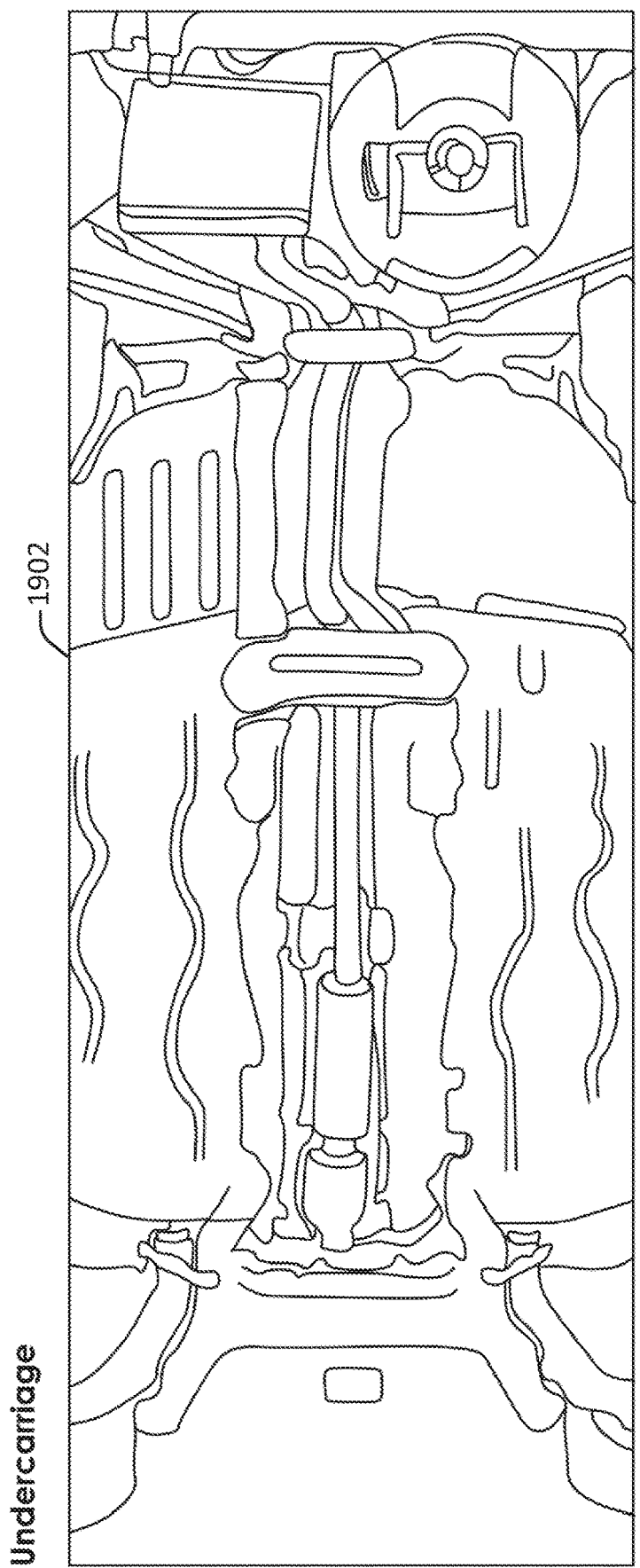

FIGS. 17-19 show images captured via a damage detection portal and presented in a user interface. In FIG. 17, images of a vehicle captured from different perspectives are shown within a results page 1702. When one of the images is selected, such as the image 1704, it may be enlarged, as shown at 1802 in FIG. 18. The enlarged image may include portions where damage is highlighted such as the region 1804. As shown at 1902 in FIG. 19, one or more images may be captured of the undercarriage of the vehicle.

Figure 20:
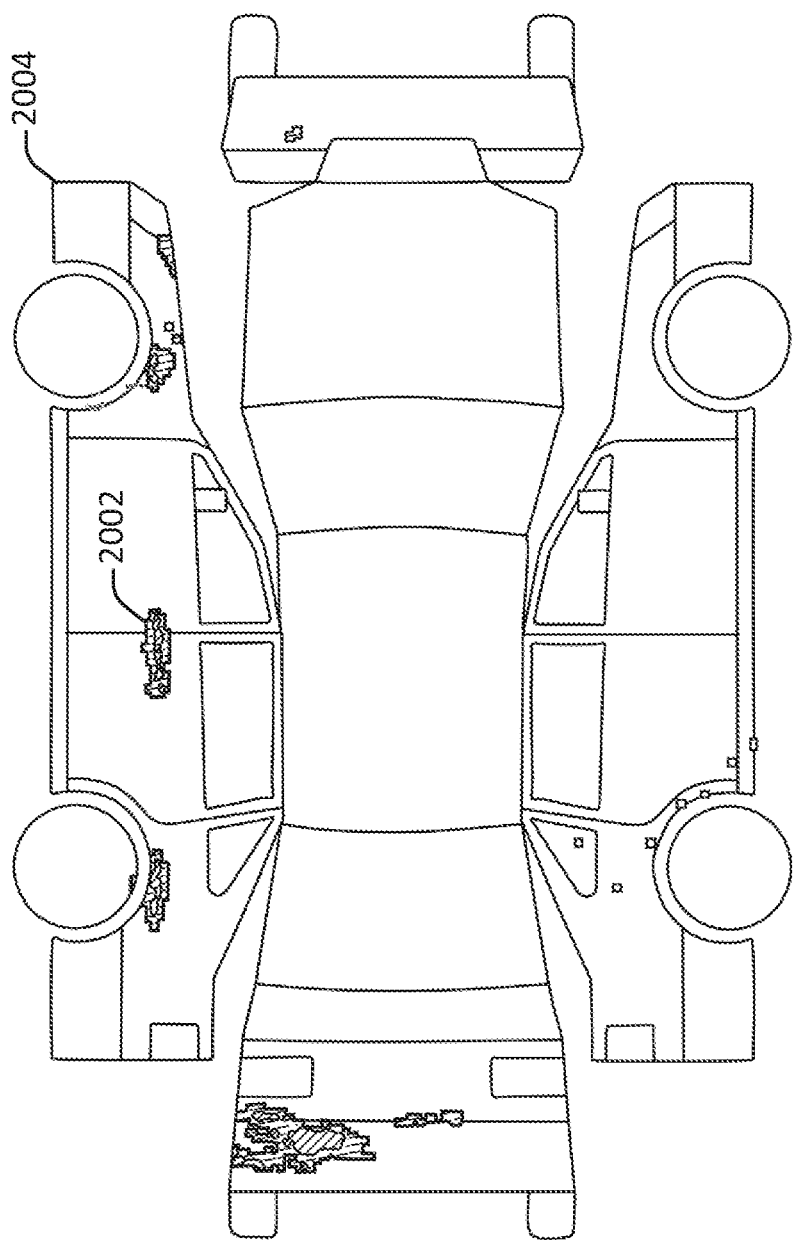
FIG. 20 illustrate a portion of the user interface in which detected damage is shown, generated in accordance with one or more embodiments.
Figure 21:
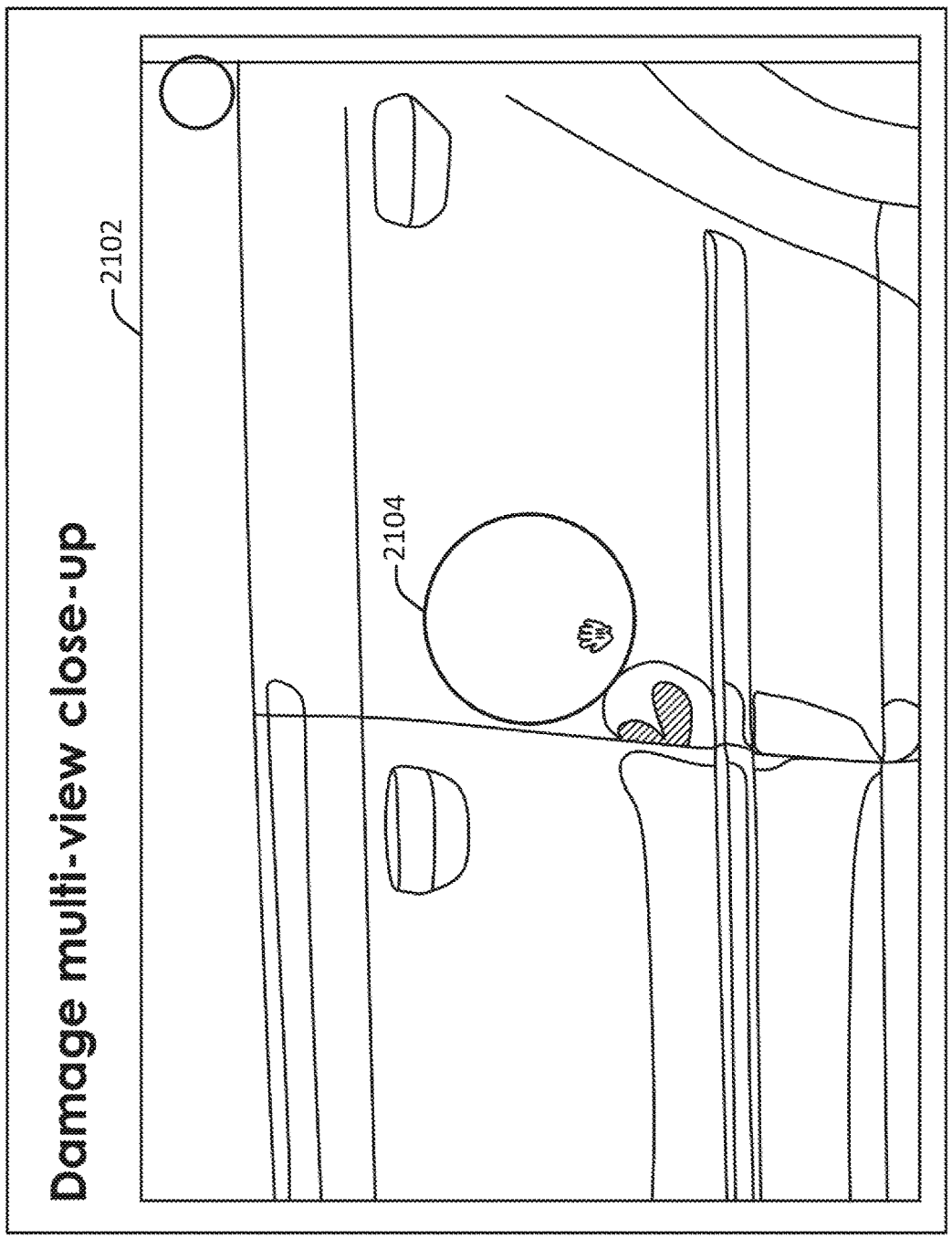
FIGS. 21-25 illustrate images captured via the damage detection portal and presented in a user interface generated in accordance with one or more embodiments.
Figure 22:
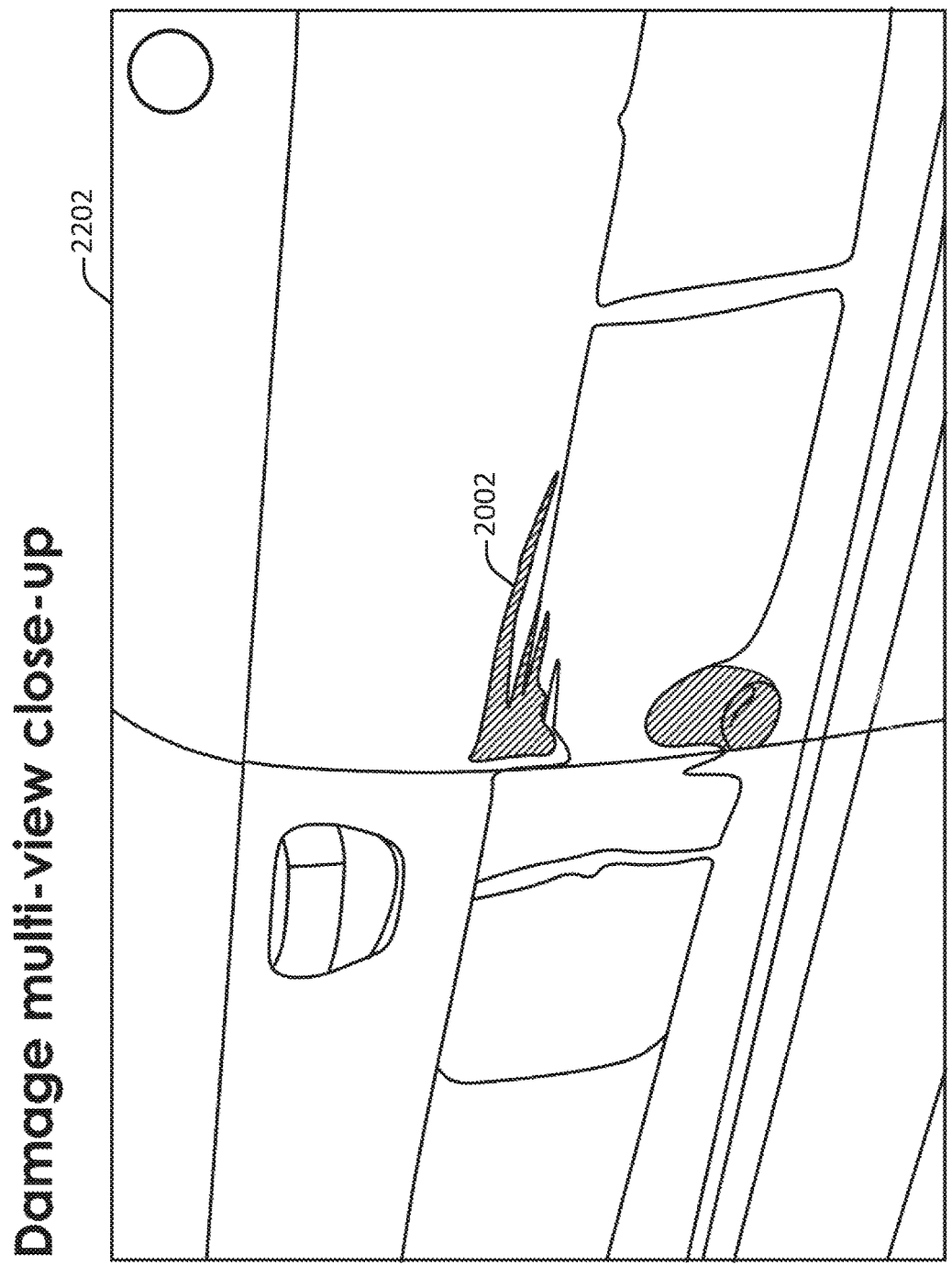

FIG. 20 illustrate a portion of the user interface in which detected damage is shown, generated in accordance with one or more embodiments. In FIG. 20, detected damage is illustrated on a top-down wire-frame view 2004 of the vehicle with a heatmap overlay. For example, damage may be illustrated as color in regions such as 2002, with color tone indicating the extent of the damage. In some embodiments, a user interface may also include additional elements, such as a list of components of the vehicle and/or a status bar and percentage indicating the degree of coverage provided by the captured images.

FIGS. 21-25 illustrate images captured via the damage detection portal and presented in a user interface generated in accordance with one or more embodiments. In some embodiments, an image may be selected by clicking on or touching damage represented in the top-down view or other visual representations within the viewer application or website. For instance, clicking on or touching the damage shown at 2002 on the left door panels shown in the image in FIG. 20 may lead to the presentation of the image 2102 shown in FIG. 21, which may show the damage at a higher level of detail.

Figure 23:
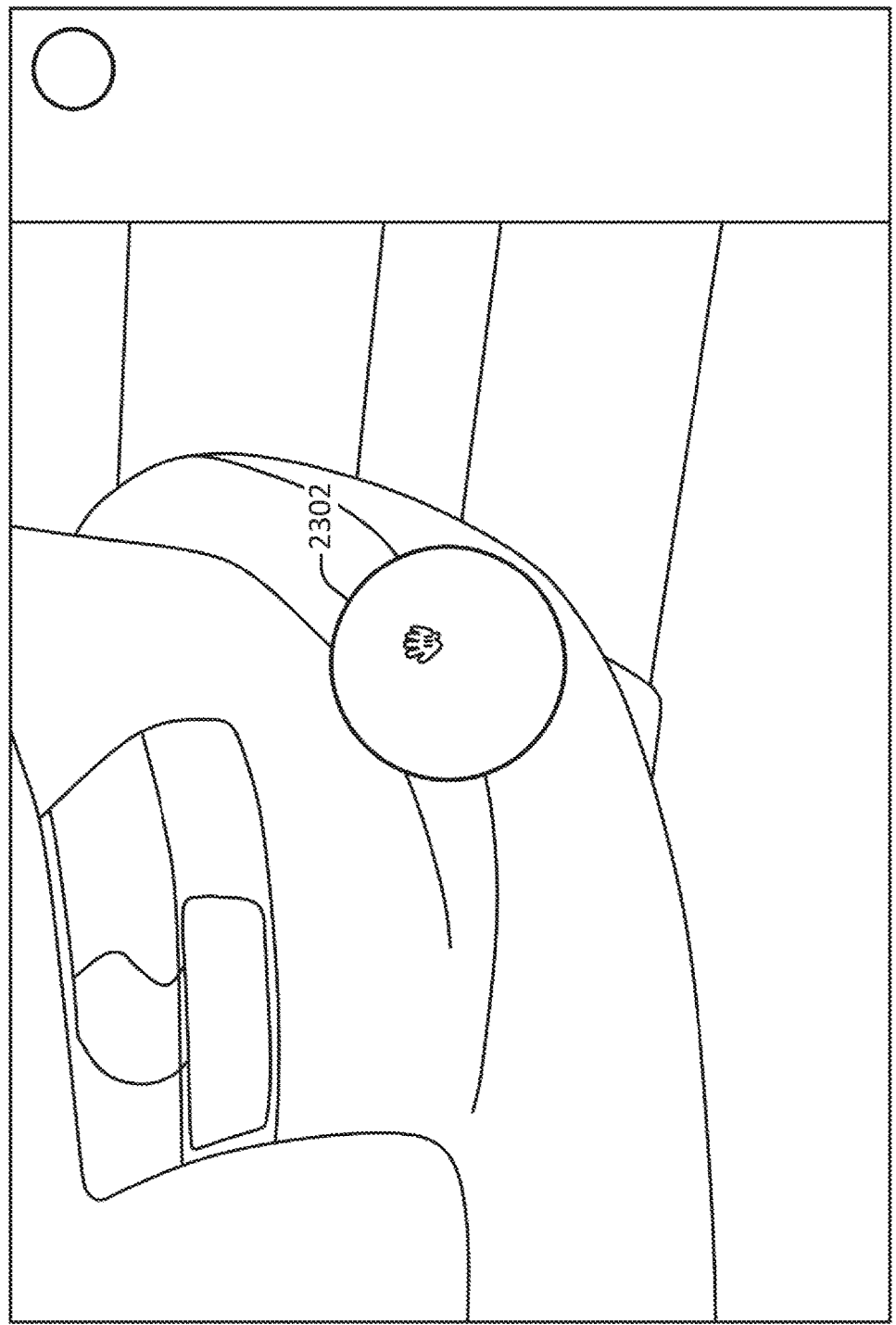
Figure 24:
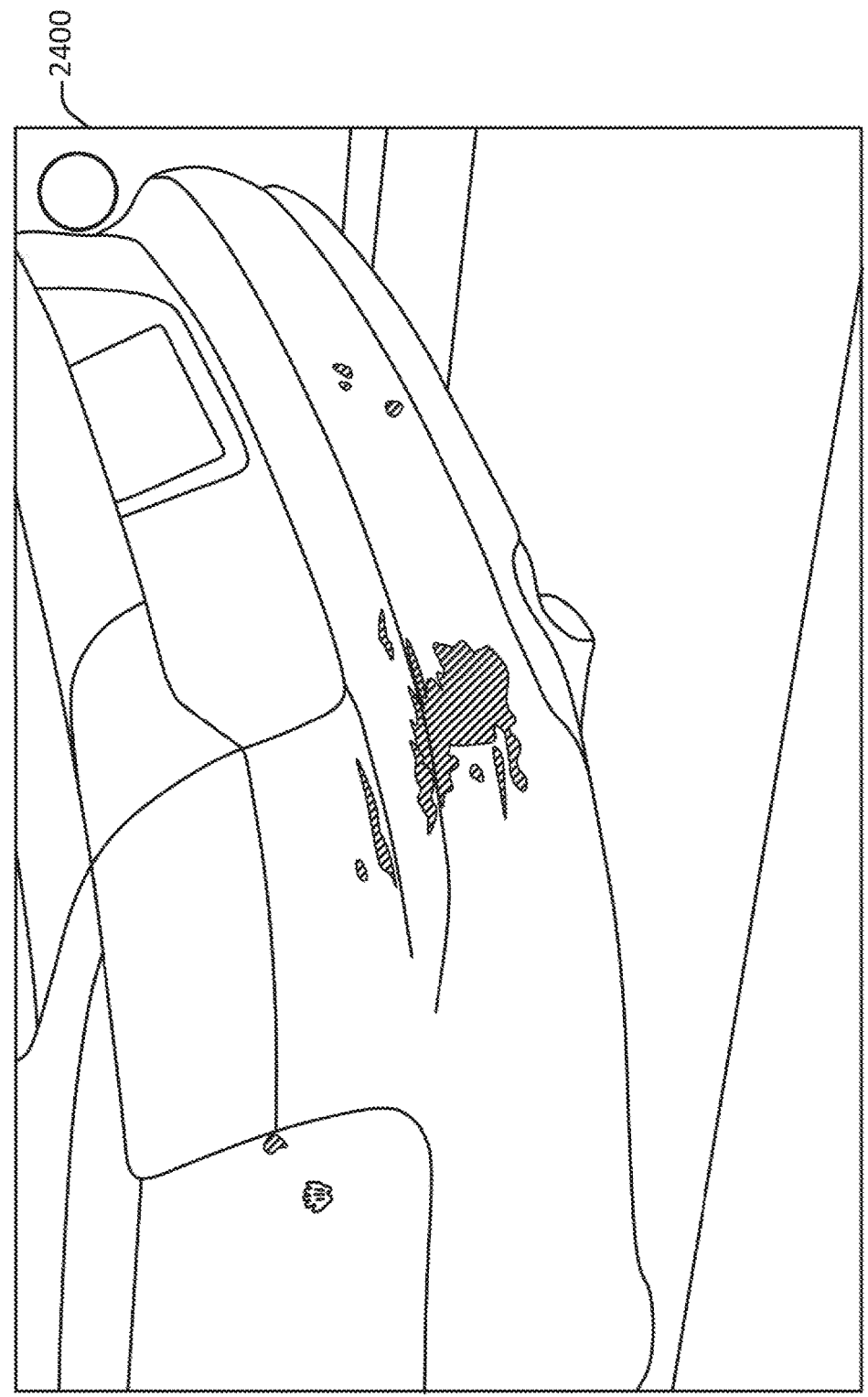

In some implementations, a selected image may be a portion of a closeup multi-view interactive digital media representation (MVIDMR) of the selected region. In an MVIDMR, different images may be arranged in a virtual space such that they may be navigated in two or more dimensions. The closeup MVIDMR may depict the selected portion of the vehicle from different perspectives. The user may navigate between these different perspectives by, for example, clicking and dragging a mouse, or touching and dragging on a touch screen. For example, in FIG. 21, the user has selected an area 2104 in the center of the image and then dragged to one side, leading the user interface to present the image shown in FIG. 22, which depicts the same area of the vehicle from a different perspective. A similar operation is shown in FIGS. 23 and 24, which depict a different closeup MVIDMR of the back left area of the vehicle. In FIGS. 23 and 24, a user may grab the area 2302 and drag it to select a new image 2404 of the same area from a different perspective.

Figure 25:
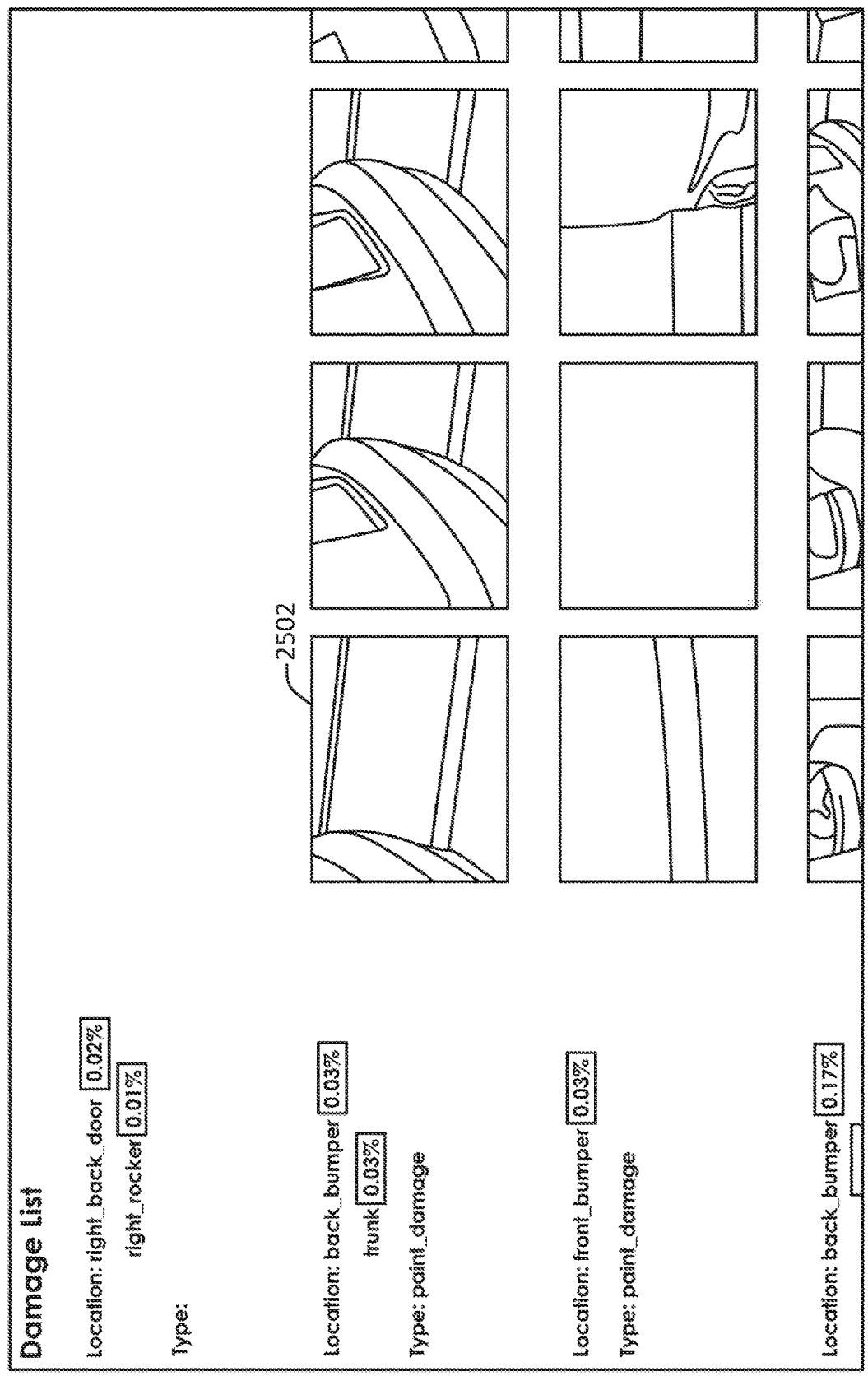

According to various embodiments, damage to the vehicle may be identified in a list, such as that shown in FIG. 25. The identified damage may include information such as the location that was damaged, the type of damage (e.g., a dent, or paint damage), a confidence level associated with the detected damage, and/or the severity of the damage. In addition, closeup views of the damaged areas may be shown, such as in the image 2502.

Figure 26:
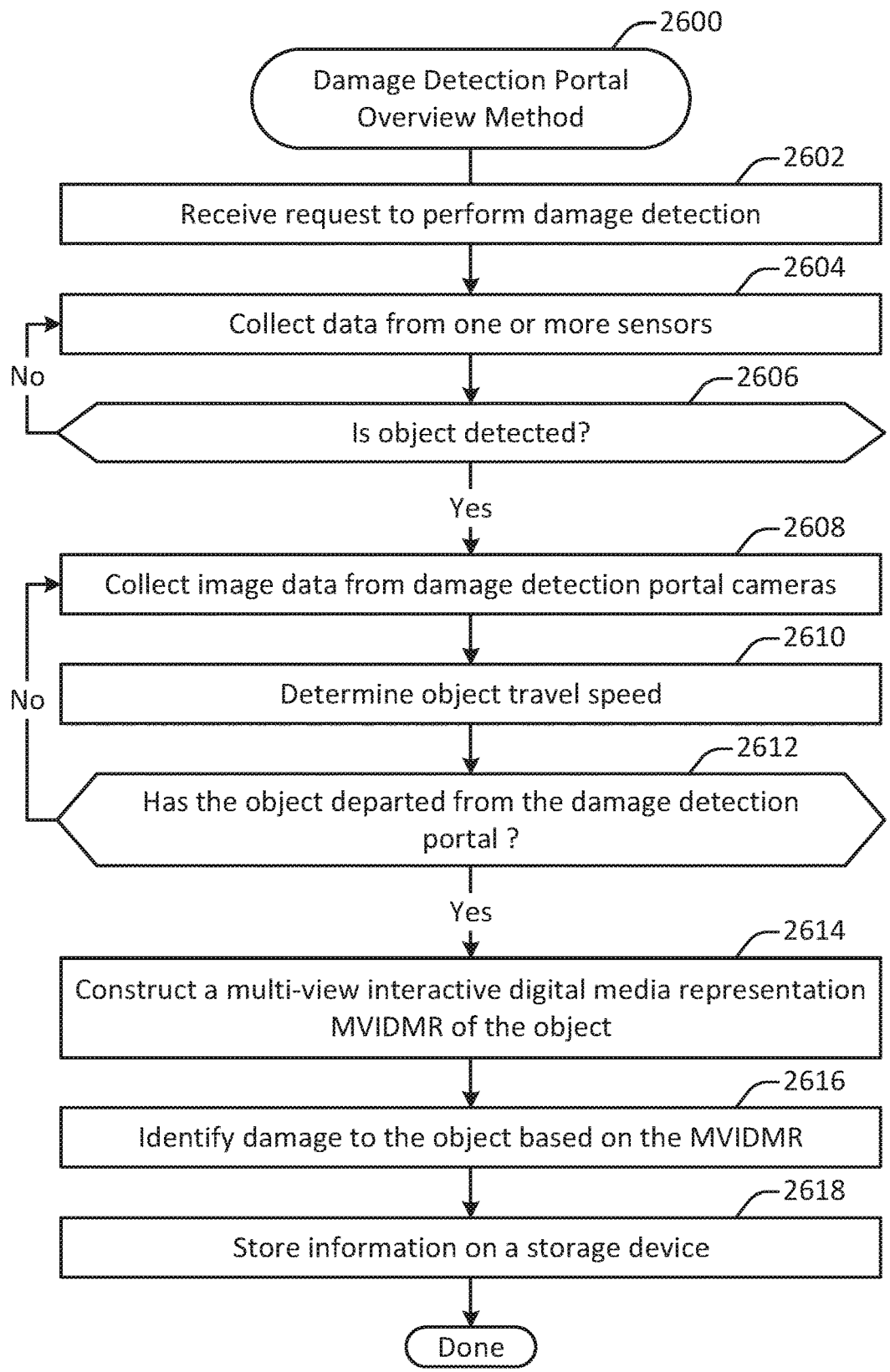
FIG. 26 illustrates an overview method for the operation of a damage detection portal, performed in accordance with one or more embodiments.

FIG. 26 illustrates an overview method 2600 for the operation of a damage detection portal, performed in accordance with one or more embodiments. According to various embodiments, the method 2600 may be performed at a damage detection portal or computing device in communication with a damage detection portal. Alternately, or additionally, some or all of the method 2600 may be performed at a remote computing device such as a server. The method 2600 may be used to detect damage to any of various types of objects. However, for the purpose of illustration, many examples discussed herein will be described with reference to vehicles.

A request to perform damage detection is received at 2602. According to various embodiments, the request may be based on user input. For instance, a user may transmit a request to initiate damage detection. Alternatively, or additionally, the request may be automatically generated. For instance, damage detection may begin automatically when the system is activated.

Data from one or more sensors is collected at 2604. According to various embodiments, the sensor data may include information collected from one or more pressure sensors, cameras, light sensors, or any other suitable sensors.

A determination is made at 2606 as to whether an object is detected. In some implementations, the sensor data may be used to determine when an object is approaching the damage detection portal. The determination may be limited, for instance detecting whether a laser sensor has been interrupted or a pressure panel has been tripped.

Alternatively, the determination may involve performing sophisticated object recognition based on visual data collected from one or more cameras.

When an object is detected, then at 2608 image data from one or more damage detection portal cameras is collected. As discussed herein, a damage detection portal may have multiple cameras that capture image data of the object at different angles and from different viewpoints.

Object travel speed is determined at 2610. In some implementations, the object travel speed may be determined based on one or more sensors such as cameras, pressure sensors, laser sensors, radar sensors, sonar sensors, or any other suitable sensors. The object travel speed may be used to inform the rate at which visual data is captured. For instance, visual data capture may be adjusted so as to capture a relatively constant amount of visual data regardless of object speed. When a vehicle is traveling faster, for example, cameras may be configured to capture images at a more rapid pace than when a vehicle is traveling more slowly.

A determination is made at 2612 as to whether the object has departed from the damage detection portal. According to various embodiments, the determination may be made based on one or more of a combination of data sources. For example, a pressure sensor may detect when an object has moved away from the portal. As another example, image information may be used to determine that an object is no longer present in the area of the portal. As yet another example, a laser or other sensor may be detect when an object has passed a designated point along a path.

When the object has departed from the damage detection platform, an MVIDMR of the object is constructed at 2614. According to various embodiments, image data may be used to construct an overall MVIDMR of the entire object. Additionally, one or more focused MVIDMRs may be constructed of particular areas or components of the object. For example, a focused MVIDMR of a vehicle component may be constructed. As another example, a focused MVIDMR of a portion of a vehicle in which damage has been detected may be constructed.

Damage to the object based on the MVIDMR is identify at 2616. According to various embodiments, any of a variety of techniques may be used to perform damage detection. Examples of such damage detection techniques are described throughout the application, for instance with respect to the FIGS. 1-5.

Information is stored on a storage device at 2618. According to various embodiments, storing the information may involve transmitting information via a communication interface over a network to a remote storage location and/or storing the information on a local storage device. The information stored may include, but is not limited to: raw image and/or video data, sound data captured as the object passed through the portal, one or more MVIDMRs constructed as discussed at operation 2616, and/or damage detection information determined as discussed at operation 2616.

According to various embodiments, although the configuration of cameras is referred to herein as a damage detection portal, the configuration of cameras may be used for other purposes, such as to record a video of the vehicle that includes multiple perspectives.

According to various embodiments, although the object captured by the damage detection portal is referred to herein as a vehicle, information about other types of objects may be captured in a similar fashion. For example, a damage detection portal may be used to capture information about a patient in a medical setting. As another example, a damage detection portal may be used to capture information about an individual for security purposes. As yet another example, a damage detection portal may be used to capture information about animals. As still another example, a damage detection portal may be used to capture information about objects on an assembly line. A variety of configurations and applications are possible.

Figure 28:
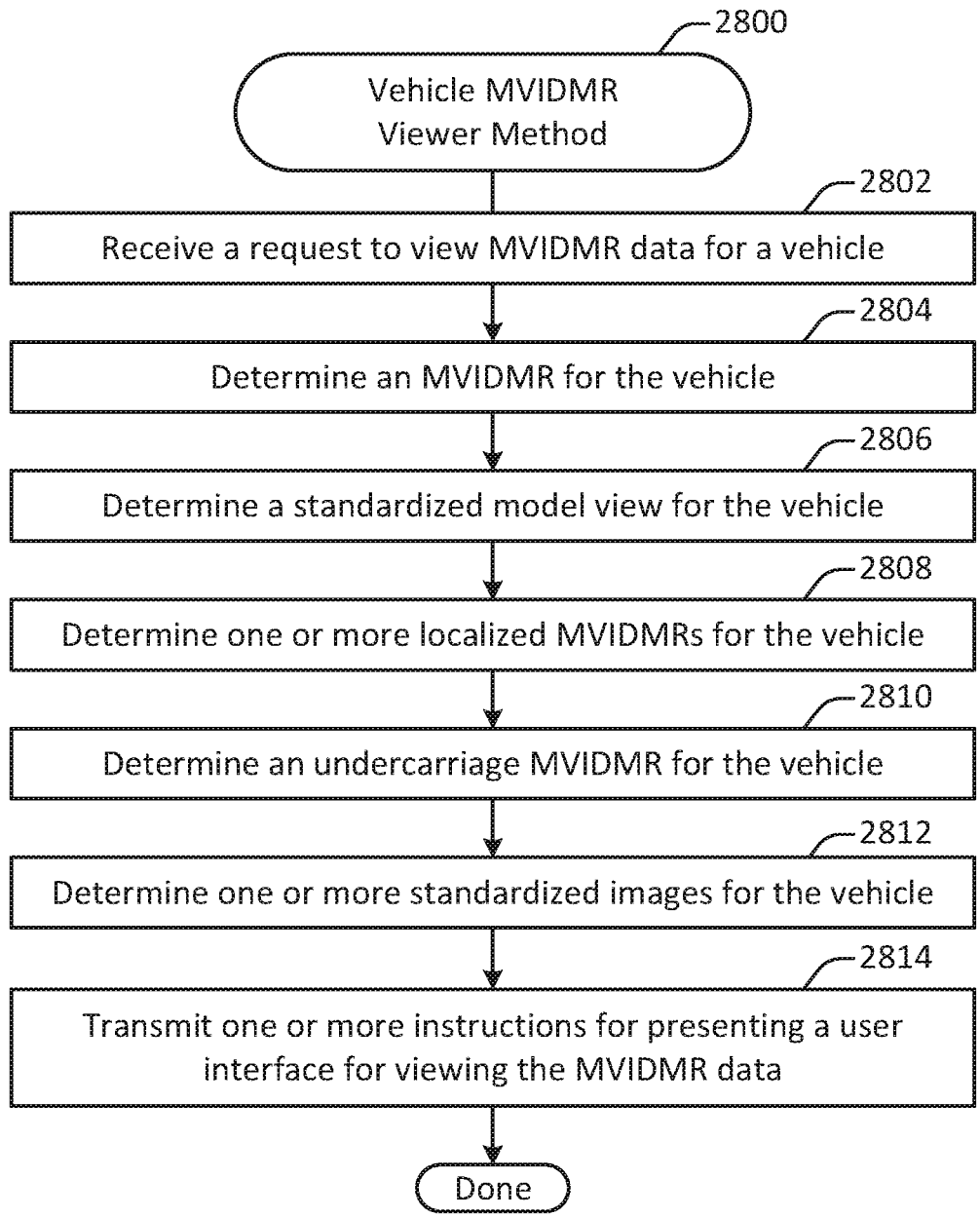
FIG. 28 illustrates a method for providing a multi-view interactive digital media representation ("MVIDMR") viewer, performed in accordance with one or more embodiments.

FIG. 28 illustrates a method 2800 for providing an MVIDMR viewer, performed in accordance with one or more embodiments. According to various embodiments, the method 2800 may be performed at a server in communication with a client machine.

Alternatively, the method 2800 may be performed entirely at a client machine. The client machine may be any suitable computing device, such as a desktop computer, a laptop computer, a tablet computer, or a mobile phone.

A request to view MVIDMR data for a vehicle is received at 2802. According to various embodiments, although various examples are described herein with respect to a vehicle, techniques and mechanisms are broadly applicable to a range of different object types.

In some implementations, the request may be generated based on user input. Alternatively, the request may be generated automatically, such as when a vehicle is driven through a damage detection portal, or when an MVIDMR of a vehicle is generated based on image capture from a mobile computing device.

An MVIDMR for the vehicle is determined at 2804. An MVIDMR may be generated as discussed throughout the application. The MVIDMR may then be presented in the viewer along with other related information.

A standardized model view for the vehicle is determined at 2806. According to various embodiments, the standardized model view for the vehicle may be a top-down view in which all portions of the vehicle apart from the undercarriage are presented in a single image. The standardized model view may be generated based on a particular vehicle. Alternatively, the standardized model view may be generic to all vehicles or particular classes of vehicles.

Figure 30:
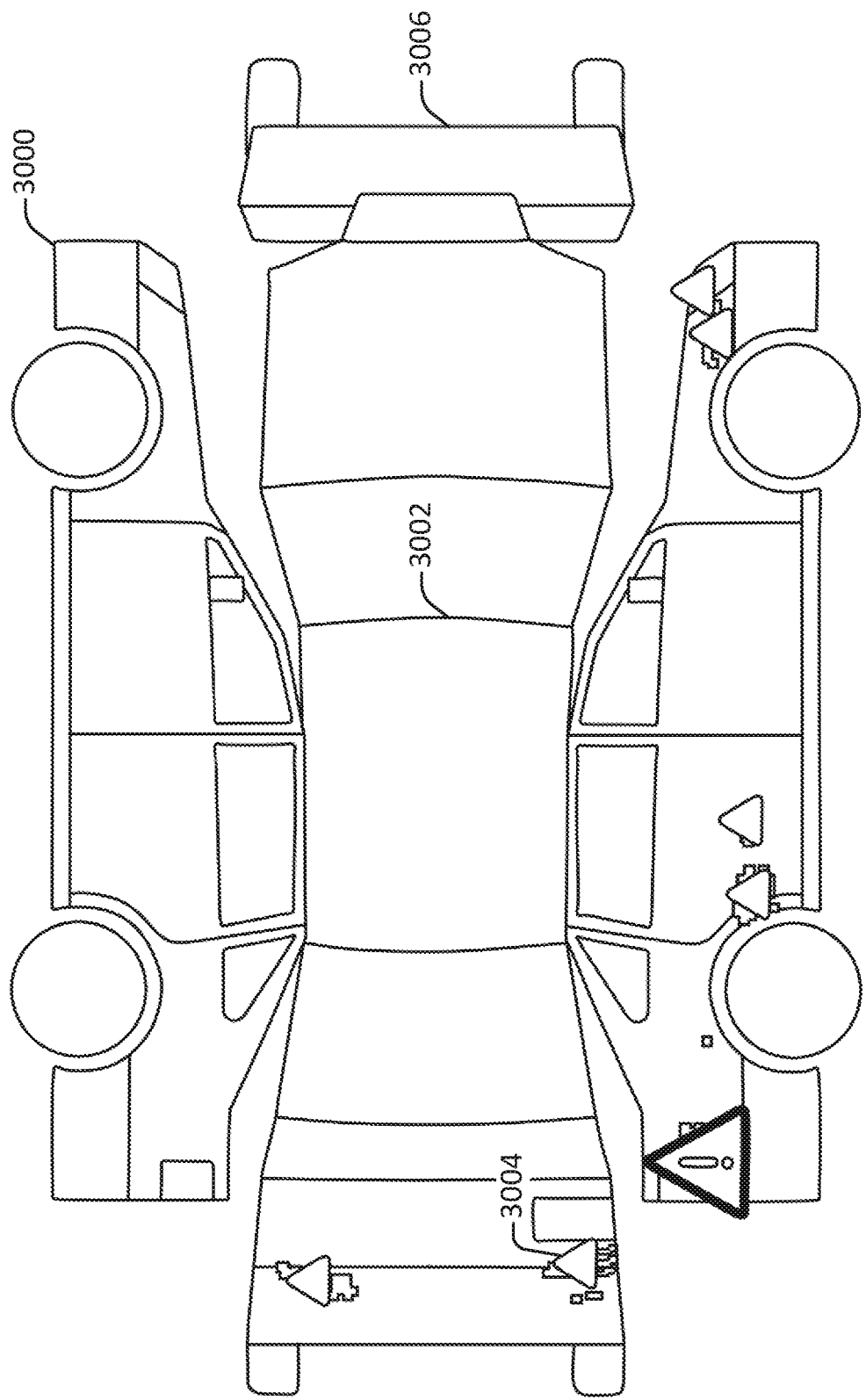
FIG. 30 illustrates a top-down view of a vehicle as presented in an MVIDMR viewer, generated in accordance with one or more embodiments.

FIG. 30 illustrates a top-down view 3000 of a vehicle as presented in an MVIDMR viewer, generated in accordance with one or more embodiments. The top-down view 3000 is one example of a standardized model view for the vehicle. The top-down view 3000 is a standard top-down view of a car, but has additional elements that have been added that help to illustrate features such as coverage levels and damage detected.

In FIG. 30, color may be use to illustrate the degree of capture of various vehicle portions, with darker colors indicating less capture. For example if the roof panel 3002 has relatively low coverage in the captured images while the front panel 3006 has relatively high coverage in the captured images, the roof panel 3002 may have a darker color in the image. White may indicate 100% or near-100% coverage, while dark gray or black may indicate 0% or near-0% coverage.

In FIG. 30, locations on the vehicle that have exhibited damage are also shown. For example, damage to the right rear portion of the vehicle is illustrated at 3004. The top-down view 3000 may be clickable, for instance with a mouse or touchpad. In such a configuration, clicking on the damage tag 30004 may show a corresponding image, corresponding damage statistics or other information, and/or show a localized MVIDMR.

In particular embodiments, clicking on or hovering over a feature or area on the standardized model view (e.g., a 2D top-down view) may present an image that is relatively close to the selected point. For example, the image that is closest in distance and/or orientation may be selected. As another example, a crop of an image may be selected to illustrate a close-up of the feature or area that was selected.

In some implementations, if the same portion of the vehicle is captured in different images but at, for instance, different distances or with different focal lengths, then the viewer may switch between the different images. For example, the viewer may switch according to a level of zoom requested by the user. In such a configuration, a multi-resolution image may be presented initially, while a lower resolution version of the image may be presented if the user requests a wide view of the vehicle. Alternatively, or additionally, a close-up image with higher resolution may be presented if the user zooms in. Additional details relating to the presentation of a view close to a selected area or feature are discussed with respect to the method 2900 shown in FIG. 29.

Returning to FIG. 28, one or more localized MVIDMRs for the vehicle are determined at 2808. According to various embodiments, a localized MVIDMR may be an MVIDMR that is focused on a particular feature of an object, such as an area in which damage has been detected. The generation of a localized MVIDMR is discussed in additional detail with respect to the method 3100 shown in FIG. 31.

In particular embodiments, clicking on an area or feature represented in the standardized model view may activate the viewing of a localized MVIDMR of the selected area or feature. For example, clicking on area 3004 in FIG. 30 may activate the viewing of a localized MVIDMR of the rear right portion of vehicle.

An undercarriage MVIDMR for the vehicle is determined at 2810. According to various embodiments, an undercarriage MVIDMR may allow the user to navigate along the direction of the vehicle motion, forward or backward under the vehicle.

In some implementations, to create the undercarriage MVIDMR, multiple images may be captured of the vehicle's undercarriage while the vehicle is passing over one or more cameras located beneath the vehicle's way of passage. Then, correspondences between the images may be identified, and the captured images may be stitched together based on the correspondences.

In particular embodiments, the undercarriage MVIDMR may include a three-dimensional visualization by means of a multi-layered image. A 3D visualization may be created since the undercarriage is not flat, which may allow a user to navigate the MVIDMR to see around its 3D structures. For example, the same pixel of an image may be captured by different cameras at the same time because the different cameras may have overlapping fields of view. The user may then select a viewpoint, which in the viewer may involve switching all or a portion of the stitched image to that captured by a camera aligned with the selected viewpoint.

In particular embodiments, the undercarriage MVIDMR may be presented as a 3D interactive viewer. For instance, the undercarriage may be reconstructed as a 3D mesh that can be navigated with a 3D viewer.

In particular embodiments, the undercarriage MVIDMR may be presented as a dynamic 2D visualization by means of virtual cameras. For instance, the system may create the experience of navigating around structures by creating 2D representations of selected areas as they would be seen from a virtual camera placed at a selected viewpoint. Such operations may involve exploiting a 3D mesh representation of the undercarriage. Alternately, or additionally, image-based rendering and/or light-field representations may be used to generate synthetic 2D views from viewpoints from which actual images were not captured. In such an approach, multiple 2D images may be elevated into multiplane images and then aggregated to generate a synthetic multiplane image at that selected viewpoint. The synthetic multiplane image may then be projected back down into two dimensions.

One or more standardized images for the vehicle are determined at 2812. According to various embodiments, a standardized image may be an image that is captured from at or near a designated framing, such as an image captured from a designated viewpoint and/or a designated distance from the vehicle. Additional details related to capturing standardized images are discussed with respect to the method 3200 shown in FIG. 32.

One or more instruction for presenting a user interface for viewing the MVIDMR data are transmitted at 2814. In some implementations, the instructions may involve one or more HTML markup tags, data values, Javascript statements, or other such elements associated with presenting a webpage in a web browser. Alternatively, or additionally, the instructions may involve communication with a native application configured to present the viewer on a display screen. For example, the native application may be implemented in Windows, Android, iOS, or another suitable operating system.

According to various embodiments, one or more operations shown in FIG. 28 may be omitted. Alternatively, or additionally, a viewer may include one or more elements not discussed with respect to FIG. 28.

Figure 29:
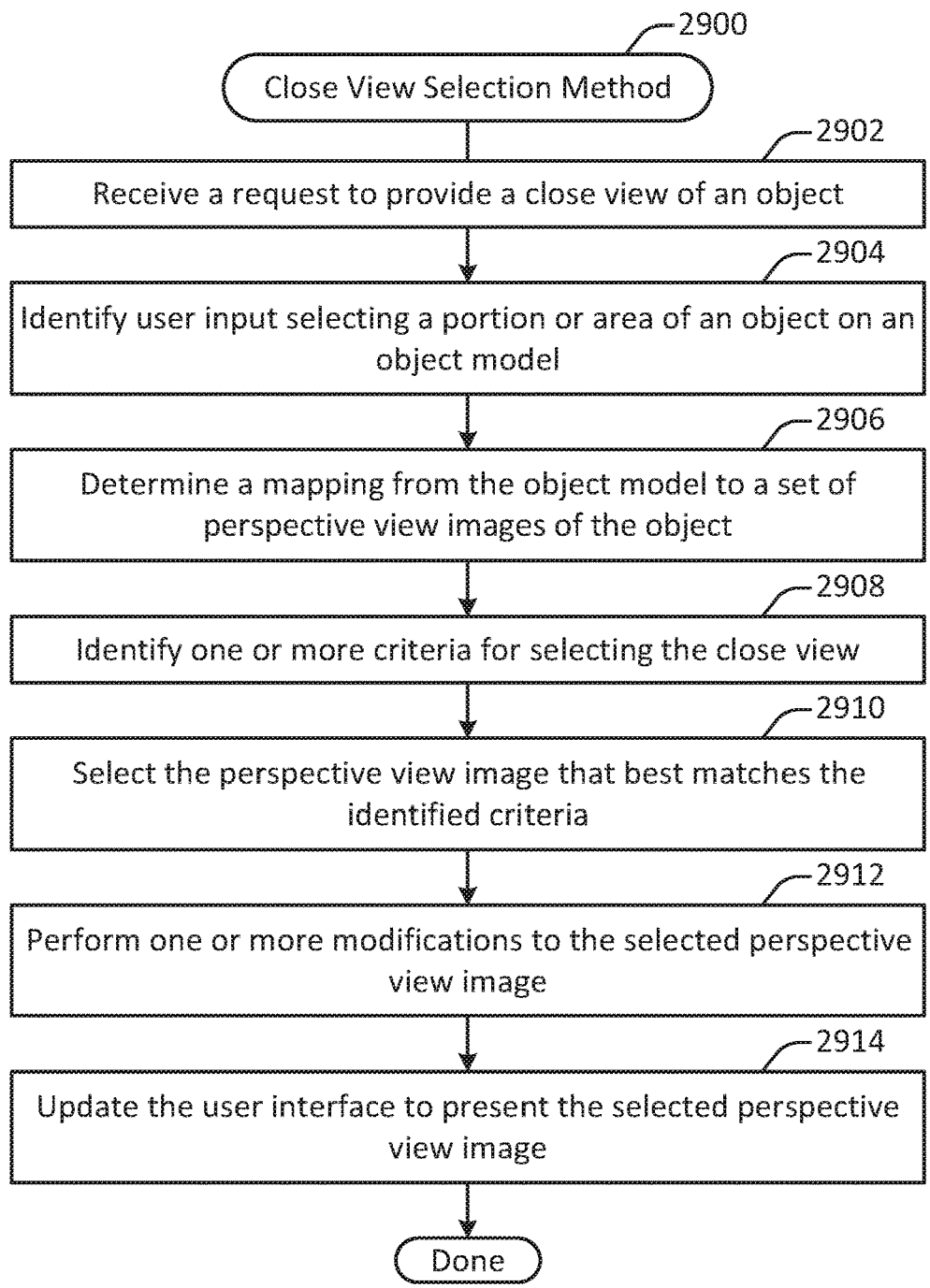
FIG. 29 illustrates a method for selecting a close view of an object, performed in accordance with one or more embodiments.

FIG. 29 illustrates a method 2900 for selecting a close view of an object, performed in accordance with one or more embodiments. According to various embodiments, the method 2900 may be performed in conjunction with providing a viewer for image data of an object, such as the method 2800 discussed with respect to FIG. 28.

A request to provide a close view of an object is received at 2902. According to various embodiments, the request may be generated based on user input. For instance, a user may hover a mouse over or otherwise select a designated portion of an object model such as a two-dimensional top-down view.

In particular embodiments, the request may be generated automatically. For instance, a close view may be automatically provided for a portion of an object that has been identified as damaged.

At 2906, a mapping from the object model to each of a set of perspective view images of the object is determined. In some implementations, and as discussed elsewhere herein, the mapping may provide a pixel-by-pixel correspondence between the object model and the perspective view images.

At 2908, one or more criteria for selecting the close view are identified. In some implementations, the criteria may be selected automatically. Alternatively, the user may select one or more criteria for selecting the close view.

According to various embodiments, any or all of a variety of criteria may be used. For instance, the image from the set that is closest to the selected point in distance and/or orientation may be selected. Other examples of such criteria are discussed below with respect to the operation 3204 shown in FIG. 32.

At 2910, the perspective view image that best matches the identified criteria is selected. According to various embodiments, the perspective view image may be selected at least in part by comparing the mapping determined at 2906 with the criteria identified at 2908. Alternatively, or additionally, other comparisons may be performed. For instance, images may be evaluated based on factors such as distance and focal length.

In some implementations, more than one close image may be selected. For example, if the same portion of the vehicle is captured in different images but at, for instance, different distances or with different focal lengths, then the viewer may switch between the different images. For example, the viewer may switch according to a level of zoom requested by the user. In such a configuration, a multi-resolution image may be presented initially, while a lower resolution version of the image may be presented if the user requests a wide view of the vehicle. Alternatively, or additionally, a close-up image with higher resolution may be presented if the user zooms in. Additional details relating to the presentation of a view close to a selected area or feature are discussed with respect to the method 2900 shown in FIG. 29.

One or more modifications to the selected perspective view image are optionally performed at 2912. For example, an image may be cropped to show a close-up of the selected area rather than a wide view.

The user interface is updated to present the selected perspective view image at 2914.

Figure 31:
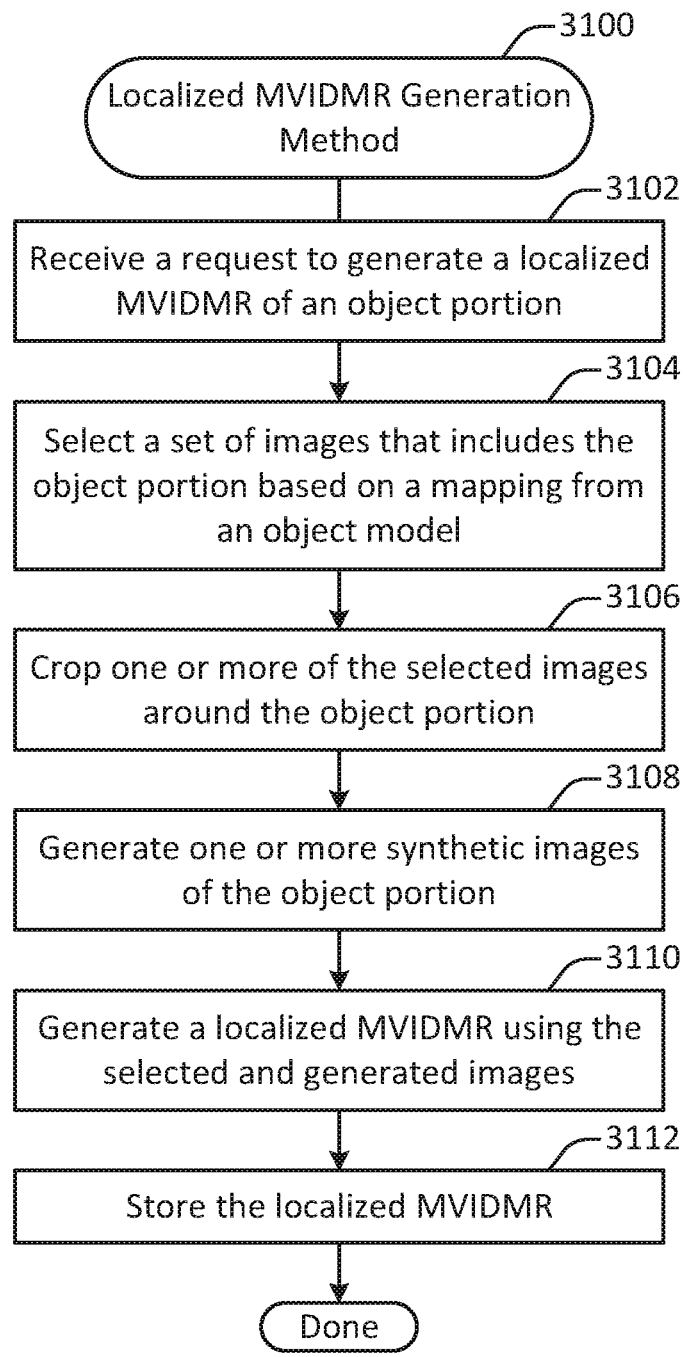
FIG. 31 illustrates a method for localized MVIDMR generation, performed in accordance with one or more embodiments.

FIG. 31 illustrates a method 3100 for localized MVIDMR generation, performed in accordance with one or more embodiments. The method 3100 may be performed at any suitable computing device. For instance, the method 3100 may be performed at a computing device in communication with a mobile phone or a damage detection portal.

A request to generate a localized MVIDMR of an object portion is received at 3102. In some implementations, the request may be generated based on user input. Alternatively, or additionally, a request may be generated automatically. For example, the method 3100 may be performed to generate a localized MVIDMR of an area of an object identified as being damaged. For instance, the method 3000 discussed with respect to FIG. 30 may result in the identification of one or more components of an object that have been damaged. Then, a localized MVIDMR may be automatically generated.

As another example, the method 3100 may be performed to generate a localized MVIDMR of an area of an object identified as being a feature of interest. For instance, the method 3100 may be performed to generate a localized MVIDMR of an area of a vehicle that exhibits a distinctive feature, such as a front grill, or an area that is frequently scratched or damaged, such as a headlight.

In particular embodiments, a request to generate a localized MVIDMR of an object portion may be automatically generated when a determination is made that a feature is present. For instance, one or more images may be analyzed to determine whether a feature indicated on a top-down view is present in a perspective view image. Such a determination may be made at least in part based on a top-down mapping from the perspective view to the top-down view.

According to various embodiments, the object portion may be identified in any of various ways. For instance, the object portion may be identified as an area or component on an object model associated with the object. The object model could be a two-dimensional top-down view, a three-dimensional skeleton, or any suitable object model.

A set of images that includes the object portion is selected at 3104 based on a mapping from the object model. In some implementations, the images may be collected as the object passes through a damage detection portal. Alternatively, or additionally, one or more images may be captured by a handheld device such as a mobile phone. The images may be mapped to the object model. Then, the correspondence between the images and the object model may be used to determine which images include the identified portion of the object.

One or more of the selected images may be optionally cropped around the object portion at 3106. In some implementations, cropping an image may involve first identifying a portion of the image that corresponds to the identified object component. The identification may involve performing object identification on the identified image. Alternatively, or additionally, the object component mapping may be used to identify the portion of the image that maps to the identified portion of the object.

In particular embodiments, an image may be cropped so that the image is centered around the object portion of interest. Alternatively, or additionally, an image may be cropped so that the object portion of interest occupies the majority of the frame.

One or more synthetic images of the object portion may be optionally generated at 3108. In some implementations, synthetic image generative may involve a light field technique. For instance, each of a plurality of two-dimensional images may be elevated into a respective multi-plane images. The multiplane images around the synthetic viewpoint may be combined to generate a synthetic multiplane image at the synthetic viewpoint. The synthetic multiplane image may then be projected back into a two-dimensional image. A synthetic image may provide for a more seamless transition between frames.

A localized multi-view interactive digital media representation (MVIDMR) is generated at 3110. The localized MVIDMR is then stored at 3112, which may involve storing the localized MVIDMR on a local storage device and/or transmitting the localized MVIDMR to a remote location. According to various embodiments, the MVIDMR may be generated in accordance with techniques and mechanisms throughout the application as filed.

Figure 32:
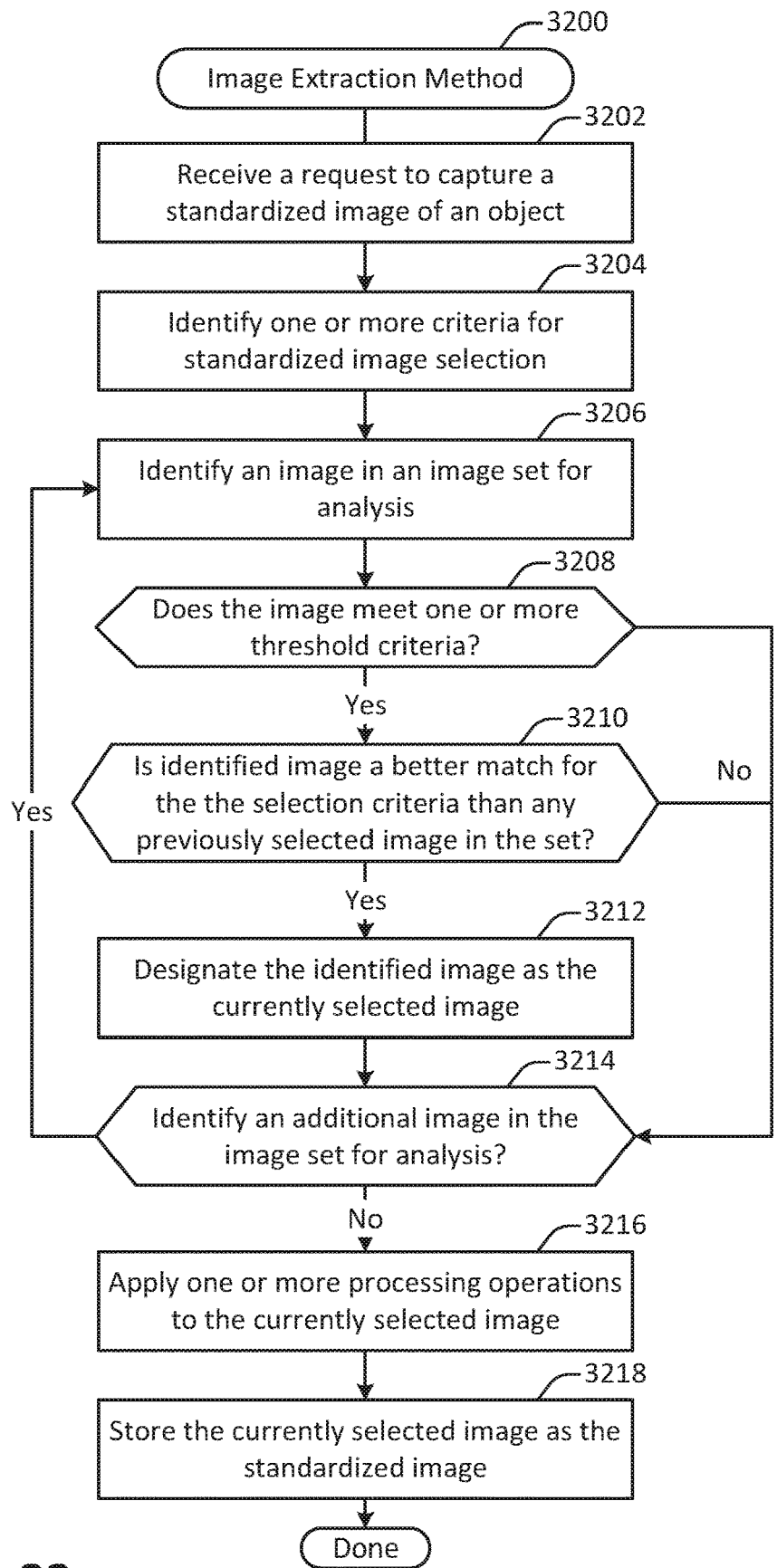
FIG. 32 illustrates an image extraction method, performed in accordance with one or more embodiments.

FIG. 32 illustrates an image extraction method 3200, performed in accordance with one or more embodiments. The method 3200 may be used to select one or more standardized images from a set of images.

In some implementations, a standard image may be an image of an object that is captured from a relatively standardized position relative to an object. For example, one standard image of a vehicle may be captured by a camera located directly in front of and slightly above the vehicle. As another example, another standard image of the vehicle may be captured by a camera located at a 30-degree angle from the front right of the vehicle. As discussed herein, various types of criteria may be used to specify a standardized image.

According to various embodiments, standard images may be used in a variety of contexts. For example, automotive wholesale and retail operations often employ a set of standard images to present cars to potential buyers. When using conventional techniques, obtaining these images in a consistent and efficient way is often challenging and requires a significant amount of training for human camera operators.

At 3202, a request to capture a standardized image of an object is received. In some implementations, the request may be generated based on user input. Alternatively, the request may be generated as part of an automatic process.

One or more criteria for selecting a standardized image are identified at 3204. According to various embodiments, a variety of selection criteria may be used. A few of the possible selection criteria are described in the following paragraphs.

In a first example, a selection criteria may be related to the portion of an image frame occupied by an object. For instance, an image of an object in which the object occupies a greater percentage of the image frame may be designated as a superior standardized image.

In a second example, a selection criteria may be related to a location within the image frame occupied by the object. For instance, an image of an object in which the object occupies a central position within the image frame, and/or a portion of the image frame with the best focus, may be designated as a superior standardized image.

In a third example, a selection criteria may be related to a distance between the object and the camera. For instance, an image of an object may be designated as a superior standardized image when the distance between the object and the camera is closer to a designated distance.

In a fourth example, a selection criteria may be related to object orientation. For instance, an image of an object may be designated as a superior standardized image when the object is located more closely with a designated orientation with respect to the camera.

In a fifth example, a selection criteria may be related to feature coverage. For instance, an image of an object may be designated as a superior standardized image when one or more designated features of the object are captured more completely in the image frame.

In particular embodiments, more than one selection criteria may be used. In such a configuration, one or more configuration parameters may be used to specify how to balance between the various selection criteria. For example, a standardized image may be identified as (1) being captured from within a particular range of angular orientations with respect to the object, (2) being captured from within a particular range of distances from the object, (3) including all of the object within the image frame, and (4) maximizing the portion of the image frame occupied by the object.

At 3206, an image in an image set is identified for analysis. According to various embodiments, image sets may be captured in any of various ways. For example, a fixed camera setup may be used, where the object (e.g., a vehicle) is moved past one or more cameras. As another example, the object may remain fixed, while one or more cameras are moved around the object. For instance, a person may capture images of the object using a hand-held camera or mobile computing device such as a mobile phone.

In particular embodiments, images may be analyzed from the image set in any suitable order. For example, images may be analyzed in sequence, in parallel, at random, or in any suitable order. As another example, images may be pre-processed to identify candidate images that are more likely to meet one or more selection criteria.

At 3208, a determination is made as to whether the identified image meets one or more threshold criteria. According to various embodiments, as discussed above, one or more selection criteria may be used. For instance, an image may only be suitable as a standardized image if it is identified as (1) being captured from within a particular range of angular orientations with respect to the object, (2) being captured from within a particular range of distances from the object, and (3) including all of the object within the image frame.

At 3212, a determination is made as to whether the identified image is a better match for the selection criteria than any previously selected image in the set. When the image is so identified, then at 3212 it is designated as the currently selected standardized image. For example, of the images identified at 3208 as meeting the threshold selection criteria, the image in which the object occupies a greater proportion of the image frame may be identified as the superior image.

At 3214, a determination is made as to whether to identify an additional image in the image set for analysis. In some implementations, each image in the image set may be analyzed. Alternatively, or additionally, successive images may be analyzed until one is identified that sufficiently meets the criteria for a standardized image.

At 3216, one or more processing operations are optionally applied to the currently selected image. In some implementations, one or more of a variety of processing operations may be employed. For example, an image may be improved, for instance by blurring the background around the object. As another example, the object may be segmented out from the frame and background, and the background may be blurred or replaced with a custom background for imaging purposes.

At 3218, the currently selected image is stored as the standardized image. According to various embodiments, storing the image may involve transmitting the image to a local or remote storage device.

Figure 33:
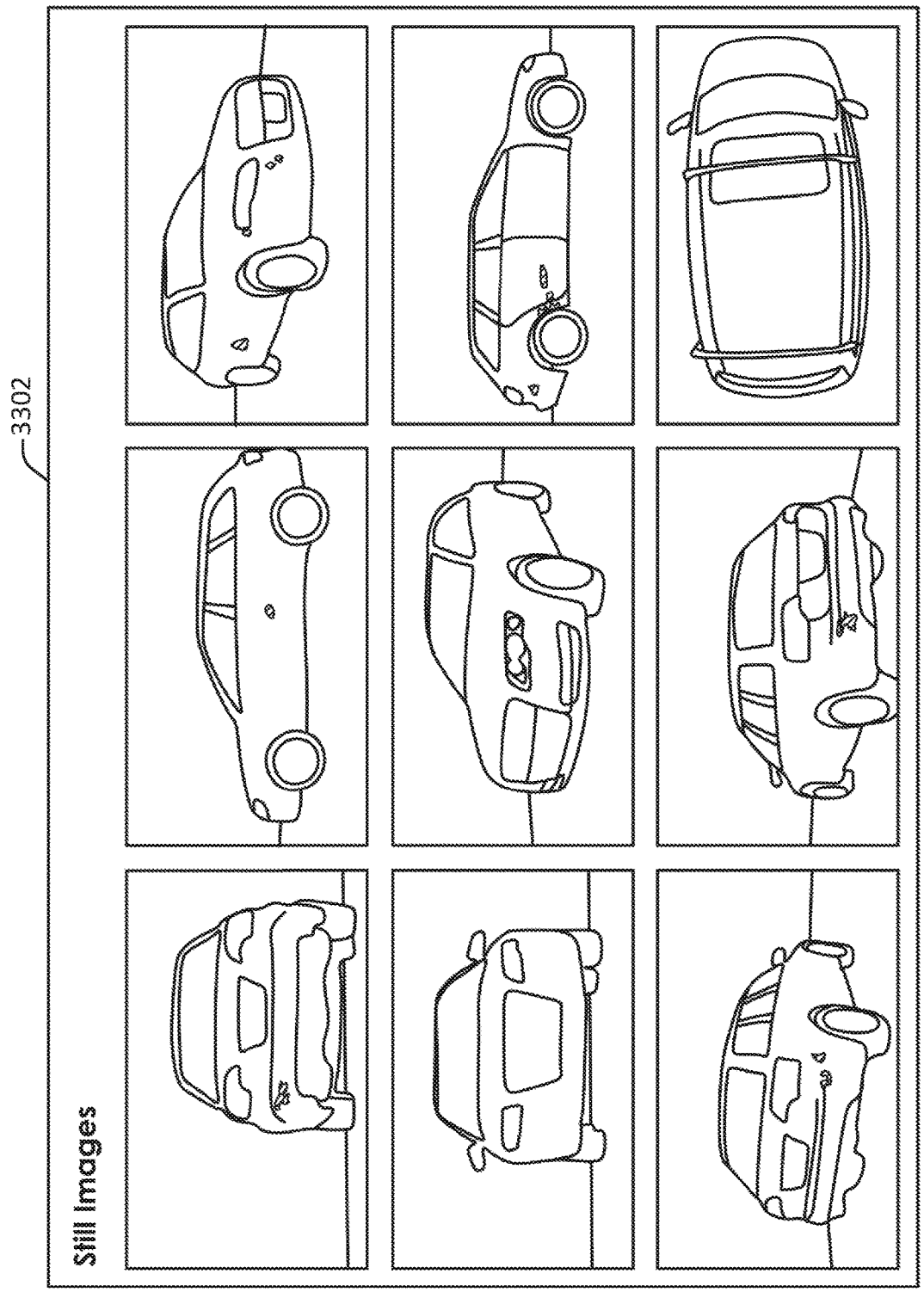
FIGS. 33-49 illustrate user interfaces generated in accordance with one or more embodiments.

FIGS. 33-49 illustrate user interfaces generated in accordance with one or more embodiments. In FIG. 33, a set of standard images 3302 is presented that illustrate a vehicle from a set of specific, predetermined viewpoints.

Figure 34:
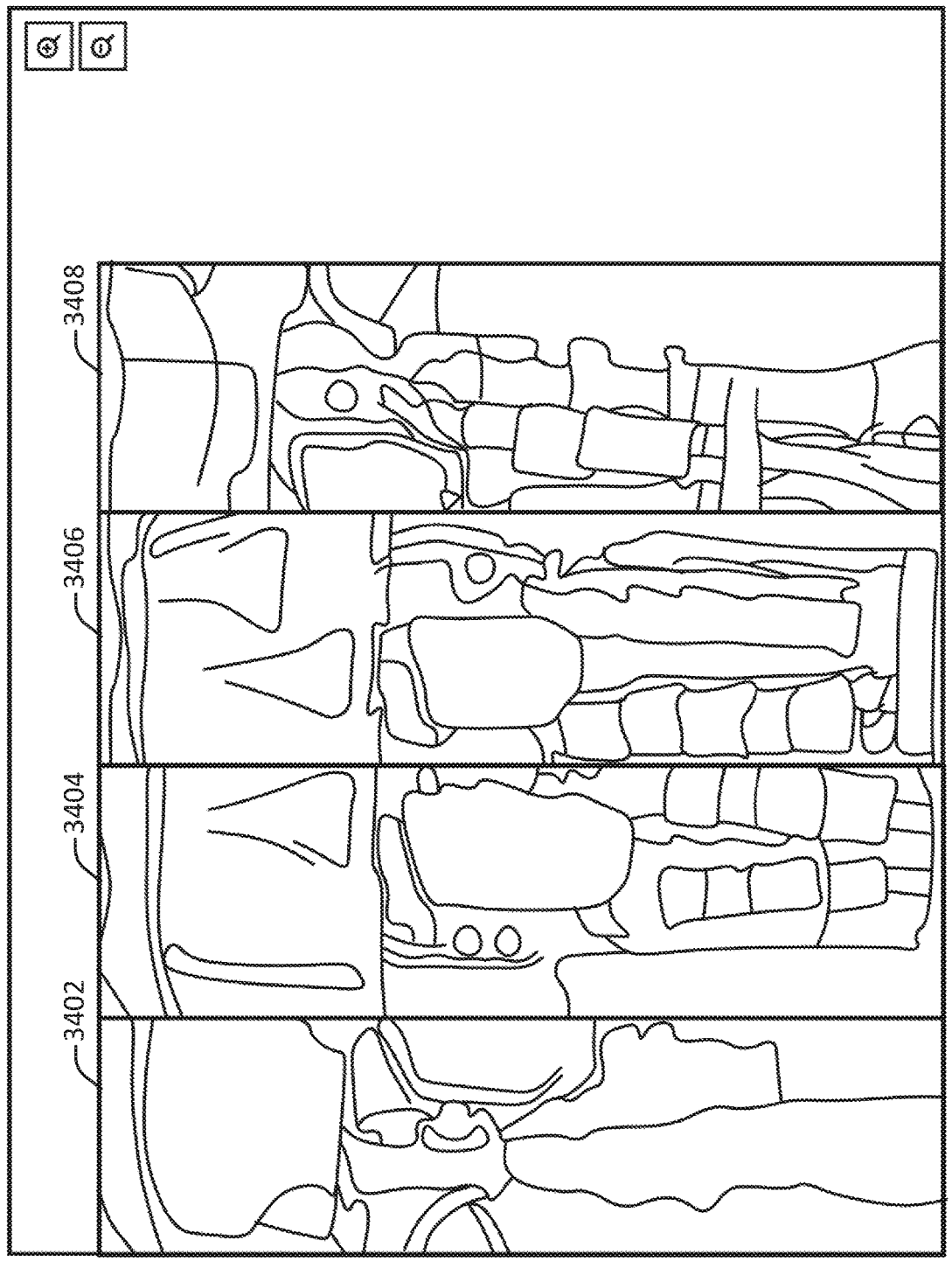
Figure 35:
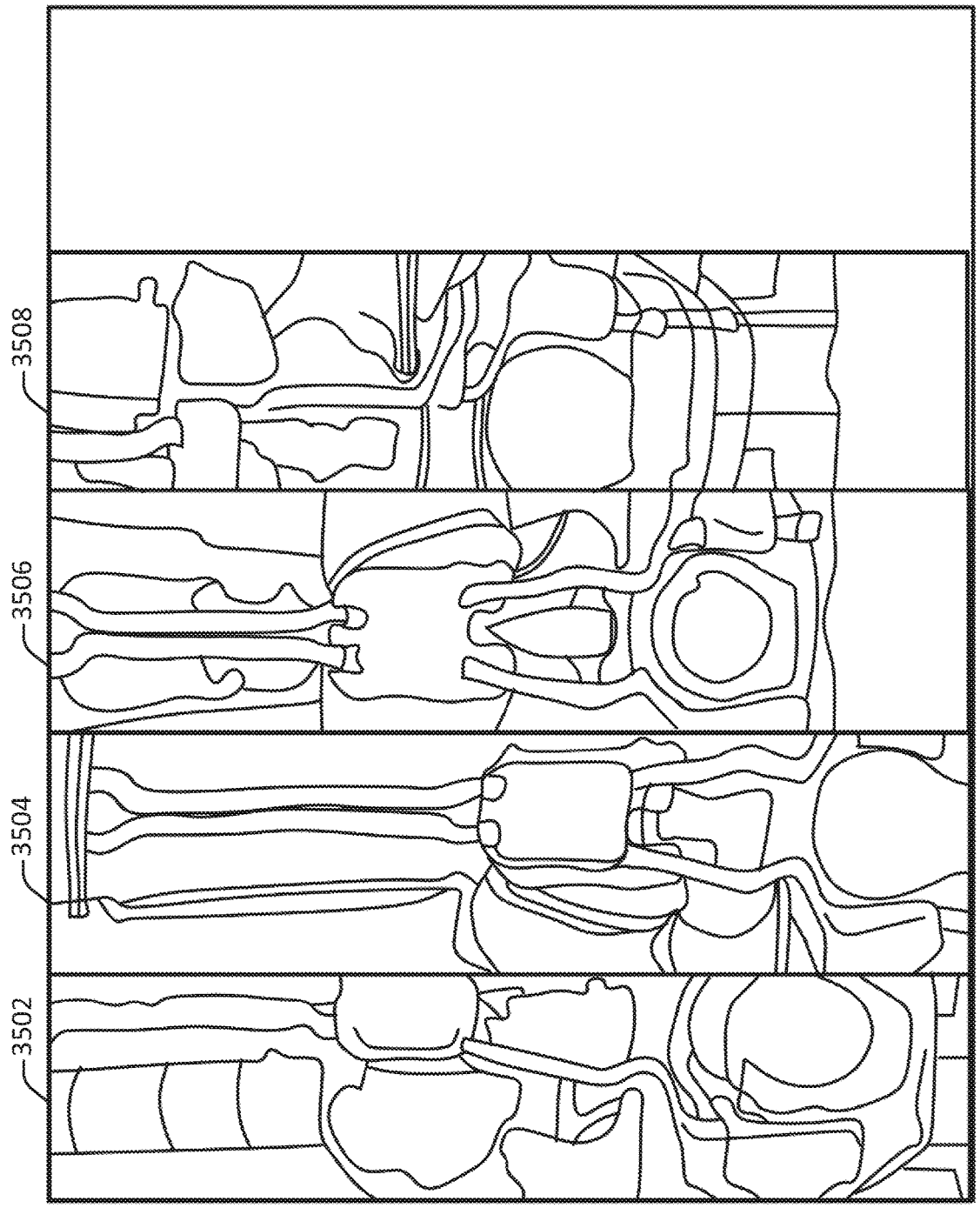

FIGS. 34-35 illustrate different perspectives of a vehicle undercarriage captured from different cameras in accordance with one or more embodiments. For example, different undercarriage cameras may capture images 3402, 3404, 3406, and 3408 of the undercarriage. The images may be presented as MVIDMRs, and may be navigable in one or more dimensions. For example, dragging the images in FIG. 34 may lead to the presentation of new images 3502, 3504, 3506, and 3508 shown in FIG. 35.

Figure 36:
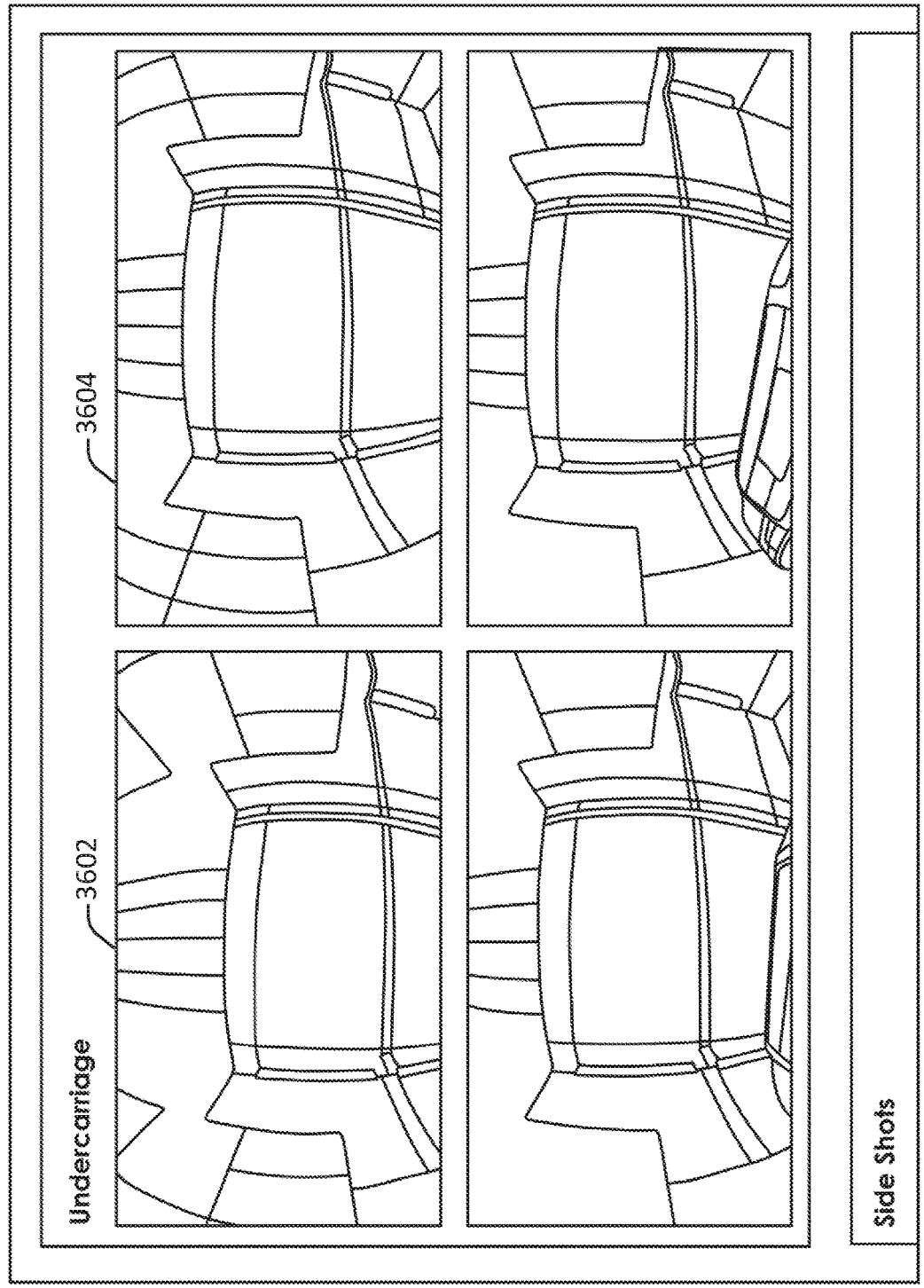
Figure 37:
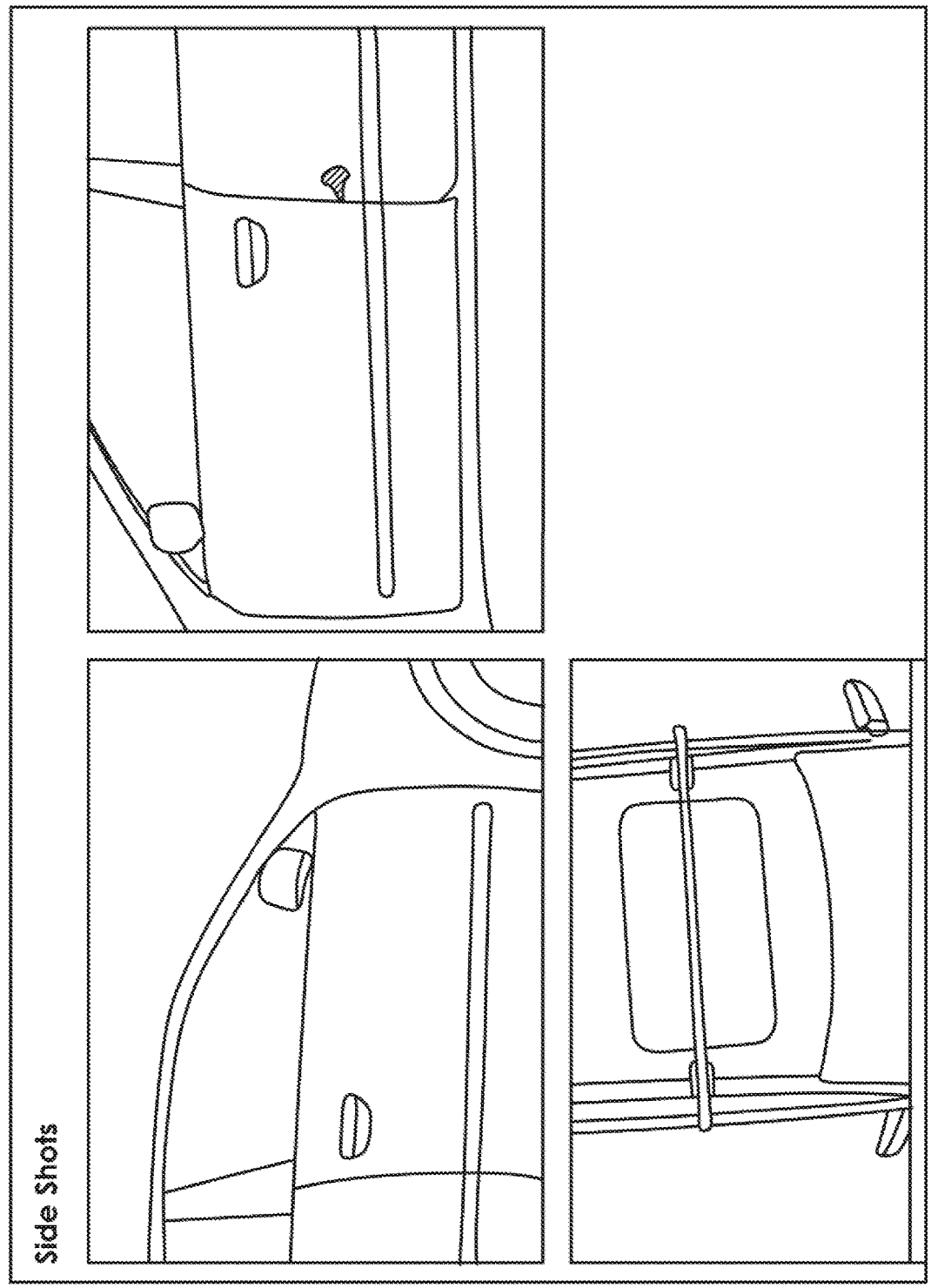
Figure 38:
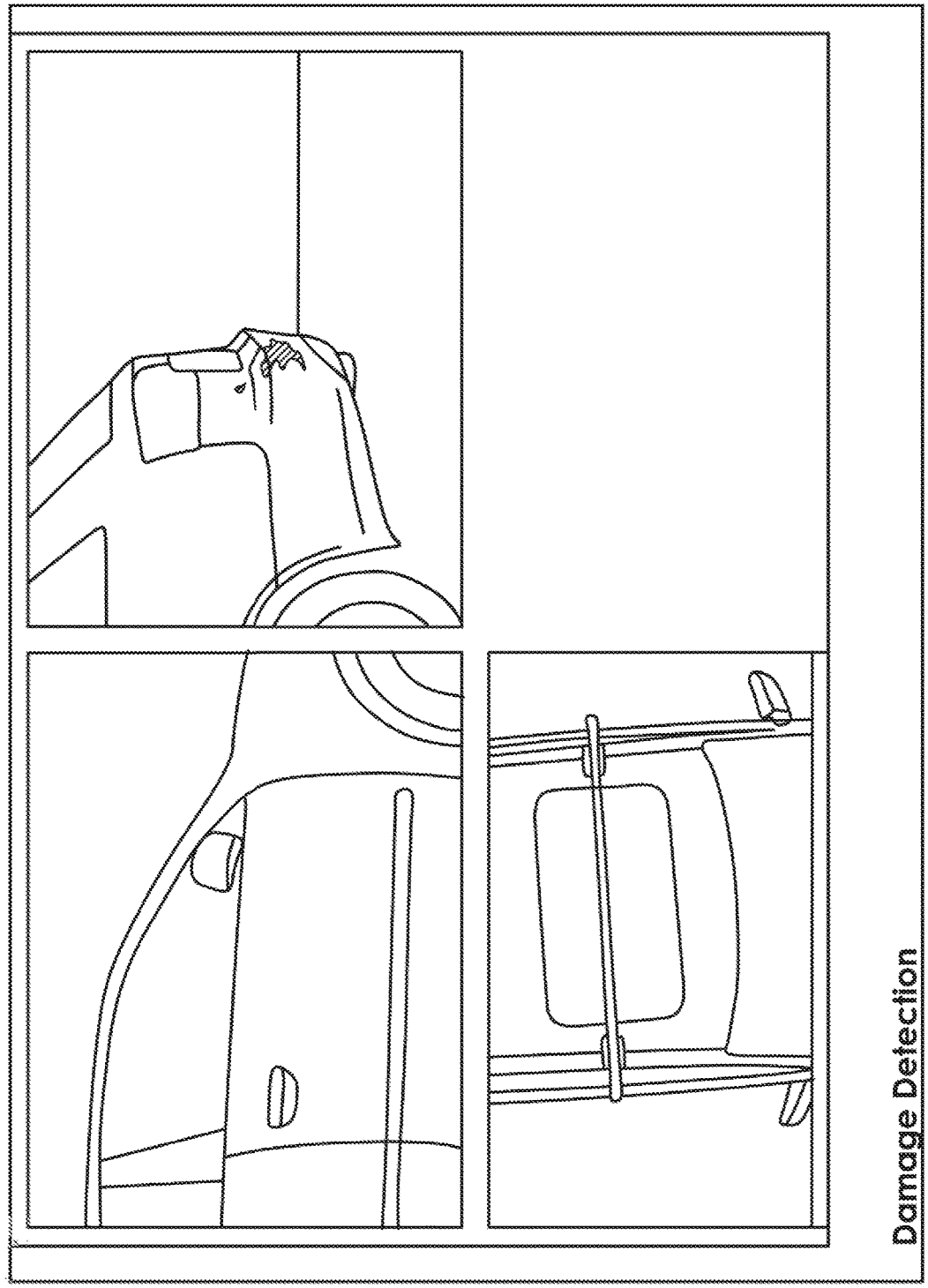
Figure 39:
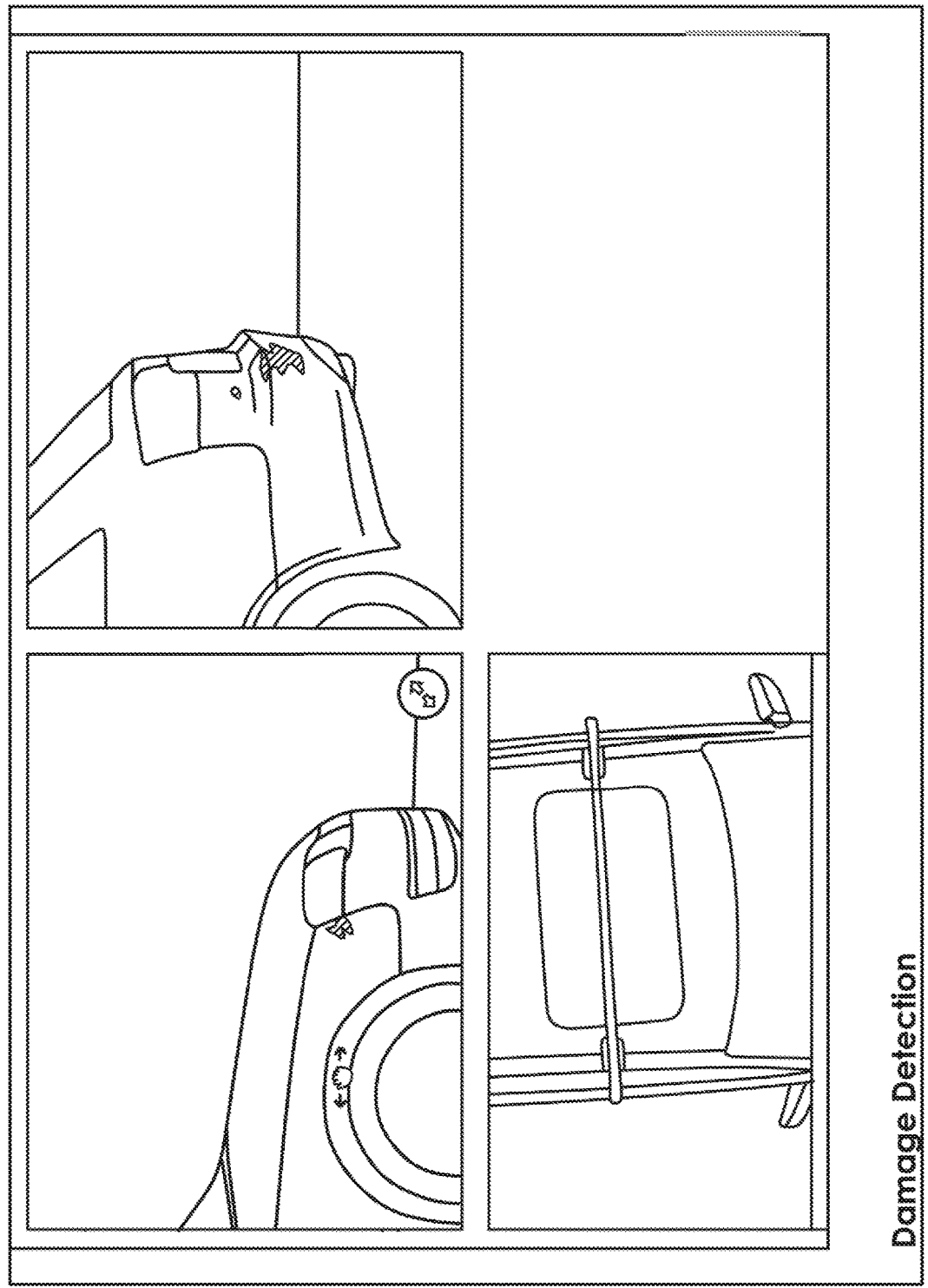

FIG. 36 illustrates images captured by undercarriage cameras without a vehicle in place, including the images 3602 and 3604. As the vehicle moves over the undercarriage cameras, the cameras can capture images of different portions of the undercarriage, which can then be stitched into larger images that show a greater portion of the undercarriage than would an individual image.

Figure 40:
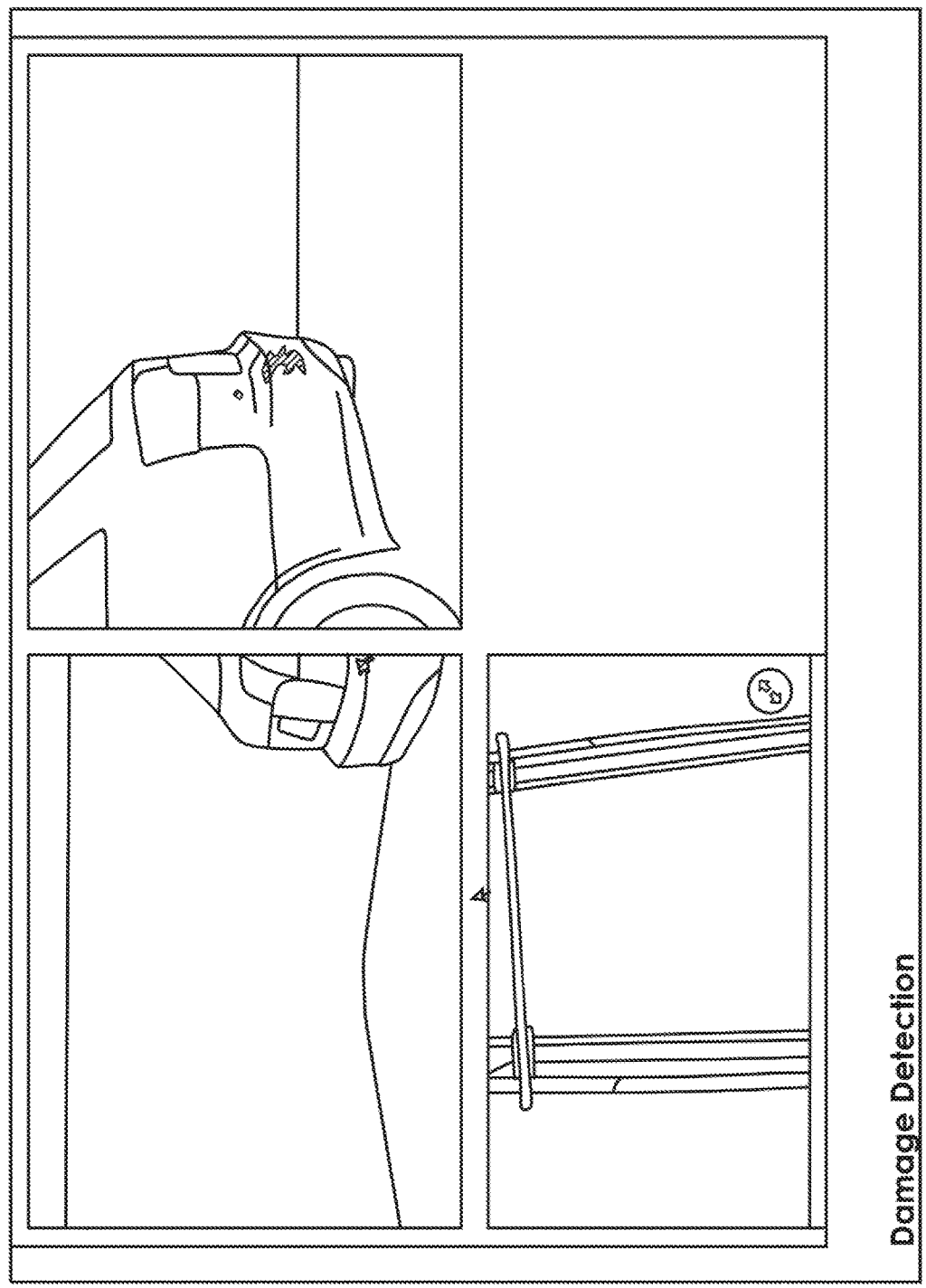

FIGS. 37-40 illustrate MVIDMRs from the perspective of the left side, the right side, and the top of the vehicle, generated in accordance with one or more embodiments. Each of the MVIDMRs is navigable in one or more dimensions, for instance by dragging the images. For example, in FIGS. 38 and 39, the side shots of the vehicle may be scrolled left and right. In FIG. 40, the top shot of the vehicle may be moved up and down.

Figure 41:
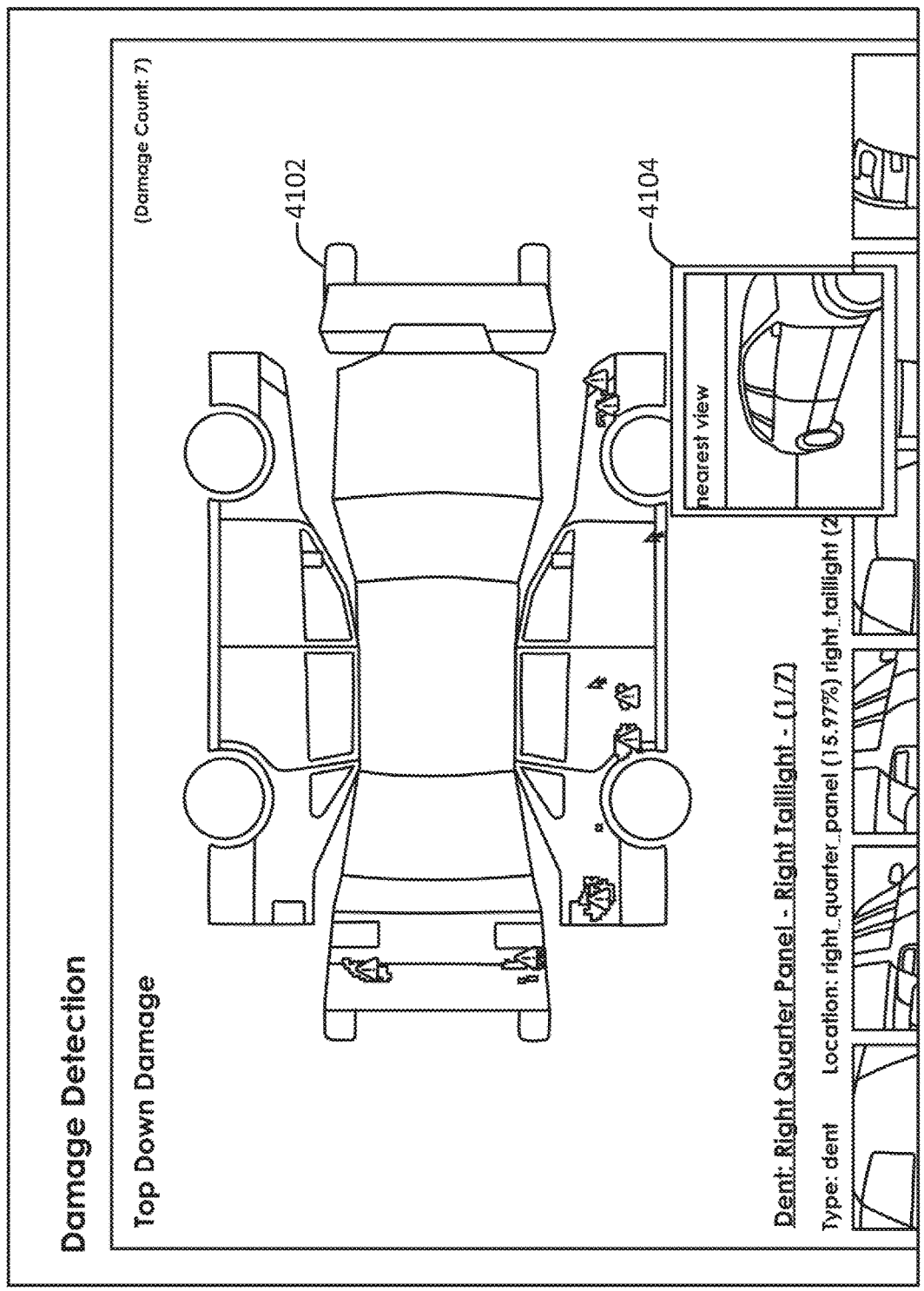
Figure 42:
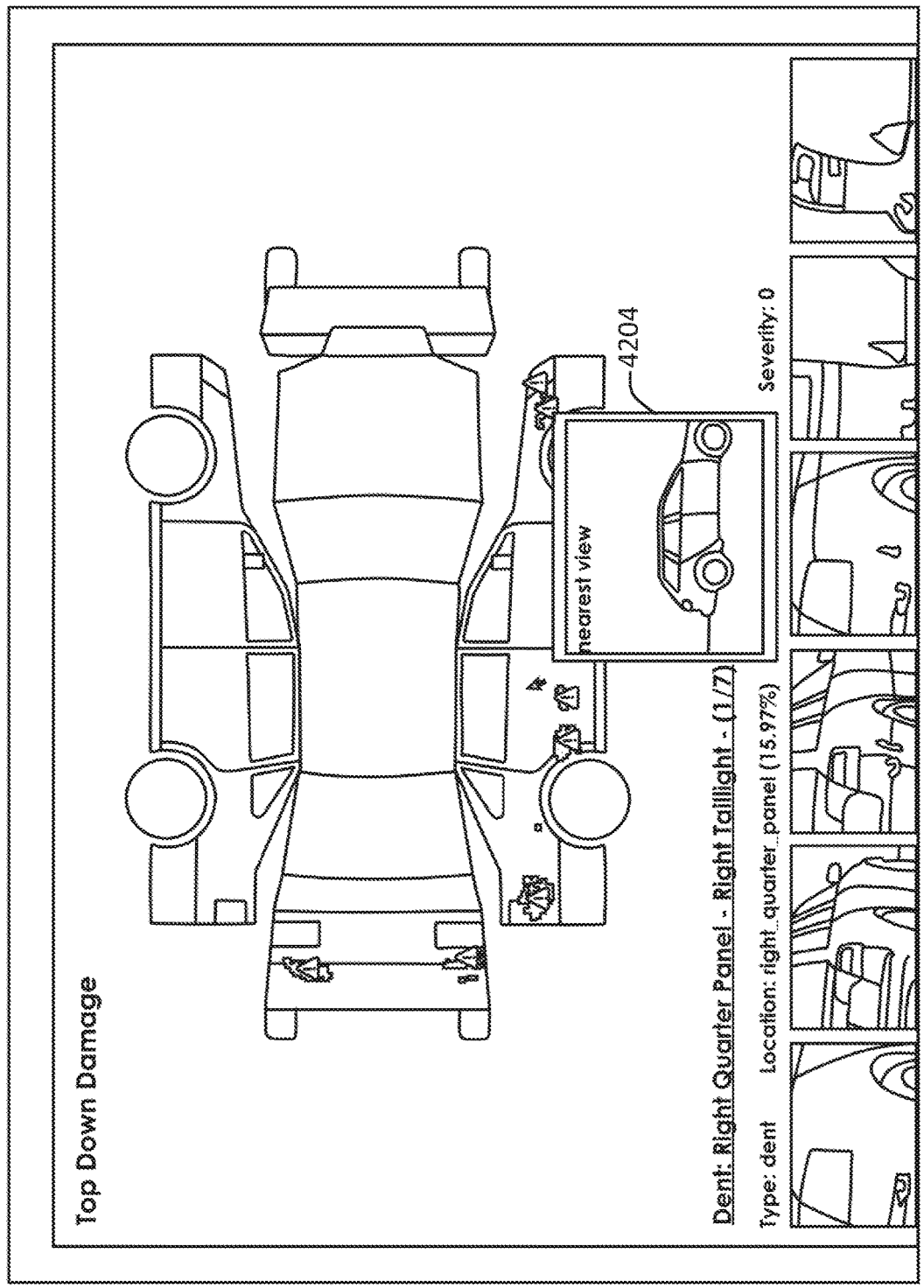
Figure 43:
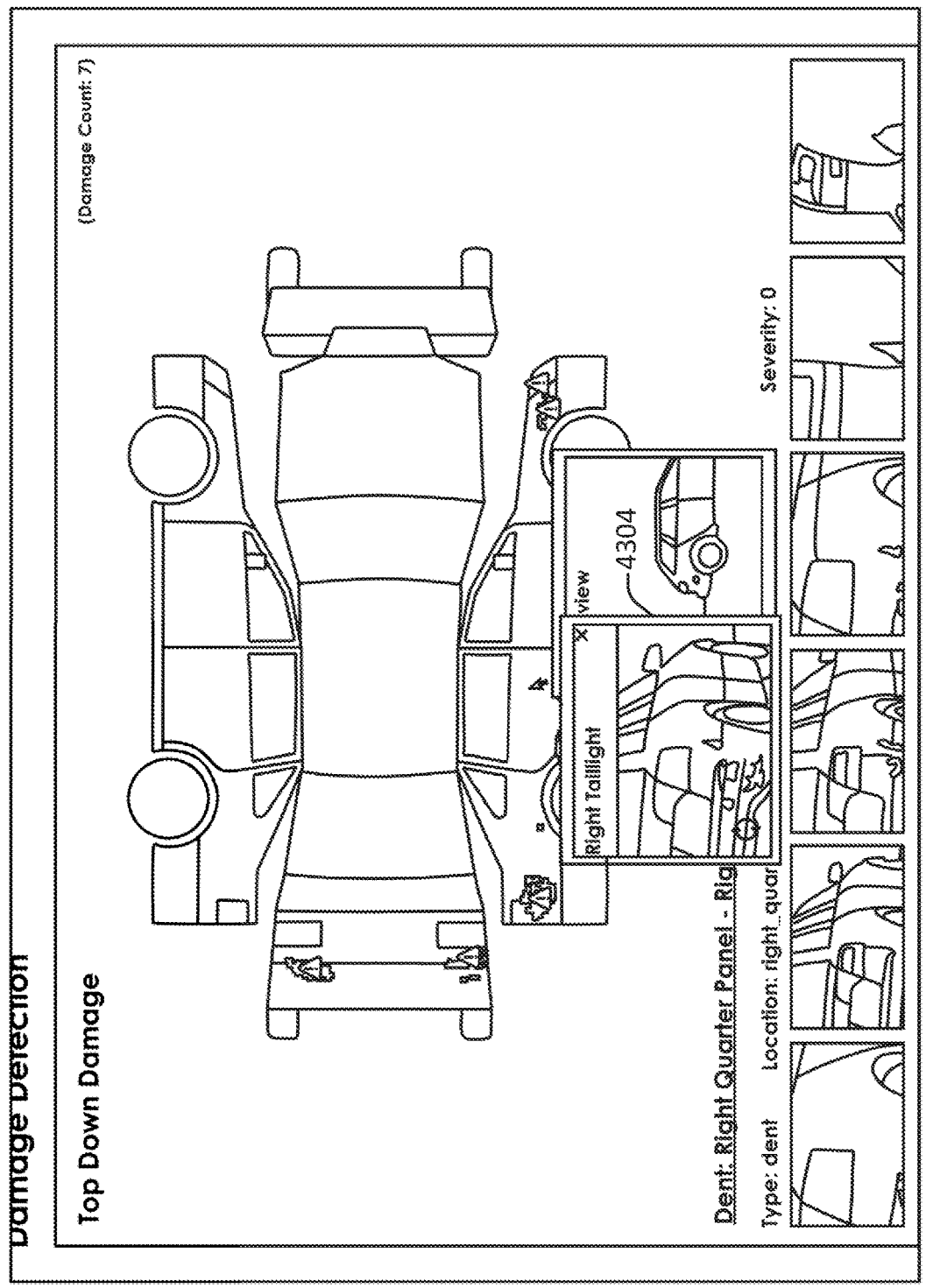

FIGS. 41-43 illustrate nearest views generated in accordance with one or more embodiments and selected based on user input provided via a top-down view. The top-down view 4102 is a two-dimensional pre-determined model 4104 of a vehicle, to which each of the perspective views have been mapped. Detected damage may be illustrated in color and with signs on the top-down view. In each of FIGS. 41-43, an overlay presents the nearest view (e.g., 4104) selected based on the position of the cursor arrow. The nearest view shifts from FIGS. 41-43 to images 4204 and 4304 as the cursor arrow shifts.

Figure 44:
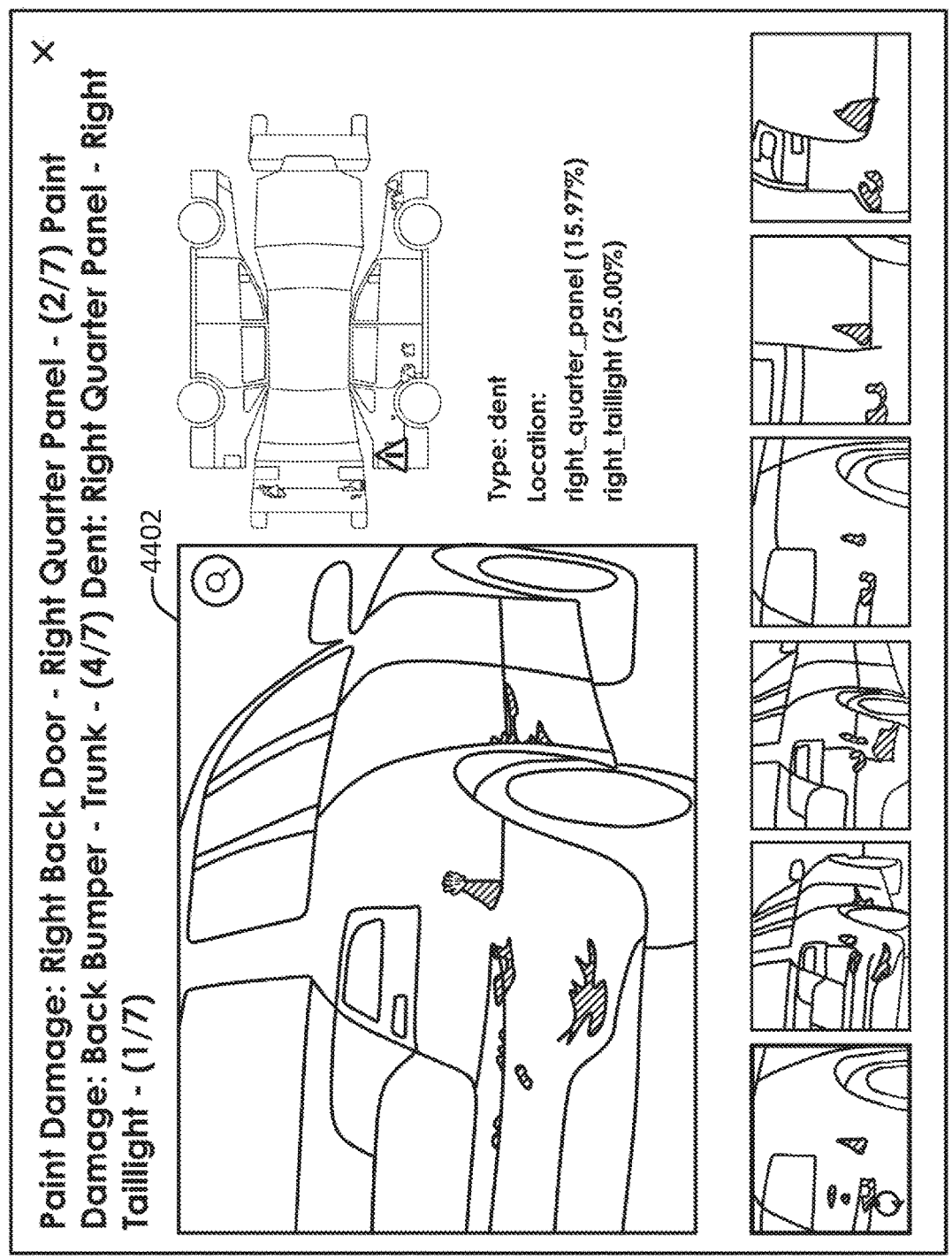
Figure 45:
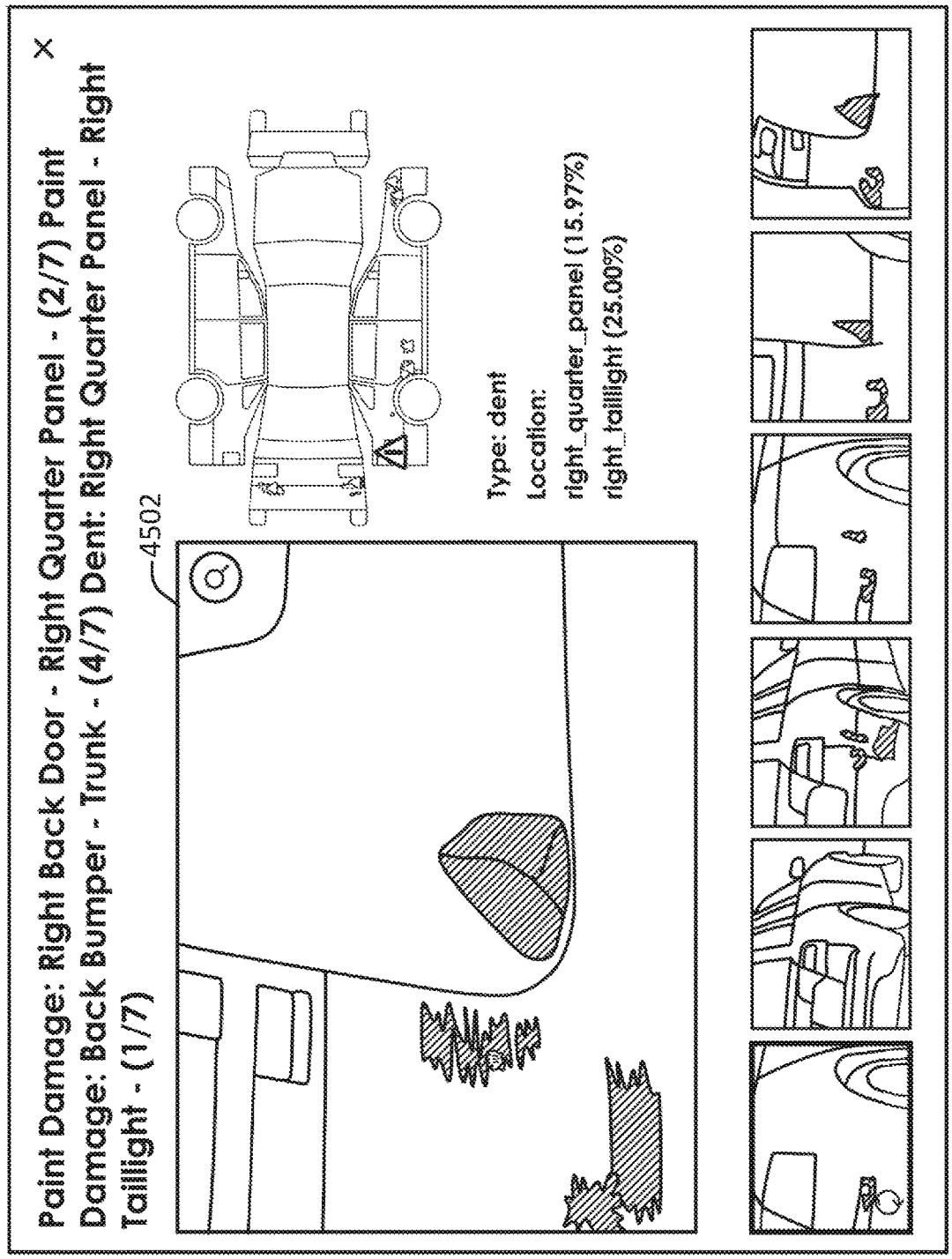
Figure 46:
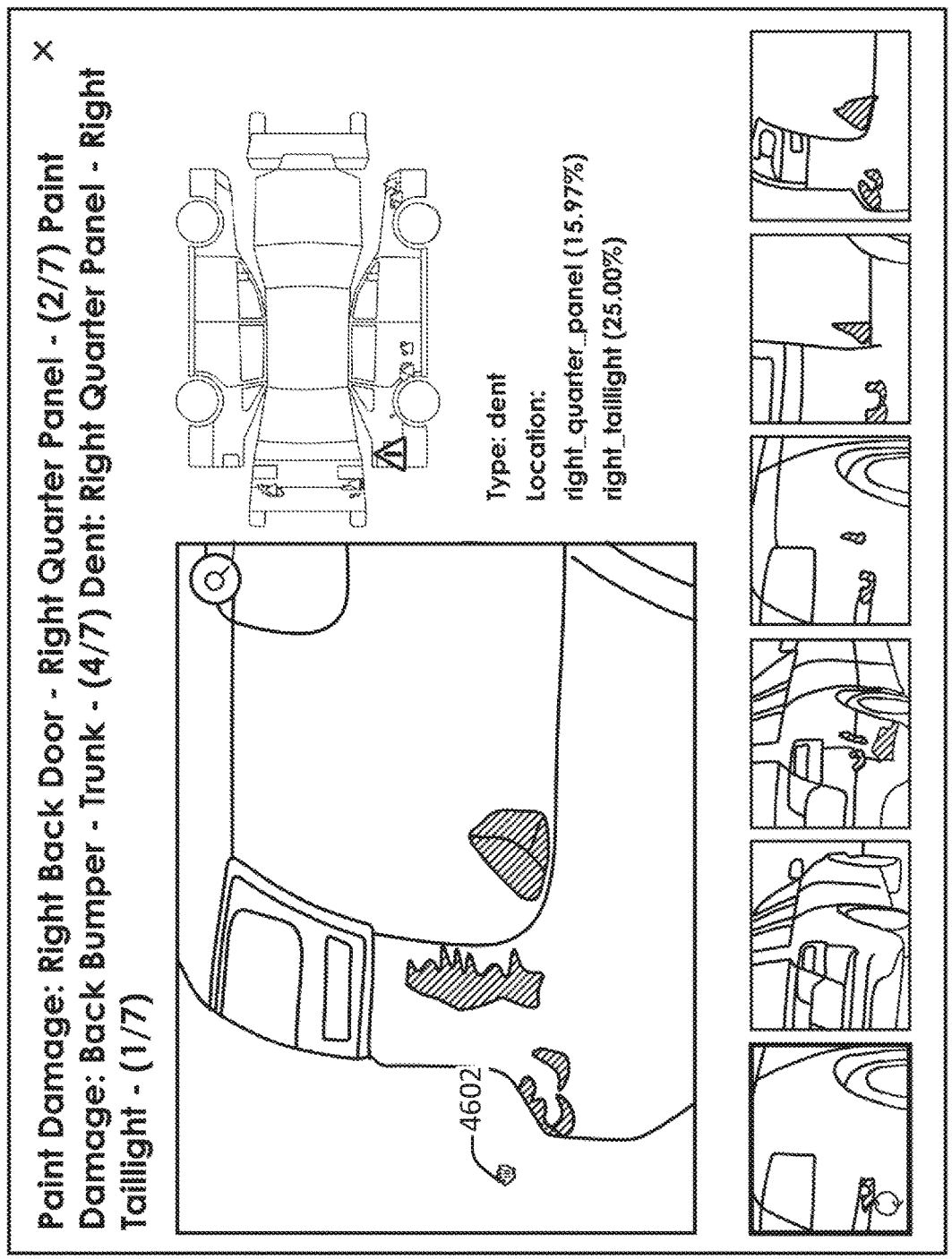
Figure 47:
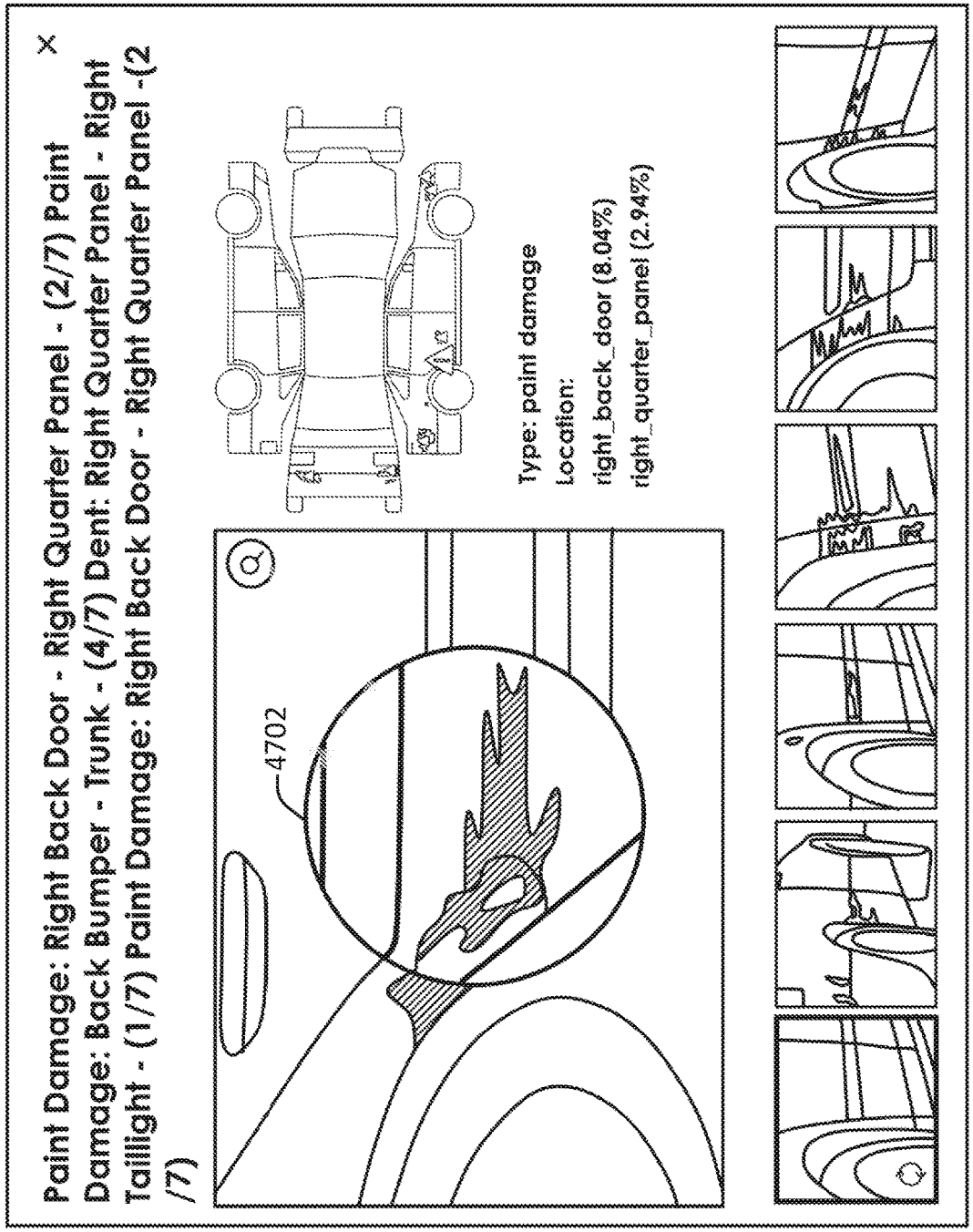

FIGS. 44-47 show individual images from localized MVIDMRs that may be automatically generated for damage areas in accordance with one or more embodiments. In particular, FIGS. 44-46 show localized MVIDMRs that are generated for the back right quarter panel based on damage detected to the back right quarter panel. The MVIDMRs may be zoomed in or out, as is shown in the transition from image 4402 in FIG. 44 to image 4502 FIG. 45, as well as with the zoom bubble 4702 shown in FIG. 47, which shows a particular area of the vehicle at a higher level of detail. The MVIDMRs may also be navigated in one or more dimensions by grabbing the image with the cursor hand 4602 and moving in a direction. Doing so may change the perspective view accordingly, as shown in the transition from FIGS. 45 to 46.

Figure 48:
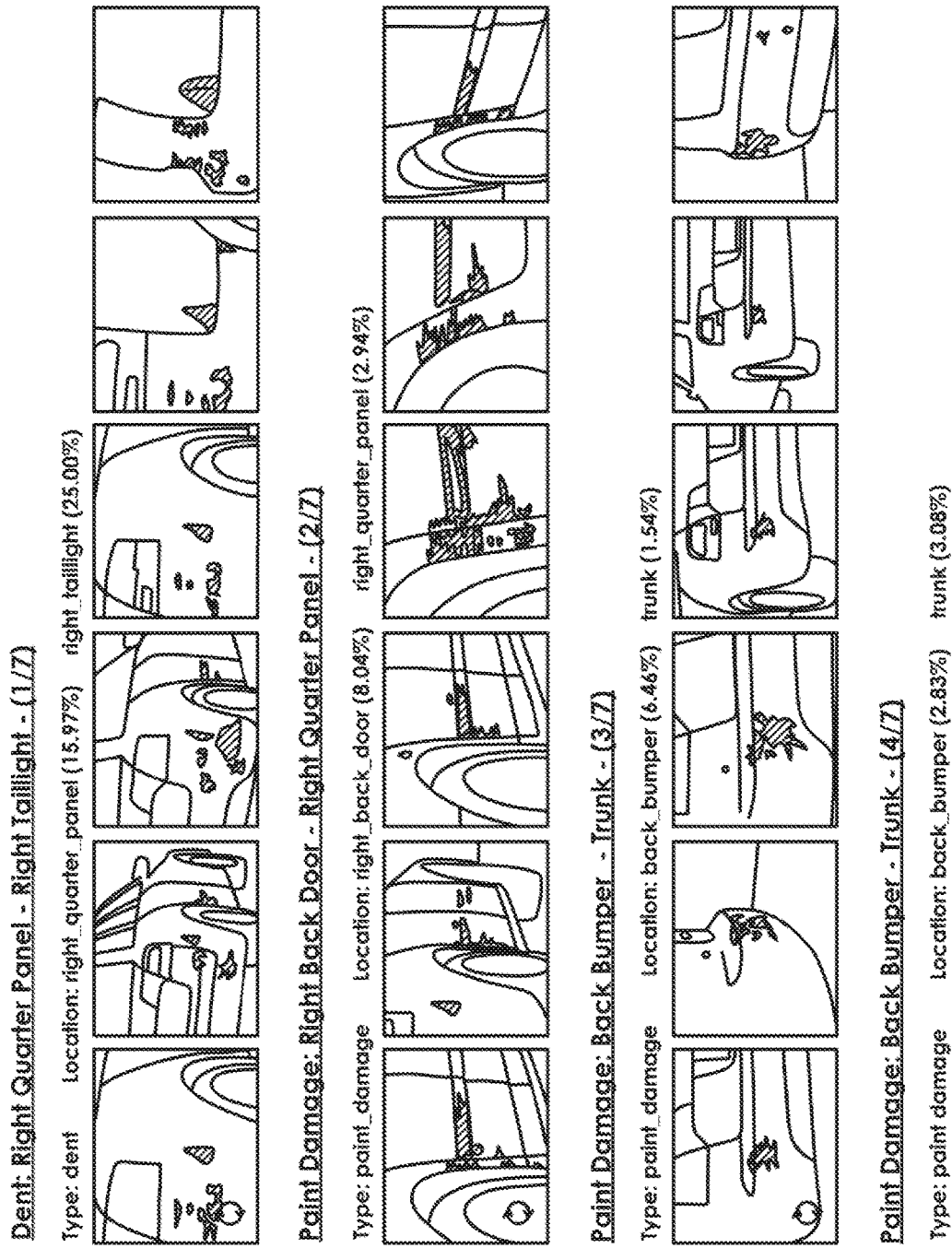
Figure 49:
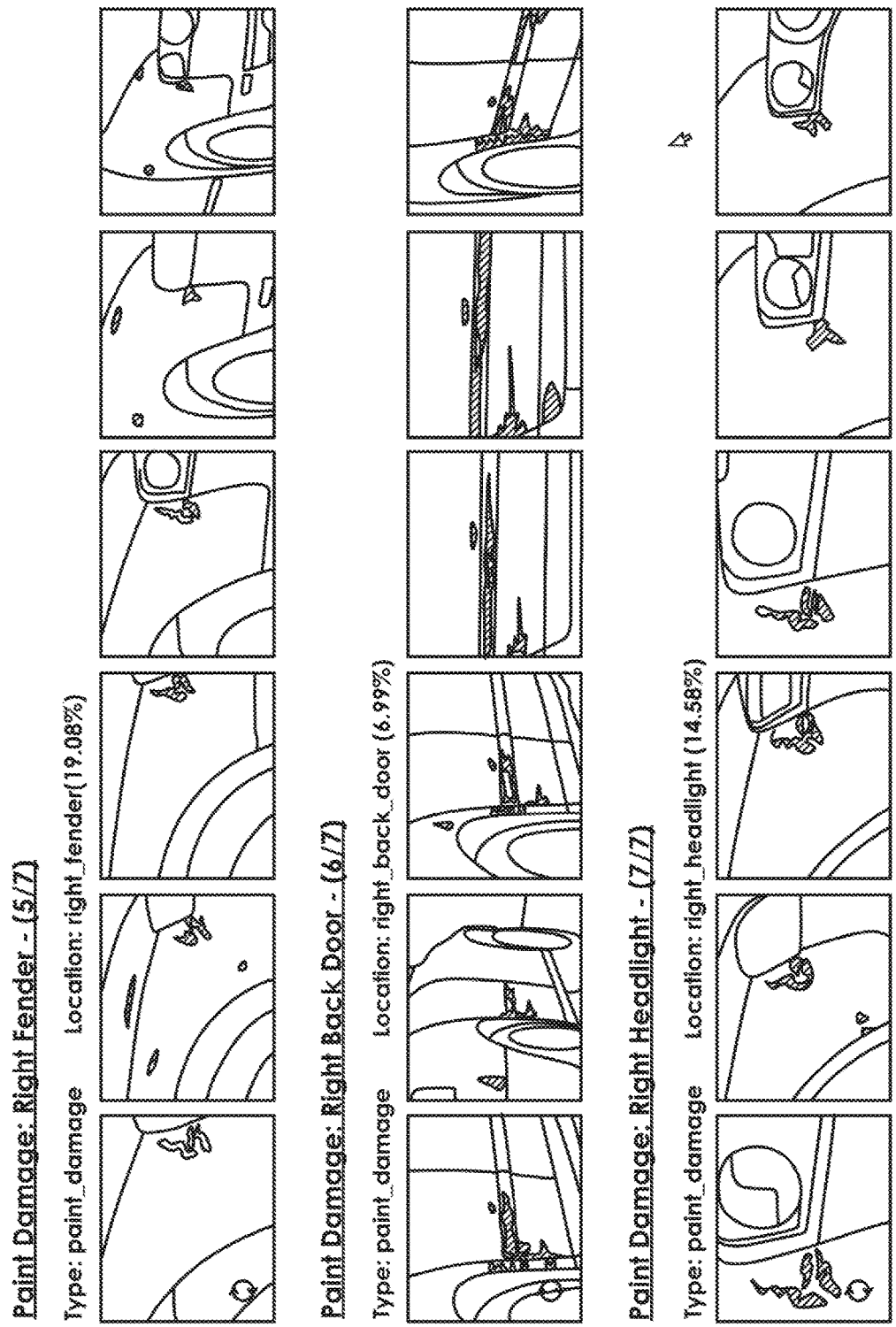

FIGS. 48 and 49 show groups of perspective view images and/or MVIDMRs. These groups may be automatically identified, generated, processed, and group together when damage is detected. In addition, the user interface may provide information such as the type of damage, the location of the damage, the portion of the identified component that is damaged, and the severity of the damage.

Figure 50:
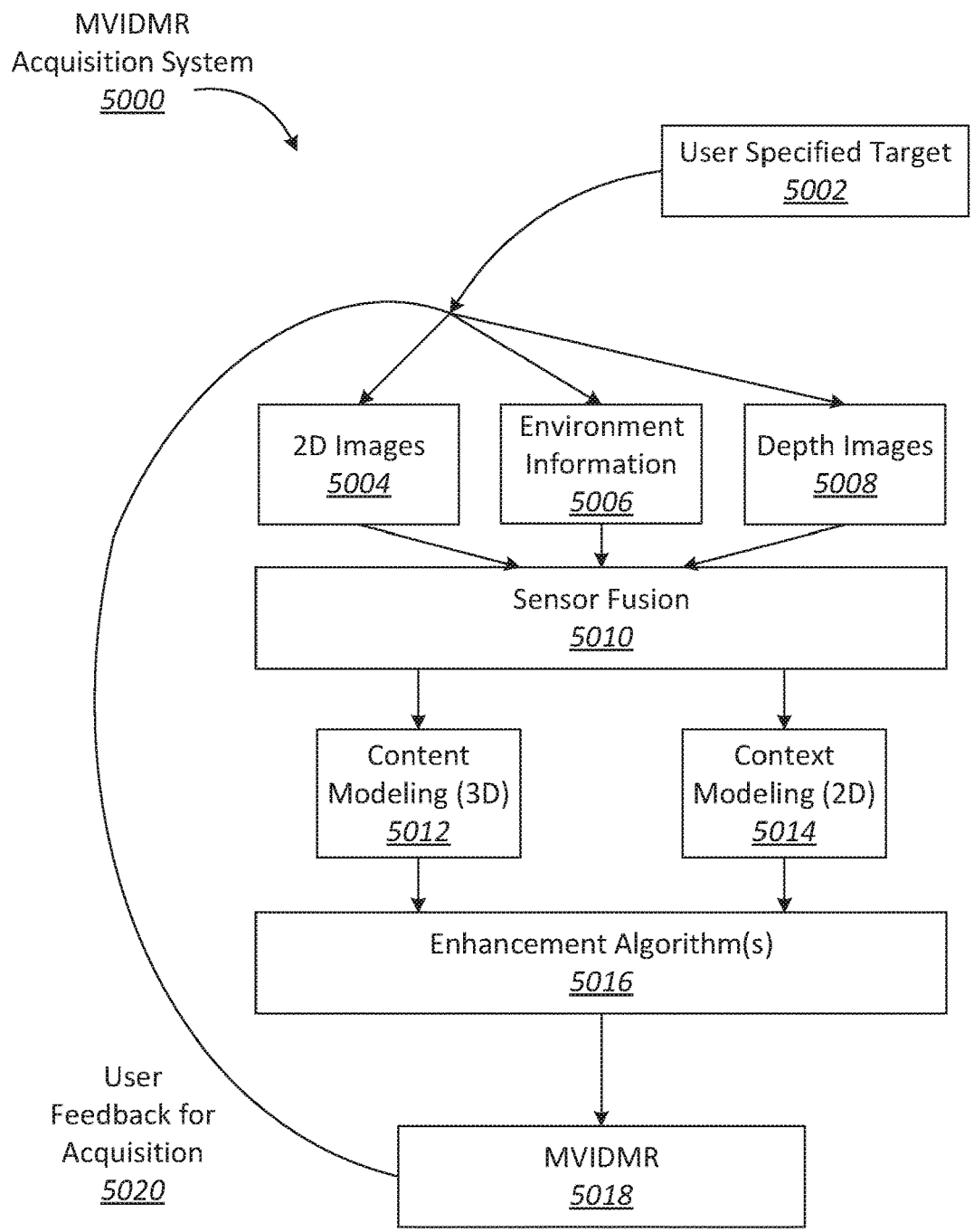
FIG. 50 illustrates an example of a multi-view image digital media representation (MVIDMR) acquisition system, configured in accordance with one or more embodiments.

FIG. 50 shows and example of a MVIDMR acquisition system 5000, configured in accordance with one or more embodiments. The MVIDMR acquisition system 5000 is depicted in a flow sequence that can be used to generate a MVIDMR. According to various embodiments, the data used to generate a MVIDMR can come from a variety of sources.

In particular, data such as, but not limited to two-dimensional (2D) images 5004 can be used to generate a MVIDMR. These 2D images can include color image data streams such as multiple image sequences, video data, etc., or multiple images in any of various formats for images, depending on the application. As will be described in more detail below with respect to FIGS. 7A-11B, during an image capture process, an AR system can be used. The AR system can receive and augment live image data with virtual data. In particular, the virtual data can include guides for helping a user direct the motion of an image capture device.

Another source of data that can be used to generate a MVIDMR includes environment information 5006. This environment information 5006 can be obtained from sources such as accelerometers, gyroscopes, magnetometers, GPS, WiFi, IMU-like systems (Inertial Measurement Unit systems), and the like. Yet another source of data that can be used to generate a MVIDMR can include depth images 5008. These depth images can include depth, 3D, or disparity image data streams, and the like, and can be captured by devices such as, but not limited to, stereo cameras, time-of-flight cameras, three-dimensional cameras, and the like.

In some embodiments, the data can then be fused together at sensor fusion block 5010. In some embodiments, a MVIDMR can be generated a combination of data that includes both 2D images 5004 and environment information 5006, without any depth images 5008 provided. In other embodiments, depth images 5008 and environment information 5006 can be used together at sensor fusion block 5010. Various combinations of image data can be used with environment information at 5006, depending on the application and available data.

In some embodiments, the data that has been fused together at sensor fusion block 5010 is then used for content modeling 5012 and context modeling 5014. As described in more detail with regard to FIG. 9, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments, as described in more detail below with regard to FIG. 9. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 5012 and context modeling 5014 can be generated by combining the image and location information data, as described in more detail with regard to FIG. 8.

According to various embodiments, context and content of a MVIDMR are determined based on a specified object of interest. In some embodiments, an object of interest is automatically chosen based on processing of the image and location information data. For instance, if a dominant object is detected in a series of images, this object can be selected as the content. In other examples, a user specified target 5002 can be chosen, as shown in FIG. 50. It should be noted, however, that a MVIDMR can be generated without a user-specified target in some applications.

In some embodiments, one or more enhancement algorithms can be applied at enhancement algorithm(s) block 5016. In particular example embodiments, various algorithms can be employed during capture of MVIDMR data, regardless of the type of capture mode employed. These algorithms can be used to enhance the user experience. For instance, automatic frame selection, stabilization, view interpolation, filters, and/or compression can be used during capture of MVIDMR data. In some embodiments, these enhancement algorithms can be applied to image data after acquisition of the data. In other examples, these enhancement algorithms can be applied to image data during capture of MVIDMR data.

According to various embodiments, automatic frame selection can be used to create a more enjoyable MVIDMR. Specifically, frames are automatically selected so that the transition between them will be smoother or more even. This automatic frame selection can incorporate blur- and over-exposure-detection in some applications, as well as more uniformly sampling poses such that they are more evenly distributed.

In some embodiments, stabilization can be used for a MVIDMR in a manner similar to that used for video. In particular, keyframes in a MVIDMR can be stabilized for to produce improvements such as smoother transitions, improved/enhanced focus on the content, etc. However, unlike video, there are many additional sources of stabilization for a MVIDMR, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some embodiments, depth information, if available, can be used to provide stabilization for a MVIDMR. Because points of interest in a MVIDMR are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. According to various embodiments, the content can stay relatively stable/visible even when the context changes.

According to various embodiments, computer vision techniques can also be used to provide stabilization for MVIDMRs. For instance, keypoints can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a MVIDMR is often focused on a particular object of interest, a MVIDMR can be content-weighted so that the object of interest is maximally stabilized in some examples.

Another way to improve stabilization in a MVIDMR includes direct selection of a region of a screen. For instance, if a user taps to focus on a region of a screen, then records a convex MVIDMR, the area that was tapped can be maximally stabilized. This allows stabilization algorithms to be focused on a particular area or object of interest.

In some embodiments, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, and mouth) can be used as areas to stabilize, rather than using generic keypoints. In another example, a user can select an area of image to use as a source for keypoints.

According to various embodiments, view interpolation can be used to improve the viewing experience. In particular, to avoid sudden "jumps" between stabilized frames, synthetic, intermediate views can be rendered on the fly. This can be informed by content-weighted keypoint tracks and IMU information as described above, as well as by denser pixel-to-pixel matches. If depth information is available, fewer artifacts resulting from mismatched pixels may occur, thereby simplifying the process. As described above, view interpolation can be applied during capture of a MVIDMR in some embodiments. In other embodiments, view interpolation can be applied during MVIDMR generation.

In some embodiments, filters can also be used during capture or generation of a MVIDMR to enhance the viewing experience. Just as many popular photo sharing services provide aesthetic filters that can be applied to static, two-dimensional images, aesthetic filters can similarly be applied to surround images. However, because a MVIDMR representation is more expressive than a two-dimensional image, and three-dimensional information is available in a MVIDMR, these filters can be extended to include effects that are ill-defined in two dimensional photos. For instance, in a MVIDMR, motion blur can be added to the background (i.e. context) while the content remains crisp. In another example, a drop-shadow can be added to the object of interest in a MVIDMR.

According to various embodiments, compression can also be used as an enhancement algorithm 5016. In particular, compression can be used to enhance user-experience by reducing data upload and download costs. Because MVIDMRs use spatial information, far less data can be sent for a MVIDMR than a typical video, while maintaining desired qualities of the MVIDMR. Specifically, the IMU, keypoint tracks, and user input, combined with the view interpolation described above, can all reduce the amount of data that must be transferred to and from a device during upload or download of a MVIDMR. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a MVIDMR 5018 is generated after any enhancement algorithms are applied. The MVIDMR can provide a multi-view interactive digital media representation. According to various embodiments, the MVIDMR can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, MVIDMRs provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with MVIDMRs that allow the MVIDMRs to be indexed with a high degree of efficiency and accuracy; and the ability of the user to interact and change the viewpoint of the MVIDMR. In particular example embodiments, the characteristics described above can be incorporated natively in the MVIDMR representation, and provide the capability for use in various applications. For instance, MVIDMRs can be used to enhance various fields such as e-commerce, visual search, 3D printing, file sharing, user interaction, and entertainment.

According to various example embodiments, once a MVIDMR 5018 is generated, user feedback for acquisition 5020 of additional image data can be provided. In particular, if a MVIDMR is determined to need additional views to provide a more accurate model of the content or context, a user may be prompted to provide additional views. Once these additional views are received by the MVIDMR acquisition system 5000, these additional views can be processed by the system 5000 and incorporated into the MVIDMR.

Figure 51:
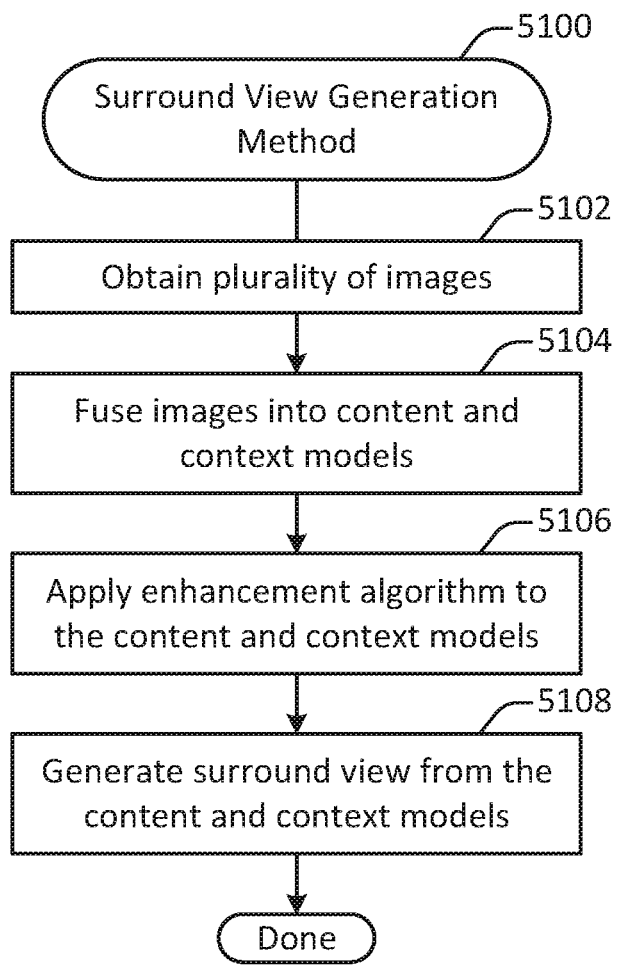
FIG. 51 illustrates one example of multiple camera views fused together into a three-dimensional (3D) model.

FIG. 51 shows an example of a process flow diagram for generating a MVIDMR 5100. In the present example, a plurality of images is obtained at 5102. According to various embodiments, the plurality of images can include two-dimensional (2D) images or data streams. These 2D images can include location information that can be used to generate a MVIDMR. In some embodiments, the plurality of images can include depth images 608, as also described above with regard to FIG. 6. The depth images can also include location information in various examples.

In some embodiments, when the plurality of images is captured, images output to the user can be augmented with the virtual data. For example, the plurality of images can be captured using a camera system on a mobile device. The live image data, which is output to a display on the mobile device, can include virtual data, such as guides and status indicators, rendered into the live image data. The guides can help a user guide a motion of the mobile device. The status indicators can indicate what portion of images needed for generating a MVIDMR have been captured. The virtual data may not be included in the image data captured for the purposes of generating the MVIDMR.

According to various embodiments, the plurality of images obtained at 5102 can include a variety of sources and characteristics. For instance, the plurality of images can be obtained from a plurality of users. These images can be a collection of images gathered from the internet from different users of the same event, such as 2D images or video obtained at a concert, etc. In some embodiments, the plurality of images can include images with different temporal information. In particular, the images can be taken at different times of the same object of interest. For instance, multiple images of a particular statue can be obtained at different times of day, different seasons, etc. In other examples, the plurality of images can represent moving objects. For instance, the images may include an object of interest moving through scenery, such as a vehicle traveling along a road or a plane traveling through the sky. In other instances, the images may include an object of interest that is also moving, such as a person dancing, running, twirling, etc.

In some embodiments, the plurality of images is fused into content and context models at 5104. According to various embodiments, the subject matter featured in the images can be separated into content and context. The content can be delineated as the object of interest and the context can be delineated as the scenery surrounding the object of interest. According to various embodiments, the content can be a three-dimensional model, depicting an object of interest, and the content can be a two-dimensional image in some embodiments.

According to the present example embodiment, one or more enhancement algorithms can be applied to the content and context models at 5106. These algorithms can be used to enhance the user experience. For instance, enhancement algorithms such as automatic frame selection, stabilization, view interpolation, filters, and/or compression can be used. In some embodiments, these enhancement algorithms can be applied to image data during capture of the images. In other examples, these enhancement algorithms can be applied to image data after acquisition of the data.

In the present embodiment, a MVIDMR is generated from the content and context models at 5108. The MVIDMR can provide a multi-view interactive digital media representation. According to various embodiments, the MVIDMR can include a three-dimensional model of the content and a two-dimensional model of the context. According to various embodiments, depending on the mode of capture and the viewpoints of the images, the MVIDMR model can include certain characteristics. For instance, some examples of different styles of MVIDMRs include a locally concave MVIDMR, a locally convex MVIDMR, and a locally flat MVIDMR. However, it should be noted that MVIDMRs can include combinations of views and characteristics, depending on the application.

Figure 52:
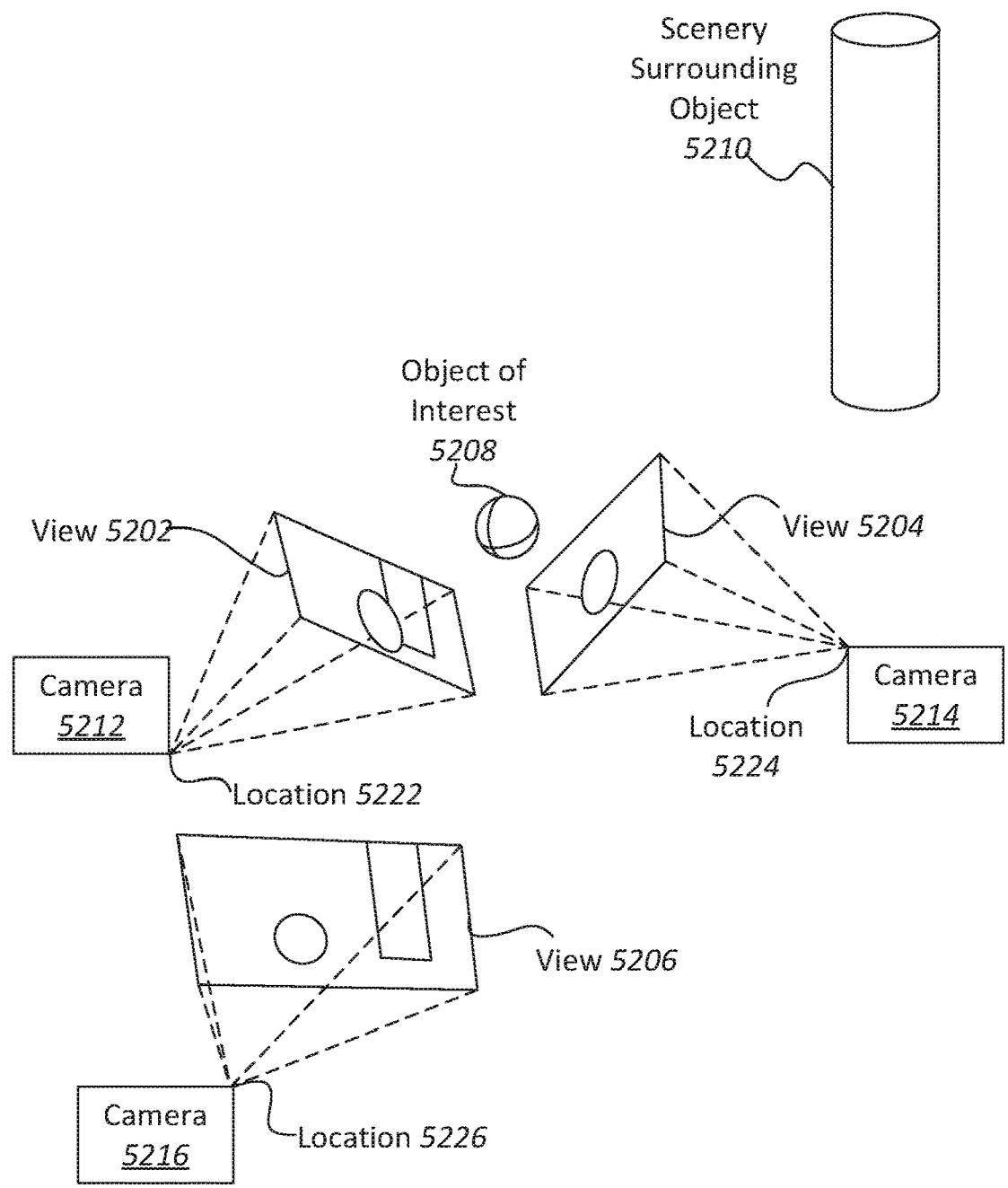
FIG. 52 illustrates one example of a method for generating MVIDMRs, performed in accordance with one or more embodiments.

FIG. 52 illustrates an example of a multi-view image digital media representation (MVIDMR) acquisition system, configured in accordance with one or more embodiments. According to various embodiments, multiple images can be captured from various viewpoints and fused together to provide a MVIDMR. In some embodiments, three cameras 5212, 5214, and 5216 are positioned at locations 5222, 5224, and 5226, respectively, in proximity to an object of interest 5208. Scenery can surround the object of interest 5208 such as object 5210. Views 5202, 5204, and 5206 from their respective cameras 5212, 5214, and 5216 include overlapping subject matter. Specifically, each view 5202, 5204, and 5206 includes the object of interest 5208 and varying degrees of visibility of the scenery surrounding the object 5210. For instance, view 5202 includes a view of the object of interest 5208 in front of the cylinder that is part of the scenery surrounding the object 5210. View 5206 shows the object of interest 5208 to one side of the cylinder, and view 5204 shows the object of interest without any view of the cylinder.

In some embodiments, the various views 5202, 5204, and 5216 along with their associated locations 5222, 5224, and 5226, respectively, provide a rich source of information about object of interest 5208 and the surrounding context that can be used to produce a MVIDMR. For instance, when analyzed together, the various views 5202, 5204, and 5226 provide information about different sides of the object of interest and the relationship between the object of interest and the scenery. According to various embodiments, this information can be used to parse out the object of interest 5208 into content and the scenery as the context. Furthermore, various algorithms can be applied to images produced by these viewpoints to create an immersive, interactive experience when viewing a MVIDMR.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A computing device comprising:
a communication interface configured to retrieve visual data from a remote server, the visual data including a plurality of images of a vehicle, each of the plurality of images captured from a respective viewpoint;
a processor configured to parse the visual data to render a user interface, the user interface including an overall multi-view interactive digital media representation (MVIDMR) of the vehicle allowing the plurality of images to be navigated in one or more dimensions, the user interface including a two-dimensional top-down view of the vehicle;
a display device configured to display the user interface; and
a user input device configured to receive user input for navigating the user interface, wherein selection of a designated portion of the two-dimensional top-down view of the vehicle including selection of tag free areas causes the user interface to present a perspective view image of a portion of the vehicle corresponding with the designated portion of the two-dimensional top-down view of the image, wherein the two-dimensional top-down view of the vehicle is presented as a wire frame having an overlain heatmap illustrating damage to the vehicle, the heatmap being determined at least in part by analyzing the plurality of images.

2. The computing device recited in claim 1, wherein the user interface includes a visual representation of an undercarriage of the vehicle.

3. The computing device recited in claim 1, wherein the visual representation of the undercarriage of the vehicle includes an undercarriage MVIDMRs of the vehicle allowing two or more images of the undercarriage of the vehicle to be navigated in one or more dimensions.

4. The computing device recited in claim 1, wherein a designated one of the plurality of images is captured via a camera positioned at a fixed position in space.

5. The computing device recited in claim 1, wherein each of the plurality of images is captured via a respective one of a plurality of cameras each positioned at a respective fixed position in space.

6. The computing device recited in claim 1, wherein each of the plurality of images is captured via a respective one of a plurality of cameras each positioned at a respective fixed position on a gate while the vehicle passes through the gate.

7. The computing device recited in claim 1, wherein the computing device is a mobile computing device that includes a camera, and wherein a designated one of the plurality of images is captured via the camera.

8. The computing device recited in claim 1, wherein the perspective view image includes a heatmap illustrating damage to a portion of the vehicle represented in the perspective view image.

9. The computing device recited in claim 1, wherein the user interface includes a damage detection panel corresponding to a designated portion of the vehicle in which damage was detected, and wherein the damage detection panel includes a subset of the plurality of images that are focused on the designated portion of the vehicle.

10. A method comprising:
retrieving visual data from a remote server via a communication interface, the visual data including a plurality of images of a vehicle, each of the plurality of images captured from a respective viewpoint;
parsing the visual data via a processor to render a user interface, the user interface including an overall multi-view interactive digital media representation (MVIDMR) of the vehicle allowing the plurality of images to be navigated in one or more dimensions, the user interface including a two-dimensional top-down view of the vehicle;
displaying the user interface via a display device; and
receiving user input for navigating the user interface, wherein selection of a designated portion of the two-dimensional top-down view of the vehicle including selection of tag free areas causes the user interface to present a perspective view image of a portion of the vehicle corresponding with the designated portion of the two-dimensional top-down view of the image, wherein the perspective view image includes a heatmap illustrating damage to a portion of the vehicle represented in the perspective view image.

11. The method recited in claim 10, wherein the two-dimensional top-down view of the vehicle is presented as a wire frame having an overlain heatmap illustrating damage to the vehicle, the heatmap being determined at least in part by analyzing the plurality of images.

12. The method recited in claim 10, wherein the user interface includes a visual representation of an undercarriage of the vehicle.

13. The method recited in claim 10, wherein the visual representation of the undercarriage of the vehicle includes an undercarriage MVIDMRs of the vehicle allowing two or more images of the undercarriage of the vehicle to be navigated in one or more dimensions.

14. The method recited in claim 10, wherein a designated one of the plurality of images is captured via a camera positioned at a fixed position in space.

15. The method recited in claim 10, wherein each of the plurality of images is captured via a respective one of a plurality of cameras each positioned at a respective fixed position in space.

16. The method recited in claim 10, wherein each of the plurality of images is captured via a respective one of a plurality of cameras each positioned at a respective fixed position on a gate while the vehicle passes through the gate.

17. The method recited in claim 10, wherein the computing device is a mobile computing device that includes a camera, and wherein a designated one of the plurality of images is captured via the camera.

18. One or more non-transitory computer readable media having instructions stored thereon for performing a method, the method comprising:
- retrieving visual data from a remote server via a communication interface, the visual data including a plurality of images of a vehicle, each of the plurality of images captured from a respective viewpoint;
- parsing the visual data via a processor to render a user interface, the user interface including an overall multi-view interactive digital media representation (MVIDMR) of the vehicle allowing the plurality of images to be navigated in one or more dimensions, the user interface including a two-dimensional top-down view of the vehicle;
- displaying the user interface via a display device; and
- receiving user input for navigating the user interface, wherein selection of a designated portion of the two-dimensional top-down view of the vehicle including selection of tag free areas causes the user interface to present a perspective view image of a portion of the vehicle corresponding with the designated portion of the two-dimensional top-down view of the image, wherein the perspective view image includes a heatmap illustrating damage to a portion of the vehicle represented in the perspective view image.

* * * * *